(12) United States Patent
Ford et al.

(10) Patent No.: US 10,633,770 B2
(45) Date of Patent: Apr. 28, 2020

(54) COAGULATION MAP FOR FIBER SPINNING

(71) Applicant: North Carolina State University, Raleigh, NC (US)

(72) Inventors: Ericka Ford, Raleigh, NC (US); Charles Blackwell, Raleigh, NC (US); Chunhong Lu, Nantong (CN)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 16/240,309

(22) Filed: Jan. 4, 2019

(65) Prior Publication Data
US 2019/0211479 A1    Jul. 11, 2019

Related U.S. Application Data

(60) Provisional application No. 62/613,566, filed on Jan. 4, 2018.

(51) Int. Cl.
*D01F 6/14* (2006.01)
*D01F 6/18* (2006.01)
(Continued)

(52) U.S. Cl.
CPC .............. *D01F 9/17* (2013.01); *D01D 1/02* (2013.01); *D01D 5/06* (2013.01); *D01F 6/50* (2013.01);
(Continued)

(58) Field of Classification Search
CPC ........ C08L 29/04; C08L 33/20; C08L 97/005; C08L 2201/56; C08L 2203/12;
(Continued)

(56) References Cited

U.S. PATENT DOCUMENTS

2012/0003471 A1* 1/2012 Bissett ............... D01D 1/02
  428/367
2014/0171379 A1* 6/2014 Jansen ............... C08L 97/005
  530/500 X
(Continued)

FOREIGN PATENT DOCUMENTS

CN        104911745 A    9/2015
CN        105369390 A    3/2016
(Continued)

OTHER PUBLICATIONS

Liu et al., "Processing, Structure, and Properties of Lignin—and CNT Incorporated Polyacrylonitrile-Based Carbon Fibers," ACS Sustainable Chem. Eng., vol. 3, pp. 1943-1954 (2015).
(Continued)

*Primary Examiner* — Leo B Tentoni
(74) *Attorney, Agent, or Firm* — Jenkins, Wilson, Taylor & Hunt, P.A.

(57) ABSTRACT

Disclosed are methods for preparing a lignin/poly(vinyl alcohol) (PVA) fiber and for preparing a lignin/polyacrylonitrile (PAN) fiber. The methods can comprise adding a dope of lignin and PVA or a dope of lignin and PAN to a coagulation bath containing a solvent comprising one or more components, wherein the one or more components are present in the solvent in concentrations based on the hydrogen bonding character ($f_H$) of the solvent, the polar character ($f_P$) of the solvent, and the dispersive character ($f_D$) of the solvent; and gel-spinning a lignin/PVA fiber or a lignin/PAN fiber from the coagulation bath.

31 Claims, 20 Drawing Sheets

(51) Int. Cl.
| | |
|---|---|
| *D02J 1/22* | (2006.01) |
| *D01F 9/17* | (2006.01) |
| *D01D 1/02* | (2006.01) |
| *D01F 6/54* | (2006.01) |
| *D01F 9/00* | (2006.01) |
| *D01D 5/06* | (2006.01) |
| *D01F 6/50* | (2006.01) |
| *D01F 9/22* | (2006.01) |
| *C08L 29/04* | (2006.01) |
| *C08L 33/20* | (2006.01) |
| *C08L 97/00* | (2006.01) |

(52) U.S. Cl.
CPC ............ *D01F 6/54* (2013.01); *D01F 9/00* (2013.01); *C08L 29/04* (2013.01); *C08L 33/20* (2013.01); *C08L 97/005* (2013.01); *C08L 2201/56* (2013.01); *C08L 2203/12* (2013.01); *D01F 9/22* (2013.01)

(58) Field of Classification Search
CPC ... D01D 1/02; D01D 5/06; D01D 5/12; D01F 6/14; D01F 6/18; D02J 1/22
USPC ..... 264/182, 183, 185, 202, 210.8; 530/500, 530/505, 507
See application file for complete search history.

(56) References Cited

U.S. PATENT DOCUMENTS

| | | |
|---|---|---|
| 2014/0194603 A1 | 7/2014 | Lehmann et al. |
| 2015/0037241 A1 | 2/2015 | Lehmann et al. |
| 2018/0282535 A1 | 10/2018 | Alves |
| 2019/0032250 A1 | 1/2019 | Ganster et al. |

FOREIGN PATENT DOCUMENTS

| | | |
|---|---|---|
| CN | 106400206 A | 2/2017 |
| CN | 106757536 A | 5/2017 |
| CN | 106884277 A | 6/2017 |
| DE | 102014004797 A1 | 11/2014 |
| DE | 102015120377 A1 | 6/2017 |
| JP | 49100326 A | 9/1974 |
| WO | WO 2013/144124 A1 | 10/2013 |
| WO | WO 2018/187710 A1 | 10/2018 |

OTHER PUBLICATIONS

Liu et al., "Preparation of carbon fibers from lignin, A Review on High-Value Utilization of Lignin as Materials for Carbon Fibers," China Pulp and Paper, vol. 27, No. 7, pp. 58-62 (2008)(English Abstract).
Liu et al., "Structure, properties, and stabilization kinetics of gel spun polyacrylonitrile/lignin blends toward carbon fiber," Abstracts of Papers, 251st ACS National Meeting & Exposition, San Diego, CA, United States, Mar. 13-17, 2016. (Abstract Only).
Lu et al., "Effect of the Coagulation Bath on the Structure and Mechanical Properties of Gel-Spun Lignin/Poly(vinyl alcohol) Fibers," ACS Sustainable Chemistry & Engineering, vol. 5, No. 4, pp. 2949-2959 (2017).
Ma et al., "High-Strength Composite Fibers from Cellulose-Lignin Blends Regenerated from Ionic Liquid Solution," ChemSusChem, vol. 8, No. 23, pp. 4030-4039 (2015).
Maradur et al., "Preparation of carbon fibers from a lignin copolymer with polyacrylonitrile," Synthetic Metals, vol. 162, No. 5-6, pp. 453-459 (2012).
Olsson et al., "Carbon fibres from precursors produced by dry-jet wet-spinning of kraft lignin blended with kraft pulps," Holzforschung, vol. 71, No. 4, pp. 275-283 (2017).
Wang et al., "Controlled Assembly of Lignocellulosic Biomass Components and Properties of Reformed Materials," ACS Sustainable Chem. Eng., vol. 5, pp. 8044-8052 (2017).
Zhang & Ogale, "Effect of temperature and concentration of acetylated-lignin solutions on dry-spinning of carbon fiber precursors," Journal of Applied Polymer Science, vol. 133, No. 45, p. 43663 (2016).
Zhang, "Carbon fibers derived from dry-spinning of modified lignin precursors, Dissertation," Clemson Univ. vol. 167 (2016).
Burke, J. "Solubility Parameters: Theory and Application," The Book and Paper Group Annual, vol. 3 (1984).

* cited by examiner

COAGULATION MAP FOR FIBER SPINNING

RELATED APPLICATIONS

The presently disclosed subject matter claims the benefit of U.S. Provisional Patent Application Ser. No. 62/613,566, filed Jan. 4, 2018; the disclosure of which is incorporated herein by reference in its entirety.

TECHNICAL FIELD

The presently disclosed subject matter relates to methods for preparing gel spun fibers containing lignin, optionally lignin/PVA or lignin/PAN fibers.

BACKGROUND

High-performance fibers are used for a multitude of applications where strength, durability, and often weight become an issue. Some fibers have been engineered to match and even exceed the mechanical properties of metals. The term "high-performance fiber" can have various definitions ranging within thermal, chemical, and mechanical properties. For instance, a high-performance fiber could have a storage modulus well within the hundreds of gigapascals range. Commodity fibers, in comparison, are not engineered to perform on the same level; a shirt is not designed for the same level of flame resistance as a fireman's jacket or rip resistance as a soldier's battle dress uniform (BDU). Commodity fibers are typically used in clothing and apparel, upholstery, and general everyday use items such as umbrellas, suitcases, and bags. Protective materials can be an area of overlap between high-performance materials and commodity materials, as well, but the requirements are more extreme for high-performance materials. Boots, for example, are worn to protect the feet from the elements, but specialized composite toe boots can be produced to prevent impact damage at a greater capacity without the weight of steel plating.

In terms of physical strength, high-performance fibers are known to have high breaking strengths, moduli, and durabilities. DuPont's KEVLAR® brand and NOMEX® brand aramid fibers, Toyobo's ZYLON® brand polyoxazole fibers, and Honeywell's SPECTRA® brand fibers are all well-known high-performance fibers utilized across several fields from law enforcement, aeronautics, and military applications. These materials replace heavier metal wires and glass fibers for similar performance at a reduced weight.

Rigid high-performance fibers are typically complex polymers with aromatic structures within the backbone chains. These structures can also have a series of secondary bonding between chains, lining up the aromatic rings to form a "plate-stacking" effect, increasing strength and rigidity. Para-aramids, benzobisazoles, and carbon fiber are among the most noted and high-performance rigid rod polymers. While para-aramids and benzobisazoles have their advantages, their strengths lie in flexural capabilities and energy absorption and redistribution. These fibers are engineered for initial strength, but often miss the mark in terms of longevity and sustainability. In industry, carbon fiber is often preferred for structural composites due in part to the higher axial stiffness and tenacity with drastically reduced weight. Carbon fiber is also resistant to moisture and direct sunlight, unlike para-aramids or benzobisazoles which will degrade without proper shielding.

Like other rigid high-performance polymers, carbon fiber structures are strong due to high alignment and additional secondary bonding. The typical "ladder" structure is highly ordered and can form strong secondary bonds relatively easily. The process to fabricate carbon fiber essentially heats a precursor fiber above 1000° C. until cyclization occurs and reorganizes the backbone chain into a series of rings. Further graphitization can be utilized to remove any inorganic compounds, but requires extreme heat that can reach temperatures in excess of 2500° C. This carbonized structure of precursor fibers, rather than polymerization and fiber spinning, sets carbon fiber apart from typical rigid fibers.

Carbon fiber can be derived from a variety of sources. Pitch and cellulose are representative sources. "Pitch" is a term used for polymeric aromatic hydrocarbons, often comprised of naphthalene, and cellulosic fibers used for carbon fiber production are typically synthetic or recovered cellulose. Ease of processing, defects, and carbon yield are all considered when industry decides which precursor to utilize. Typically, high carbon yield means high efficiency in producing carbon fiber with minimal loss of mass, reducing costs (see Kadla et al. (2002) Lignin-based carbon fibers for composite fiber applications. 40 *Carbon* 2913). Precursors are desirably as homogenous as possible in order to produce high volumes of high-performance carbon fibers. The commonality among the precursors is the potential for a regular aromatic ladder structure, however this structural regularity and order is necessary for high-performance fiber formation since defects or inconsistencies can act as propagation points for crazing and microcracking that lead to poor quality products (see e.g., Adanur (1995) *Wellington Sears Handbook of Industrial Textiles,* Technomic Publishing Company, Inc., Lancaster, Pa.).

Due to the unorganized and short length features of natural cellulose fibers, regenerated cellulose is required for producing cellulose-based carbon fiber (Karacan & Gül (2014) Carbonization behavior of oxidized viscose rayon fibers in the presence of boric acid-phosphoric acid impregnation. 49 *Journal of Material Science* 7462). Regenerated cellulose, also known as "rayon," is a bio-based alternative source for carbon fiber. Typically, carbon fiber rayon is derived from cellulose recovered from wood pulp. The cellulose is dissolved and then extruded through a spinneret in order to form the rayon filaments. This is an important step that realigns the crystals that can be carbonized and graphiticized (Karacan & Gül (2014)). Carbonization behavior of oxidized viscose rayon fibers in the presence of boric acid-phosphoric acid impregnation. 49 *Journal of Material Science* 7462; Dumanli & Windle (2012) Carbon fibres from cellulosic precursors: a review. 47 *Journal of Material Science* 4236). Rayon also requires chemical pre-processing in order to be carbonized, adding labor and chemical costs to the manufacture of carbon fiber. Unfortunately, carbon disulfide is often used for the production of rayon and is highly toxic. Theoretically, rayon could produce high strength carbon fiber, but its processing would require far greater processing temperatures in order to compete with pitch-based carbon fiber (Matsumoto (1985): Mesophase pitch and its carbon fibers. 57 *Pure and Applied Chemistry* 1553; Zhang et al. (2014) Effect of hot stretching graphitization on the structure and mechanical properties of rayon-based carbon fibers. 49 *Journal of Material Science* 673).

Derived from plant matter, lignocellulosics are a renewable source for aromatic compounds and easily the most abundant bio-based materials on Earth. They comprise semi-crystalline cellulose and non-crystalline hemicellulose and lignin. Lignin is a prime candidate for carbon fiber production due to the aromatic macromolecular structure, worldwide abundance, and label as a waste product by the paper pulping industry. Paper mills often burned lignin runoff for energy, however the lignin is inefficient as an energy source when compared to petroleum-based fuels, leaving this use less prevalent as industry grows to produce more paper at lower costs (Norberg (2012) Carbon fibres from Kraft lignin, KTH Royal Institute of Technology, Stockholm, Sweden; Brodin et al. (2008) Kraft lignin as feedstock for chemical products: the effects of membrane filtration. 63 *Holzforschung* 290). Lignin is an appealing source for carbon fiber due to its availability as a by-product or waste from the steadily growing paper pulping industry, however the performance of lignin-based carbon fiber is often lacking in terms of strength and is more comparable to isotropic pitch carbon fibers (Kadla et al. (2002) Lignin-based carbon fibers for composite fiber applications. 40 Carbon 2913).

Despite on-going efforts in the art, there remains a need for methods for preparing lignin-containing fibers, such as lignin-containing poly(vinyl alcohol) (PVA) and/or polyacrylonitrile (PAN) fibers. The presently disclosed subject matter addresses this and other needs in the art.

SUMMARY

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

In some embodiments, a method for preparing a lignin/poly(vinyl alcohol) (PVA) fiber is provided. In some embodiments, the method comprises: adding a dope of lignin and PVA to a coagulation bath containing a solvent comprising one or more components, wherein the one or more components are present in the solvent in concentrations such that the hydrogen bonding character ($f_H$) of the solvent is between 20% and 30%, the polar character ($f_P$) of the solvent is between 25% and 35%, and the dispersive character ($f_D$) of the solvent is between 40% and 50%; and gel-spinning a lignin/PVA fiber from the coagulation bath, wherein a lignin/PVA fiber is produced.

In some embodiments, a method for preparing a lignin/polyacrylonitrile (PAN) fiber is provided. In some embodiments, the method comprises: adding a dope of lignin and PAN to a coagulation bath containing a solvent comprising one or more components, wherein the one or more components are present in the coagulation bath in concentrations such that the hydrogen bonding character ($f_H$) of the solvent is between 40% and 60%, the polar character ($f_P$) of the solvent is between 15% and 30%, and the dispersive character ($f_D$) of the solvent is between 20% and 50%; and gel-spinning a lignin/PAN fiber from the coagulation bath, wherein a lignin/PAN fiber is produced.

In some embodiments, a method for preparing a lignin/poly(vinyl alcohol) (PVA) fiber is provided. In some embodiments, the method comprises: aging a dope of lignin and PVA in an aging bath, wherein the aging bath contains a solvent comprising one or more components, and further wherein the one or more components are present in the solvent in concentrations such that the hydrogen bonding character (fH) of the solvent is between 20% and 40%, the polar character (fP) of the solvent is between 25% and 35%, and the dispersive character (fD) of the solvent is between 35% and 50%; and gel-spinning a lignin/PVA fiber from the aging bath, wherein a lignin/PVA fiber is produced. In some embodiments, the dope is aged for 12 hours to 30 days.

In some embodiments, a method for preparing a lignin/polyacrylonitrile (PAN) fiber is provided. In some embodiments, the method comprises: heating a dope of lignin and PAN to a desired temperature in a first solvent, optionally wherein the first solvent is DMSO; aging the dope of lignin and PAN by allowing the dope to cool to about 18° C. to 25° C., optionally allowing the dope to remain at about 18° C. to 25° C. for at least about two hours, adding the dope of lignin and PAN to a coagulation bath containing a second solvent comprising one or more components, and further wherein the one or more components are present in the second solvent in concentrations such that the hydrogen bonding character ($f_H$) of the second solvent is between 40% and 60%, the polar character ($f_P$) of the second solvent is between 15% and 30%, and the dispersive character ($f_D$) of the second solvent is between 20% and 50%; and gel-spinning a lignin/PAN fiber from the coagulation bath, wherein a lignin/PAN fiber is produced. In some embodiments, the dope is aged for at least about 2 hours at 18° C. to 25° C., optionally 18° C. to 22° C. In some embodiments, the desired temperature is about 85° C. In some embodiments, the dope is transferred to a pump directly after the lignin and the PAN are dissolved in the solvent and the dope is at the desired temperature.

Thus, it is an object of the presently disclosed subject matter to provide methods for preparing lignin-containing fibers with improved characteristics.

An object of the presently disclosed subject matter having been stated herein above, and which is achieved in whole or in part by the presently disclosed subject matter, other objects will become evident as the description proceeds when taken in connection with the accompanying Figures as best described herein below.

BRIEF DESCRIPTION OF THE FIGURES

FIG. 5A is a plot of Young's modulus (■ and upper line) and breaking strength (■ and lower line), and FIG. 5B is a plot of toughness expressed in J/g.

FIG. 7C is a Teas plot of solvent mixtures used for lignin/PAN coagulation. "■" represents neat coagulation solvents, "●" represents neat dissolution solvents, "▲" represents mixed coagulation solvents, "●" represents solids, and "◇" represents a theoretical 55/45 ethyl acetate/water mixture. A circle encloses mixtures 9 and 10 as an area of effective coagulation and lignin migration hindrance.

DETAILED DESCRIPTION

Figures 1A, 1B:
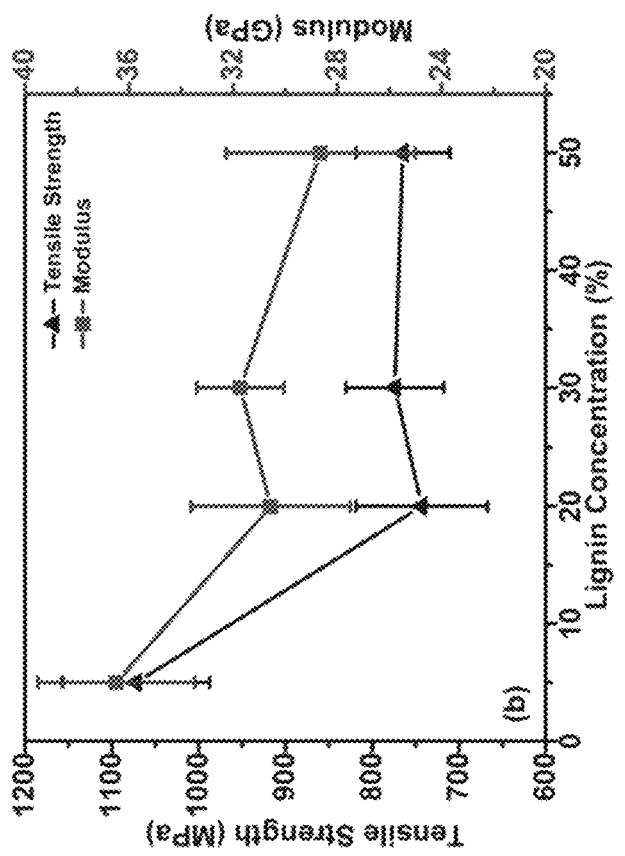
FIGS. 1A and 1B are graphs of tensile strength (▲) and Young's modulus (■) of lignin/PVA fibers at 0-50% lignin. Coagulation baths of 100% methanol/0% acetone (FIG. 1A) and 15% methanol/85% acetone (FIG. 1B) were used during gel fiber spinning.

The presently disclosed subject matter relates, in general, to methods for preparing lignin-containing poly(vinyl alcohol) (PVA) and/or polyacrylonitrile (PAN) fibers. More particularly, the presently disclosed subject matter relates to gel-spinning lignin/PVA and lignin/PAN fibers from coagulation baths that comprise solvents designed to have certain hydrogen bonding, polar, and dispersive characters.

I. Definitions

While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one of skill in the art. While the following terms are believed to be well understood by one of ordinary skill in the art, the following definitions are set forth to facilitate explanation of the presently disclosed subject matter.

Definitions of specific functional groups and chemical terms are those that would be understood by one of ordinary skill in the art. For purposes of this disclosure, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in Thomas N. Sorrell (2006) *Organic Chemistry, 2$^{nd}$ Edition*, University Science Books, South Orange, New Jersey; Smith & March (2001) *March's Advanced Organic Chemistry*, 5th Edition, John Wiley & Sons, Inc., New York; Larock (1989) *Comprehensive Organic Transformations*, VCH Publishers, Inc., New York; Carruthers (1987) *Some Modern Methods of Organic Synthesis, 3$^{rd}$ Edition*, Cambridge University Press, Cambridge, 1987; the entire contents of each of which are incorporated herein by reference.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

Following long-standing patent law tradition, the terms "a", "an", and "the" are meant to refer to one or more as used herein, including the claims. For example, the phrase "a solvent" can refer to one or more solvents. Also, as used herein, the term "another" can refer to at least a second or more.

The term "about", as used herein when referring to a measurable value such as an amount of weight, time, etc., is meant to encompass variations of in some embodiments ±20%, in some embodiments ±10%, in some embodiments, ±5%, in some embodiments ±1%, and in some embodiments ±0.1% from the specified amount, as such variations are appropriate to perform the disclosed methods.

The use of the term "or" in the present disclosure and claims is used to mean "and/or" unless explicitly indicated to refer to alternatives only or the alternatives are mutually exclusive.

As used herein, the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

As used herein, "significance" or "significant" relates to a statistical analysis of the probability that there is a non-random association between two or more occurrences. To determine whether or not a relationship is "significant" or has "significance", statistical manipulations of the data can be performed to calculate a probability, expressed as a "p-value". Those p-values that fall below a user-defined cutoff point are regarded as significant. In some embodiments, a p-value less than or equal to 0.10, in some embodiments less than or equal to 0.05, in some embodiments less than or equal to 0.01, in some embodiments less than or equal to 0.005, and in some embodiments less than or equal to 0.001, are regarded as significant.

As used herein, the phrases "hydrogen bonding character" ($f_H$), "polar character" ($f_P$), and "dispersive character" ($f_D$) can be defined with reference to the Hansen Solubility Parameter, (dM, where M=H (for hydrogen bonding between molecules), M=P (for polar intermolecular force between molecules), or M=D (for dipolar intermolecular forces between molecules). dM is in units of $MPa^{1/2}$ or $(cal/cm^3)^{1/2}$.

By way of example and not limitation, for a two-component system having X=2 components:

$$dM=(v1*dM1+v2*dM2)/(v1+v2)$$

Similarly, for a three-component system having X=3 components:

$$dM=(v1*dM1+v2*dM2+v3*dM3)/(v1+v2+v3)$$

Thus, for a multicomponent system having X components:

$$dM=(v1*dM1+v2*dM2+v3*dM3+\ldots vX*dMX)/(v1+v2+v3+\ldots +vX),$$

where v is the volumetric ratio of components 1, 2, 3 ... X. Adding more components, the total volume for X components in a system can be expressed as:

$$V_{TOTAL}=(v1+v2+v3+\ldots +vX).$$

According to John Burke of the American Institute of Conservation, TEAS parameters are calculated for $f_M$, where M=H (for hydrogen bonding between molecules), M=P (for polar intermolecular force between molecules), or M=D (for dispersive intermolecular forces between molecules) for a single or multiple component solvent.

$$f_D=dD(dD+dP+dH)*100$$

$$f_P=dP/(dD+dP+dH)*100$$

$$f_H=dH/(dD+dP+dH)*100$$

$f_M$ values (where M=H, P or D) represent the overall hydrogen ($f_H$), polar ($f_P$), or dispersive ($f_D$) character of the coagulation bath. Each $f_M$ component represents the volumetric fraction of bonding character, as expressed for a singular or multiple component solvent bath. Singular and multiple component baths, having the comparable $f_M$ values, are expected to coagulate gel in a similar manner. $f_M$ values were calculated from dM values (where M=H for hydrogen bonding forces, D for dispersive forces, or P for polar forces). Using these plots, we can predict 1) the coagulation performance of other solvents not previously used and 2) other singular or multiple component solvent systems for gel coagulation. Based on the chemical structure of solvents, solubility parameters can be used to map known coagulates. Using this mapping technique, manufacturers can predict the coagulation behavior of trial solvents prior to experimentation.

The mixed solubility parameters can be described with volumetric ratios according to Yamamoto:

$$dM=(a*d1+b*d2)/(a+b)$$

where d is the Hansen Solubility Parameter in question. The a and b values can be total volume or volume fraction; either way, the units fall out. This being the case, it can be further expanded for more components:

$$dM=(a*d1+b*d2+c*d3)/(a+b+c)$$

Representative calculations in terms of SI units, $MPa^{1/2}$ are disclosed herein. To plot these on a Triangle plot, ratios of each of the Hansen Solubility Parameters are employed. According to John Burke of the American Institute of Conservation, there are "Teas" Parameters:

$$f_D=dD/(dD+dP+dH)$$

where f is the Teas Parameter, $f_D$ being the Dispersion Teas Parameter. Since the units fall out, these can also be written in terms of percentages and can be employed for a Triangle plot.

II. Gel Spinning Lignin-containing Fibers: Components

II.A. Lignin

Derived from plant matter, lignocellulosics are a renewable source for aromatic compounds and easily the most abundant bio-based materials on Earth. They comprise semi-crystalline cellulose and non-crystalline hemicellulose and lignin. Lignin is a prime candidate for carbon fiber production due to the aromatic macromolecular structure, worldwide abundance, and label as a waste product by the paper pulping industry. Paper mills often burned lignin runoff for energy, however the lignin is inefficient as an energy source when compared to petroleum-based fuels, leaving this use less prevalent as industry grows to produce more paper at lower costs (Norberg (2012) Carbon fibres from Kraft lignin, KTH Royal Institute of Technology, Stockholm, Sweden; Brodin et al. (2008) Kraft lignin as feedstock for chemical products: the effects of membrane filtration. 63 *Holzforschung* 290). Lignin is an appealing source for carbon fiber due to its availability as a by-product or waste from the steadily growing paper pulping industry, however the performance of lignin-based carbon fiber is often lacking in terms of strength and is more comparable to isotropic pitch carbon fibers (Kadla et al. (2002) Lignin-based carbon fibers for composite fiber applications. 40 Carbon 2913).

Lignin is somewhat an enigma as its properties are not well known aside from the lignin recovered from pulping. Different species of plants typically have a characteristic ratio of the three monolignols, but the protolignin structure is different for every plant;

the macromolecule design is essentially random and is distributed unevenly throughout the plant. What is known is that plants utilize lignin within the cell walls as a cross-linking component. Lignin is cross-linked with hemicellulose which allows it to bond with polysaccharides, providing a rigid structural component that holds up the plant while simultaneously acting as a transporter for water. Lignin is also a natural deterrent for insects that might harm the plant.

Lignin is widely available, inexpensive, and renewable, and as a result has been tapped as popular potential filler material for PAN composite fibers. Lignin is a naturally occurring biopolymer in plants, and its abundance is second only to cellulose. It is an aromatic, non-crystalline, cross-linking polymer formed from mainly three types of phenyl-propane monolignols. Lignin polymers can range in molecular weight depending on source, specifically between species of plant. When still in its natural state, lignin is referred to as "protolignin", which is still relatively unknown in terms of structure. Every source specimen is subject to differences, so ultimately the heterogeneity of protolignin is a wide range. Cell types and genetics heavily influence the deposition and construction of the molecules within cell walls, suggesting an endless variety of protolignin polymer networks. It has been reported that the types of plants also have an impact on the protolignin structures: softwoods are known to have primarily coniferyl alcohol and hardwoods and grasses have a blend of all three monolignols. Because of these differences, pulp from different mills can contain different lignin types; a mill producing soft paper products such as tissue paper primarily uses hardwoods, so the lignin by-product will reflect the hardwood source. Typically, softwoods and eucalypts contain the highest percentages of lignin.

With improved recovery methods and an increased demand in production for the paper pulping industry, lignin can be easily recovered and utilized as an inexpensive and widely available bioresource. For over a century, the paper pulping industry has been using the same recovery equipment to handle the runoff for energy, however with a growing demand for solid lignin and newer recovery techniques, lignin will likely be readily available at low cost.

Most pulping is conducted with the Kraft process, a chemical pulping method that loads the product with sulfur in order to increase the strength of the final product. Kraft pulping is known to produce pulp with high strength, simple liquor recovery, and versatility with different pulp sources (such as softwood vs hardwood). Sodium hydroxide and sodium sulfide in the pulp break own the lignin macromolecules into smaller, water and alkaline soluble parts. Sulfites have also been used to further increase the sulfur content and reduce lignin, but often the gain is minimal or sometimes detrimental with loss of strength as a result of acidic degradation. Through experience, industry has streamlined the process to have the highest yield and most efficient processing times. Temperature is often kept between 150 and 165° C. inside pressurized vessels in order to have the most efficient and consistent delignification possible, though truly homogenous delignification is not currently possible. "Black liquor" containing broken down cellulose, hemicellulose, lignin, inorganics, and other waste materials is then recovered, concentrated, and then used as fuel. This black liquor is the primary source of recovered lignin, where it is in a reduced state and has a wide range of molecular weights, often with 2 to 3 kDa molecular weights. The Kraft process also produces DMSO, a widely used solvent, in significant quantity. Processing the black liquor to extract lignin has become even more efficient due to increased demand from the fact that the paper mills often run at the rate of lignin biofuel recovery.

A cleaner alternative method to achieve fiberization of the pulp from chips is known as steam explosion. Wood chips are subjected to temperatures around 285° C. at 3.5 MPa, then rapidly pressurized to 7 MPa. The chips are then ejected into 1 atm of pressure, resulting in explosive depressurization that defibrillates the cellulose portions, allowing better access for hydrolysis to occur in both the cellulose and hemicellulose zones. As a result, cracks and total defibrillation for the wood fibers is achieved. Acids have been used to increase the rate of hydrolysis of the hemicellulose as well; however, no chemicals are actually required except for water. This method is environmentally friendly due to the lack of inherent acid processing that degrades equipment and could pose a threat to workers, however the lignin recovered from this method is poorly solubilized and is often more broken down to be utilized in post processing. The molecular weight of lignin derived from steam explosion can range between 0.8 to 2.0 kDa.

Lignin is considered a waste product, so processing was originally designed to remove lignin and hemicellulose in order to make paper pulp. However, Organosolv processing was developed to remove each fraction of the feedstock from each other. It utilizes organic solvents such as acetone, ethanol, methanol, and organic acids to extract lignin and depolymerize the cross-linked hemicellulose. As a result, Organosolv lignin is much higher in purity than Kraft and steam explosion lignin, as well as having a low molecular weight, narrow distribution, and low sulfur content. To separate the cellulose in a solid phase, warm organic solvent between 130 and 200° C. is added to the feedstock. Black liquor containing lignin and hemicellulose is produced as a liquid phase. The black liquor is then separated into an aqueous phase and an organic phase. This organic phase is comprised mainly of lignin, which can then be recovered through distillation. While volatile organic solvents are indeed used, they can be distilled off for reuse and to remove the lignin easily. However, organic solvents are relatively expensive and are sensitive to temperature and atmospheric pressure, narrowing processing parameters which leads to increasing expenses and higher required initial capital.

II.B. Polyvinyl Alcohol (PVA)

Polyvinyl alcohol (PVA) is a polymer that can in some embodiments be employed to produce a fiber of the presently disclosed subject matter. PVA can have a varying degree of hydrolysis. For example, polyvinyl alcohol can be about 80% to about 99.9% hydrolyzed, such as from about 85% to about 99.9%, from about 85% to about 90% or from about 95% to about 99.9% hydrolyzed. In some embodiments, polyvinyl alcohol can be greater than 99% hydrolyzed, greater than 98% hydrolyzed, greater than 95% hydrolyzed, greater than 90% hydrolyzed, greater than 85% hydrolyzed, or greater than 80% hydrolyzed. In some embodiments, the PVA is characterized by at least about 85% hydrolysis. In addition, polyvinyl alcohol can include a small amount of impurities, such as acetyl content (e.g., polyvinyl acetate) depending on the method of synthesis. For example, polyvinyl alcohol can include less than 5%, less than 4%, less than 3%, less than 2%, less than 1%, less than 0.9%, less than 0.5%, or less than 0.1% by weight of the polyvinyl alcohol.

In some embodiments, the polymer can be low molecular weight polyvinyl alcohol or high molecular weight polyvinyl alcohol. For example, low molecular weight polyvinyl alcohol refers to polyvinyl alcohol having a molecular weight less than 100 kDa, such as from about 89 kDa to about 98 kDa having a degree or polymerization of about 2,000. High molecular weight polyvinyl alcohol refers to polyvinyl alcohol having a molecular weight greater than 500 kDa, such as about 774 kDa having a degree or polymerization of about 18,000. In some embodiments, the polyvinyl alcohol employed in the compositions and methods of the presently disclosed subject matter has a molecular weight of about 100-500 kDa.

II.C. Polyacrylonitrile (PAN)

PAN is a highly ordered, aliphatic polymer. Because of its simple and ordered structure, PAN is readily carbonized into fiber immediately after spinning and drawing.

Unlike other precursors, PAN does not need to be subjected to further heat treatments beyond basic carbonization in order to form carbon fibers, making it as close to ideal as possible for industry purposes. PAN-based carbon fibers often reach approximately 50 to 57% original polymer weight (Nataraj et al. (2012) Polyacrylonitrile-based nanofibers: a state-of-the-art review. 32 *Progress in Polymer Science* 487) and have a moderately high carbon yield. Wet spun PAN fibers are the primary source for high strength carbon fibers due to the regular structure and the inexpensive processing in comparison to pitch. PAN-based carbon fiber can have consistently higher tensile strength than mesophase pitch as well as higher tensile modulus at lower carbonization temperatures (Karacan & Gül (2014) Carbonization behavior of oxidized viscose rayon fibers in the presence of boric acid-phosphoric acid impregnation. 49 *Journal of Material Science* 7462). PAN also forms carbon fiber with the highest compression strength, making it ideal for structural composites (Chae et al. (2009) Carbon nanotube reinforced small diameter polyacrylonitrile based carbon fiber. 69 *Composites Science and Technology* 406).

PAN is a linear polymer, typically comprising a repeating pendant group of a carbon atom triple bonded to a nitrogen atom. The regular structure gives PAN the potential to form strong intermolecular bonds, resulting in a stiff, strong macro structure; however, this also inhibits free chain flow which can be detrimental during fiber formation. To synthesize the polymer, acrylonitrile monomers are typically polymerized with the use of free radical polymerization. This method of synthesis usually leads to the formation of atactic chains, implying minimal regular crystallization, but specific techniques like suspension polymerization allow greater control of molecular weights and prevention of molecular defects or irregularities (Frank et al., (2017) High-performance PAN-based carbon fibers and their performance requirements. 187 *Woodhead Publishing Series in Textiles* 7).

In some embodiments, a PAN polymer in accordance with the presently disclosed subject matter comprises polyacrylonitrile (PAN), polyacrylonitrile derivatives, polyacrylonitrile copolymers, or a combination thereof. Polyacrylonitrile derivatives refer to polymers that are derived from polyacrylonitrile or polyacrylonitrile copolymers, which have been modified via chemical substitution, yet still maintain properties that allow it to be useful in the compositions disclosed herein. For example, a polyacrylonitrile derivative can include polymers where one or more nitrile groups of polyacrylonitrile are converted to alternate functionalities. In some embodiments, the polymer is a polyacrylonitrile copolymer of polyacrylonitrile and another polymer selected from the group consisting of acrylic acid, itaconic acid, and acrylates. Polyacrylonitrile copolymers can be random copolymers, block copolymers, alternating copolymers, graft copolymers, or combinations thereof. In some embodiments, the polymer is polyacrylonitrile.

PAN homopolymer can be produced, but is more difficult to process than PAN copolymers. In order to be considered PAN, the polymer must be comprised of at minimum 85% acrylonitrile monomers and at most 15% comonomers. Itaconic acid, methacrylate, or vinyl chloride are often polymerized with the bulk acrylonitrile monomers intentionally to improve processability and certain properties, such as increasing hydrophobicity or for carbonization purposes. These non-acrylonitrile sites disrupt the structure and allow chain movement to take place to an extent, but are often engineered with end use of the fiber in mind. For instance, it has been exhibited that PAN copolymerized with itaconic acid monomers can improve the efficiency in the thermal oxidation and ultimately the carbonization processes more so than vinyl chloride or methacrylate monomers, and produces carbon fibers with minimal defects. Zhidkova et al. observed that energy required for stabilization dropped as a result of copolymerizing PAN with 1.2 to 6.4% itaconic acid (Zhidkova et al. (1994) Thermal properties of polyacrylonitrile copolymers having various chemical compositions. 25 *Fibre Chemistry* 368).

PAN is difficult to process due in part to the strong attractive forces resulting from the dipoles of the cyano groups, and is dependent upon how the powder form has been dried after removed from solution. It can be dissolved around 20° C. when the powder has been dried between 70 and 80° C., but more heat for dissolution is required when the drying temperature is increased and when homopolymer is being used. Solvents for PAN are limited to a small group of polar aprotic compounds such as dimethylformamide (DMF), dimethylacetamide (DMAc), and dimethlysulfoxide (DMSO) that have strong dipolar moments but resist proton donation for hydrogen bonding. Strong compounds such as DMF and DMAc are often used due to the ease of dissolution, however some of these compounds can be toxic or carcinogenic, so safety considerations are warranted when handling PAN during any stage of processing. DMSO is preferred for fabricating solutions and spinning dopes. Eom and Kim observed that even though DMF dissolved PAN at a higher rate, however the DMSO dissolved PAN was more homogenous.

Temperatures of the solutions, PAN in particular, are typically between 60 to 85° C. while the coagulation bath can range between 0 and −50° C. in some studies. Working temperature ranges depend on the constituent polymer concentrations, in-line tensions, and both solution and coagulation bath solvent or solvents. In the case of gel spinning, the spinning dope itself should exhibit high viscosity due to the high molecular weight polymers used, typically having molecular weight values over 100 kDa (in some embodiments, about 100 kDa to about 500 kDa). However, this can be altered with the use of medium molecular weight polymers with less than 100 kDa weights that have formed pre-gelled networks through dope aging. Winding speeds can be increased as a result of aging the spinning dope, leading to faster processing speeds, nearly increasing takeup speeds by 150%.

To age them, the spinning dopes can be allowed to equalize to room temperature and rest for some time, creating pre-gelled polymer networks. These pre-gelled polymer networks allow the spinning dope to behave as if it were more entangled through secondary bonding. These network bonds mimic the long chain entanglements that ultra-high molecular weight polymers utilize in spinning and fiber formation. This allows the use of PAN with molecular weight as low as 78 kDa to have similar properties to PAN with almost four times the molecular weight.

III. Gel-Spun Fibers and Methods for Producing the Same

In some embodiments, the presently disclosed subject matter provides fibers that include lignin and a polymer of interest. In some embodiments, the fiber can be provided via a number of different techniques.

In some embodiments, the fiber is provided through a gel spinning method. Gel spinning can be differentiated from wet spinning by the former employing a high molecular weight of the spinning dope, a significant air gap, and in particular the fiber formation that occurs in the bath. Molecular weight of the polymer plays a role in the strength of the fiber it forms in terms of gel spinning. Smith et al. found that the ratio of weight average and number average molecular weights (polydispersity index or "PDI") can be an estimation tool for the strength of the polymer during their investigation of ultra-high molecular weight polyethylene (UHMWPE; Smith et al. (1982) Tensile strength of highly oriented polyethylene. II. Effect of molecular weight distribution. 20 *Journal of Polymer Science, Polymer Physics Edition* 2229). As described therein, a clear increase in breaking strength was observed when the weight average molecular weight is increased with constant number average molecular weight.

Some gel spinning processes can utilize molecular weights in excess of 1000 kDa; however, it is not molecular weight alone that determines strength, but rather its application. Gel spinning utilizes low concentrations of high molecular weight polymers with narrow molecular weight distributions. This minimizes the density of chain entanglements while increasing the viability of high draw ratios, resulting in long, highly oriented and aligned polymer chains. The highly oriented chains are the result of long air gaps between the feed source and the coagulation bath, that in turn provide the bulk of the strength of the formed fiber. In some embodiments, extended chain crystals can provide greater strength and rigidity to the fiber as opposed to folded chain crystals often found in apparel and commercial fibers. In-line tension assists in the formation of these crystalline structures which align with the flow as opposed to folded chain crystals that can occur without tension. These crystalline structures also provide more graphiticizable sites in the fiber for stronger, more homogeneous carbon fiber.

Gel spinning utilizes a thermally induced and one-way diffusion induced extraction of the solvent to form the fiber instead of a dynamic solvent exchange, and the fibers are often more uniform and circular as a result. Because methanol is miscible with DMSO, but not a good solvent for PAN, the diffusion of solvent into the coagulation bath is essentially a uniform extraction of the solvent that leaves the fiber behind when the fiber is PAN-based. The lack of interaction between the methanol and the PAN implies that the gelation is then primarily thermally induced.

By way of example and not limitation, the gel spinning method can include dissolving a polymer having a plurality of hydroxyl and/or nitrile groups in a first solvent to provide a solution. The first solvent can be any suitable solvent that dissolves the polymer, as well as any other optional components (e.g., lignin). The first solvent can include DMSO, water, urea, or combinations thereof. In some embodiments, the first solvent is a mixture of DMSO and water at different volume percentages of DMSO/water. For example, the first solvent can include about 80% v/v DMSO and 20% v/v water. In some embodiments, the first solvent is 100% DMSO.

In some embodiments, the polymer is dissolved together with lignin to form a dope. In some embodiments, the lignin and polymer are completely dissolved in the solvent. The polymer and lignin can be present in the dope at varying amounts in the solution. For example, the polymer can be present in the dope at from about 5 g/dL to about 30 g/dL, and the lignin can be present in a weight ratio to polymer of about 5% to about 90% weight/weight (w/w). The molecular weight of the lignin can influence the viscosity of the lignin/polymer blends such that at higher molecular weight values of lignin, the viscosity of lignin/polymer blends can remain sufficiently high for polymer chain entanglement; so that fiber formation occurs and the resulting fiber has the desired mechanical performance The dope can then be heated, e.g., to a temperature of from about 70° C. to about 110° C. for a period of time (e.g., in some embodiments about 60° C. to about 85° C., and in some embodiments about 80° C. to about 85° C.), such as for about 1 minute to about 1 hour. After the dope has been heated for a period of time it can then be extruded through an orifice (e.g., a hypodermic needle attached to a syringe) under pressure into a first bath comprising a coagulation solvent to provide a gel spun fiber. The diameter of the orifice and pressure applied can vary depending on the type of fiber desired. For example, an orifice can be supplied via a 19-gauge needle having an inner diameter of about 0.69 mm. A plunger system can control flow rates through the orifice. Metering pumps can also be used, such as on a pilot and commercial scale for the production of multi-filament yarns.

In addition, the coagulation solvent can be at a temperature lower than that of the solution (e.g., 5° C., 0° C., –5° C., –10° C., –15° C., –20° C., or –25° C.), and can include different solvents. The coagulation solvent can in some embodiments include methanol, acetone, isopropanol, water, or combinations thereof. In some embodiments, the coagulation solvent includes about 15% to about 50% methanol and about 50% to about 85% acetone. In some embodiments the coagulation solvent is maintained at a pre-set temperature that is between about –15° C. and about –30° C., optionally wherein the pre-set temperature is about –25° C. In some embodiments, coagulation solvent comprises about 25% isopropyl alcohol, about 50% methanol, and about 25% water and is maintained at about –5° C. Other representative parameters are provided in the Examples presented herein below.

Once the gel spun fiber is provided, it can be aged within a third bath that includes the same solvents at a higher temperature (e.g., greater than 0° C.) than the first bath to provide an aged gel spun fiber. Gel spun fibers can be aged for about 1 hour to about 48 hours. In some embodiments, the gel-spun fiber is aged in the third bath at 5° C. for 24 hours, and up to 30 days, including 1 day, 14 days, or 15 days. Other representative parameters are provided in the Examples presented herein below.

The aged gel-spun fiber can be drawn through a second bath comprising silicone oil to provide the presently disclosed fibers. In some embodiments, thermal drawing can comprise the use of a bath comprising silicone oil as a drawing medium for PVA. In some embodiments, a bath comprising glycerol and high temperature silicone oil is used for the thermal drawing of PAN. Ovens to draw in air, hotplate, and drawing cans are also appropriate for thermal drawing at elevated temperatures. In some embodiments, combinations of the above baths/methods are used.

By way of elaboration, the drawing can be done in 1 to 4 stages at elevated temperatures, such as from about 90° C. to about 240° C. In some embodiments, the second bath can be used to enhance gel-fiber crystallinity and increase its temperature for thermal drawing (stretching). For example, and as shown in Table 1 below, solvent compositions can include 25/75 water/acetone or 50/50 water/acetone aging mixture for 24 hours.

TABLE 1

Drawing Parameters and Mechanical Properties of Lignin/PVA fibers from 5% Lignin Dopes and Different Aging Baths

| Solvent Composition (Water/Acetone) | | 25/75 | 50/50 |
|---|---|---|---|
| As-spun DR | | 3.1 | 2.3 |
| Cold Draw DR | | 4.0 | 3.5 |
| Stage 1 | Temp (° C.) | 125 | 120 |
| Drawing | DR | 2.1 | 2.4 |
| Stage 2 | Temp (° C.) | 180 | 160 |
| Drawing | DR | 1.5 | 1.5 |
| Stage 3 | Temp (° C.) | 215 | 195 |
| Drawing | DR | 1.4 | 1.3 |
| Stage 4 | Temp (° C.) | 225 | 220 |
| Drawing | DR | 1.2 | 1.2 |
| Total DR$^a$ | | 66 | 45 |
| Effective Diameter (μm) | | 26 | 29 |
| Linear Density (dtex) | | 7 | 9 |
| Tensile Strength (GPa) | | 1.3 ± 0.1 | 1.1 ± 0.1 |
| Young's Modulus (GPa) | | 53 ± 4 | 49 ± 3 |
| Toughness (J/g) | | 17 ± 3 | 19 ± 3 |

$^a$Total DR: Cumulative draw ratio from as-spun DR, cold drawing and hot drawing of Stages 1 to 4.

Varying feed rates and draw ratios can be used in the disclosed methods. For example, the method can include feed rates of from about 0.1 meters/minute (m/min) to about 20 m/min, including but not limited to 1 m/min, 5 m/min, 10 m/min, 15 m/min, and 20 m/min. Other representative parameters are provided in the Examples presented herein below.

In addition, the method can include draw ratios of from about 1 to about 20. Other representative parameters are provided in the Examples presented herein below.

An example of a gel-spinning technique can found in Lu et al. (2017) "Effect of the Coagulation Bath on the Structure and Mechanical Properties of Gel-Spun Lignin/Poly(vinyl alcohol) Fibers". *ACS Sustainable Chem Eng* 5(4): 2949-2959, which is incorporated by reference in its entirety.

In some embodiments, the fiber can have increased tenacity. The fiber can have a tenacity of greater than 5 g/den, greater than 6 g/den, greater than 7 g/den, greater than 8 g/den, or greater than 9 g/den. In addition, the fiber including the polymer and lignin can have an increased tenacity relative to a fiber including the same polymer (of the same molecular weight) but without lignin. For example, the fiber can have a tenacity of at least 1.5×, at least 2×, at least 2.5×, at least 3×, at least 4×, at least 5×, or at least 10× the tenacity of a fiber including the same polymer (of the same molecular weight) but without lignin.

The fiber can have a specific modulus of greater than 230 g/den, greater than 250 g/den, greater than 300 g/den, greater than 350 g/den, greater than 400 g/den, or greater than 450 g/den.

The fiber can have a tensile strength of greater than 500 MPa, greater than 550 MPa, greater than 600 MPa, greater than 650 MPa, greater than 700 MPa, greater than 750 MPa, greater than 800 MPa, greater than 900 MPa, or greater than 1000 MPa.

The fiber can have a linear density of less than 25 denier, a linear density of less than 20 denier, a linear density of less than 19 denier, a linear density of less than 18 denier, a linear density of less than 17 denier, less than 16 denier, less than 15 denier, less than 14 denier, less than 13 denier, less than 12 denier, less than 11 denier, less than 10 denier, less than 9 denier, less than 8 denier, less than 7 denier, or less than 6 denier.

Thus, in some embodiments, the presently disclosed subject matter provides methods for preparing lignin/polymer fibers. In some embodiments, the polymer is poly(vinyl alcohol) (PVA), and the method comprises (a) adding a dope of lignin and PVA to a coagulation bath containing a solvent comprising one or more components, wherein the one or more components are present in the solvent in concentrations such that the hydrogen bonding character (fH) of the solvent is between 20% and 30%, the polar character (fP) of the solvent is between 25% and 35%, and the dispersive character (fD) of the solvent is between 40% and 50%; and (b) gel-spinning a lignin/PVA fiber from the coagulation bath, wherein a lignin/PVA fiber is produced. In some embodiments, the dope is prepared at about 80° C. to about 85° C. In some embodiments, the hydrogen bonding character (fH) of the solvent is 20%, 21%, 22%, 23%, 24%, 25%, 26%, 27%, 28%, 29% or 30%. In some embodiments, the polar bonding character (fP) of the solvent is 25%, 26%, 27%, 28%, 29%, 30%, 31%, 32%, 33%, 34% or 35%. In some embodiments, the dispersive character (fD) of the solvent is 40%, 41%, 42%, 43%, 44%, 45%, 46%, 47%, 48%, 49% or 50%.

In some embodiments, the dope comprises a weight ratio of 5-90% (w/w) lignin to PVA. In some embodiments, the dope comprises PVA at a molecular weight of about 100-500 kg/mol, and further wherein the PVA is characterized by at least about 85% hydrolysis. In some embodiments, the dope is provided in a solution of about 80% DMSO to about 100% DMSO (v/v) in distilled water at about 60° C. to about 85° C. In some embodiments, the coagulation bath is maintained at a pre-set temperature that is between about −15° C. and about −30° C., optionally wherein the pre-set temperature is about −25° C. In some embodiments, the lignin/PVA fiber has an as-spun draw ratio of at least 2×. In some embodiments, the lignin has a minimum molecular weight of at least 2 kiloDaltons (kDa).

In some embodiments, the one or more components of the solvent include about 15% to about 50% methanol and/or about 50% to about 85% acetone. In some embodiments, the methanol is present at 15%, 20%, 25%, 30%, 35%, 40%, 45% or 85% by volume. In some embodiments, the acetone is present at 50%, 55%, 60%, 65%, 70%, 75%, 80% or 85% by volume.

In some embodiments, the method further comprises conditioning the dope at room temperature for a period of time prior to the adding step. In some embodiments, the period of time is at least two hours prior to the adding step.

In some embodiments, the method further comprises aging the dope in an aging bath for 12 hours to 30 days, in some embodiments wherein the aging bath contains a solvent comprising one or more components, and further wherein the one or more components are present in the solvent in concentrations such that the hydrogen bonding character (fH) of the solvent is between 20% and 40%, the polar character (fP) of the solvent is between 25% and 35%, and the dispersive character (fD) of the solvent is between 35% and 50%; and gel-spinning a lignin/PVA fiber from the aging bath. In some embodiments, the hydrogen bonding character (fH) of the solvent is 20%, 21%, 22%, 23%, 24%, 25%, 26%, 27%, 28%, 29%, 30%, 30%, 32%, 33%, 34%, 35%, 36%, 37%, 38%, 39% or 40%. In some embodiments, the polar bonding character (fP) of the solvent is 25%, 26%, 27%, 28%, 29%, 30%, 31%, 32%, 33%, 34% or 35%. In some embodiments, the dispersive character (fD) of the solvent is 35%, 36%, 37%, 38%, 39%, 40%, 41%, 42%, 43%, 44%, 45%, 46%, 47%, 48%, 49% or 50%.

In some embodiments, the polymer is polyacrylonitrile (PAN), and the method comprises (a) adding a dope of lignin and PAN to a coagulation bath containing a solvent comprising one or more components, wherein the one or more components are present in the coagulation bath in concentrations such that the hydrogen bonding character (fH) of the solvent is between 40% and 60%, the polar character (fP) of the solvent is between 15% and 30%, and the dispersive character (fD) of the solvent is between 20% and 50%; and (b) gel-spinning a lignin/PAN fiber from the coagulation bath, wherein a lignin/PAN fiber is produced. In some embodiments, the hydrogen bonding character (fH) of the solvent is 40%, 41%, 42%, 43%, 44%, 45%, 46%, 47%, 48%, 49%, 50%, 51%, 52%, 53%, 54%, 55%, 56%, 57%, 58%, 59% or 60%. In some embodiments, the polar bonding character (fP) of the solvent is 15%, 16%, 17%, 18%, 19%, 20%, 21%, 22%, 23%, 24% 25%, 26%, 27%, 28%, 29% or 30%. In some embodiments, the dispersive character (fD) of the solvent is 20%, 21%, 22%, 23%, 24% 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49% or 50%.

In some embodiments, the PAN is present in the dope in an amount of about 10 to about 50 g/dL, optionally about 20 g/dL. In some embodiments, the dope comprises PAN at about 150 kDa and is prepared at about 80° C. to about 85° C. or comprises PAN at about 200-250 kDa and is prepared at about 60° C. to about 85° C. In some embodiments, the coagulation bath is maintained at about −5° C. In some embodiments, the lignin/PAN fiber has an as-spun draw ratio of at least 3×. In some embodiments, the dope comprises up to 30% PAN, a concentration of up to 20% g/dL PAN, and a weight ratio of up to 90% (w/w) lignin to PAN. In some embodiments, the dope comprises PAN at a molecular weight of about 150 kDa to about 300 kDa. In some embodiments, the dope is provided in a solution comprising DMSO, dimethyl acetamide (DMAc), dimethylforamide (DMF), and/or an alkanolamine. In some embodiments, the solution comprises 5-10% (w/w) alkanolamine, optionally monoethanolamine (MEA) or triethanolamine, to DMSO. In some embodiments, the dope is provided in an 80-100% (v/v) solution of DMSO in distilled water at about 80° C. to about 85° C. In some embodiments, the lignin has a minimum molecular weight of at least 2 kDa. In some embodiments, the solvent comprises about 25% isopropyl alcohol, about 50% methanol, and about 25% water. In some embodiments, the dope comprises a weight ratio of 10-90% (w/w) lignin to PAN. In some embodiments, the adding step comprises extruding the dope through an orifice, such might be provided by an 18-24 gauge needle. In some embodiments, the tip of the needle is about 0.5-8.0 cm above the top surface of the solvent present in the coagulation bath. A plunger system can control flow rates through the orifice. Metering pumps can also be used, such as on a pilot and commercial scale for the production of multi-filament yarns. In some embodiments, the solvent is maintained at a temperature of about −15° C. to about 5° C.

In some embodiments, the method further comprises conditioning the dope at room temperature for a period of time prior to the adding step. In some embodiments, the period of time is at least two hours prior to the adding step.

In some embodiments, a method for preparing a lignin/poly(vinyl alcohol) (PVA) fiber is provided. In some embodiments, the method comprises: aging a dope of lignin and PVA in an aging bath, wherein the aging bath contains a solvent comprising one or more components, and further wherein the one or more components are present in the solvent in concentrations such that the hydrogen bonding character (fH) of the solvent is between 20% and 40%, the polar character (fP) of the solvent is between 25% and 35%, and the dispersive character (fD) of the solvent is between 35% and 50%; and gel-spinning a lignin/PVA fiber from the aging bath, wherein a lignin/PVA fiber is produced. In some embodiments, the dope is aged for 12 hours to 30 days. Other representative parameters are provided in the Examples presented herein below.

In some embodiments, the dope comprises a weight ratio of 5-90% (w/w) lignin to PVA. In some embodiments, the dope comprises PVA at a molecular weight of about 100-500 kg/mol, and further wherein the PVA is characterized by at least about 85% hydrolysis. In some embodiments, the dope is provided in a solution of about 80% DMSO to about 100% DMSO (v/v) in distilled water at about 60° C. to about 85° C. In some embodiments, the coagulation bath is maintained at a pre-set temperature that is between about −15° C. and about −30° C., optionally wherein the pre-set temperature is about −25° C. In some embodiments, the lignin/PVA fiber has an as-spun draw ratio of at least 2×. In some embodiments, the lignin has a minimum molecular weight of at least 2 kiloDaltons (kDa).

In some embodiments, the one or more components of the solvent include about 15% to about 50% methanol or about 50% to about 85% acetone. In some embodiments, the methanol is present at 15%, 20%, 25%, 30%, 35%, 40%, 45% or 85% by volume. In some embodiments, the acetone is present at 50%, 55%, 60%, 65%, 70%, 75%, 80% or 85% by volume.

In some embodiments, the method further comprises conditioning the dope at room temperature for a period of time prior to the adding step. In some embodiments, the period of time is at least two hours prior to the adding step.

In some embodiments, a method for preparing a lignin/polyacrylonitrile (PAN) fiber is provided. In some embodiments, the method comprises: aging a dope of lignin and :PAN in an aging bath, wherein the aging bath contains a solvent comprising one or more components, and further wherein the one or more components are present in the solvent in concentrations such that the hydrogen bonding character ($f_H$) of the solvent is between 40% and 60%, the polar character ($f_P$) of the solvent is between 15% and 30%, and the dispersive character ($f_D$) of the solvent is between 20% and 50%; and gel-spinning a lignin/PAN fiber from the aging bath, wherein a lignin/PAN fiber is produced. In some embodiments, the dope is aged for 12 hours to 15 days. In some embodiments, the hydrogen bonding character (fH) of the solvent is 40%, 41%, 42%, 43%, 44%, 45%, 46%, 47%, 48%, 49%, 50%, 51%, 52%, 53%, 54%, 55%, 56%, 57%, 58%, 59% or 60%. In some embodiments, the polar bonding character (fP) of the solvent is 15%, 16%, 17%, 18%, 19%, 20%, 21%, 22%, 23%, 24% 25%, 26%, 27%, 28%, 29% or 30%. In some embodiments, the dispersive character (fD) of the solvent is 20%, 21%, 22%, 23%, 24% 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49% or 50%. Other representative parameters are provided in the Examples presented herein below.

In some embodiments, a method for preparing a lignin/polyacrylonitrile (PAN) fiber comprises heating a dope of lignin and PAN to a desired temperature in a first solvent until the lignin and PAN are dissolved in the first solvent. Optionally, the first solvent is DMSO. In some embodiments, the method comprises aging the dope of lignin and PAN by allowing the dope to cool, optionally to about 18° C. to 25° C., further optionally allowing the dope to remain at about 18° C. to 25° C. for period of time. In some embodiments the period of time is at least about two hours. In some embodiments, the method comprises adding the dope of lignin and PAN to a coagulation bath that contains a solvent comprising one tor more components, and further wherein the one or more components are present in the solvent in concentrations such that the hydrogen bonding character ($f_H$) of the solvent is between 40% and 60%, the polar character ($f_P$) of the solvent is between 15% and 30%, and the dispersive character ($f_D$) of the solvent is between 20% and 50%. In some embodiments, the method comprises gel-spinning a lignin/PAN fiber from the bath, wherein a lignin/PAN fiber is produced. In some embodiments, the hydrogen bonding character (f H) of the solvent is 40%, 41%, 42%, 43%, 44%, 45%, 46%, 47%, 48%, 49%, 50%, 51%, 52%, 53%, 54%, 55%, 56%, 57%, 58%, 59% or 60%. In some embodiments, the polar bonding character (fP) of the solvent is 15%, 16%, 17%, 18%, 19%, 20%, 21%, 22%, 23%, 24% 25%, 26%, 27%, 28%, 29% or 30%. In some embodiments, the dispersive character (fD) of the solvent is 20%, 21%, 22%, 23%, 24% 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49% or 50%.

In some embodiments, the dope is aged for a period of time. In some embodiments, the period of time is at least about 2 hours at 18° C. to 25° C., optionally 18° C. to 22° C. In some embodiments, the desired temperature is about 85° C. In some embodiments, the method comprises transferring the dope to a pump, such as a pump having an orifice, after the lignin and the PAN are completely dissolved in the solvent and the dope is at the desired temperature. In some embodiments, the pump comprises a syringe having a needle, such as an 18-24 gauge needle. Metering pumps can be used, such as on a pilot and commercial scale for the production of multi-filament yarns.

In some embodiments, the PAN is present in the dope in an amount of about 10 to about 50 g/dL, optionally about 20 g/dL. In some embodiments, the dope comprises PAN at about 150 kDa and is prepared at about 80° C. to about 85° C. or comprises PAN at about 200-250 kDa and is prepared at about 60° C. to about 85° C. In some embodiments, the coagulation bath is maintained at about −5° C. In some embodiments, the lignin/PAN fiber has an as-spun draw ratio of at least 3×. In some embodiments, the dope comprises up to 30% PAN, a concentration of up to 20% g/dL PAN, and a weight ratio of up to 90% (w/w) lignin to PAN. In some embodiments, the dope comprises PAN at a molecular weight of about 150 kDa to about 300 kDa. In some embodiments, the dope is provided in a solution comprising DMSO, dimethyl acetamide (DMAc), dimethylforamide (DMF), and/or an alkanolamine. In some embodiments, the solution comprises 5-10% (w/w) alkanolamine, optionally monoethanolamine (MEA) or triethanolamine, to DMSO. In some embodiments, the dope is provided in an 80-100% (v/v) solution of DMSO in distilled water at about 80° C. to about 85° C. In some embodiments, the lignin has a minimum molecular weight of at least 2 kDa. In some embodiments, the solvent comprises about 25% isopropyl alcohol, about 50% methanol, and about 25% water. In some embodiments, the dope comprises a weight ratio of 10-90% (w/w) lignin to PAN. In some embodiments, the adding step comprises extruding the dope through an 18-24 gauge needle, the tip of which is about 0.5-8.0 cm above the top surface of the solvent present in the coagulation bath. In some embodiments, metering pumps can be used, such as on a pilot and commercial scale for the production of multi-filament yarns. In some embodiments, the solvent is maintained at a temperature of about -15° C. to about 5° C. Other representative parameters are provided in the Examples presented herein below.

In some embodiments, the method further comprises conditioning the dope at room temperature for a period of time prior to the adding step. In some embodiments, the period of time is at least two hours prior to the adding step.

EXAMPLES

The following Examples provide illustrative embodiments. In light of the present disclosure and the general level of skill in the art, those of skill will appreciate that the following Examples are intended to be exemplary only and that numerous changes, modifications, and alterations can be employed without departing from the scope of the presently disclosed subject matter.

Materials and Methods for Examples 1 to 6A

Materials. PVA, having a molecular weight of 146-186 kg/mol and 99% hydrolysis, was purchased from Sigma-Aldrich Corp., St. Louis, Mo. Aqueous raw pine sawdust lignin paste (project no. L28) at pH 3 was provided by Pure Lignin Environmental Technology (PLET; Kelowna, British Columbia, Canada). Lignin was extracted from wood pulp using a weak-acid hydrolysis treatment. Solvents were used as-received: dimethyl sulfoxide (DMSO) from Sigma-Aldrich and acetone and methanol from BDH Chemicals.

Spinning Dope Preparation. Aqueous PLET lignin paste was filtered to remove low molecular weight fractions. Lignin was extracted from the paste using acetone and vacuum filtration. Afterward, the lignin was dried at 85° C. for 24 hours and finely ground into powder using a mortar and pestle.

Spinning dopes of PVA and lignin/PVA were prepared. PVA powder (10 g) was dissolved in 100 mL of 80/20 (v/v) DMSO/distilled water under constant stirring at 85° C. for 1 hour. Lignin/PVA dopes, at weight ratios of up to 50% (w/w) lignin to polymer, were also dissolved in 80/20 (v/v) DMSO/distilled water at 85° C. The final concentration of PVA in the spinning dopes was 10 g/dL. The homogeneity of lignin/PVA dopes was inspected visually and optically with a Nikon Eclipse 50i POL optical microscope.

Figure 8:
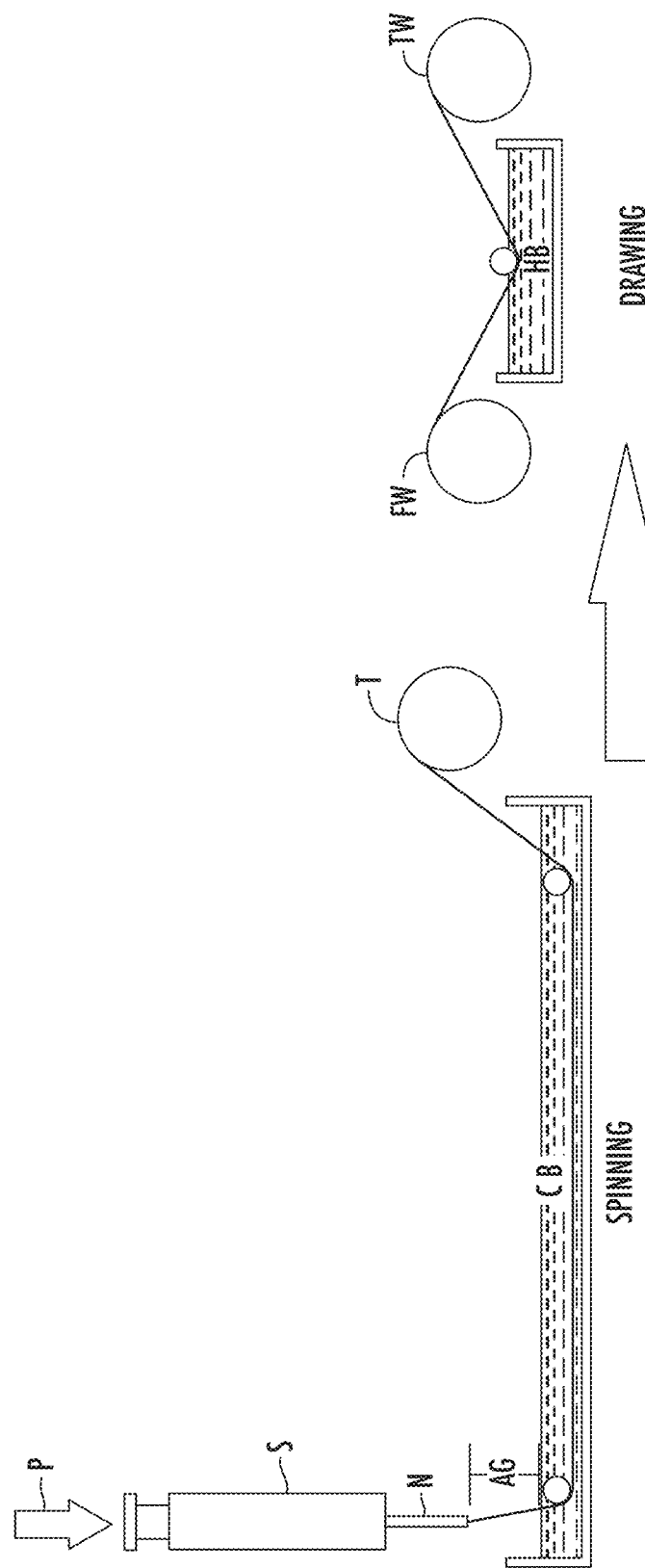
FIG. 8 is a depiction of an exemplary gel-spinning setup for lignin/PAN fibers. A conditioned lignin/PAN dope is provided in a syringe, which under pressure from a pump introduces the dope through a needle into the coagulation bath for spinning. There is an air gap of 0.5-8.0 cm between the tip of the needle and the surface of the solvent in the coagulation bath. After takeup of the fibers from the coagulation bath, they are fed into a hot bath for drawing.

Gel Spinning. Lignin/PVA dopes were dark brown in color. Optical micrographs of dopes having 0%, 5%, and 30% lignin showed homogeneous solutions that were absent of aggregation. This suggested that lignin and PVA were completely dissolved in DMSO/water, an ideal case for any type of solution spinning. A schematic of the gel-spinning process is shown in FIG. 8. The lignin/PVA spinning dopes were dispensed from a steel high-pressure syringe S. Pressure is applied to syringe S in the direction of arrow P. The syringe S was heated to 85° C. before extrusion of dopes through a 19-gauge syringe needle N (0.69 mm inner diameter). Afterward, the dope gelled in a −25° C. coagulation bath CB. The syringe tip to coagulation bath distance was 3-5 mm, shown as air gap AG in FIG. 8. Air gap AG can be angled. The resulting as-spun gel fibers were collected onto a rotating winder (takeup T in FIG. 8) and later immersed in the 5° C. coagulation bath for 24 hours. Fibers were drawn through one to four stages of a hot bath HB of silicone oil at elevated temperatures of 90-240° C. The draw ratio (DR) at each stage of fiber drawing was calculated as $$DR = \frac{V_2}{V_1} \quad (1)$$

where $V_1$ is the velocity of the fiber feeding winder (shown as FW in FIG. 8) and $V_2$ is the velocity of the fiber take-up winder (shown as TW in FIG. 8).

The coagulation baths contained mixtures of methanol and acetone. Lignin/PVA gelation (in particular the gel opacity) and lignin leaching were initially tested in 20 mL of solvent. Spinning dopes at 85° C. were added dropwise into −25° C. methanol/acetone mixtures. Gel opacity and lignin diffusion into the coagulant were observed after 10 minutes and 24 hours of aging the spinning dopes in −25 and 5° C. baths.

Figure 13:
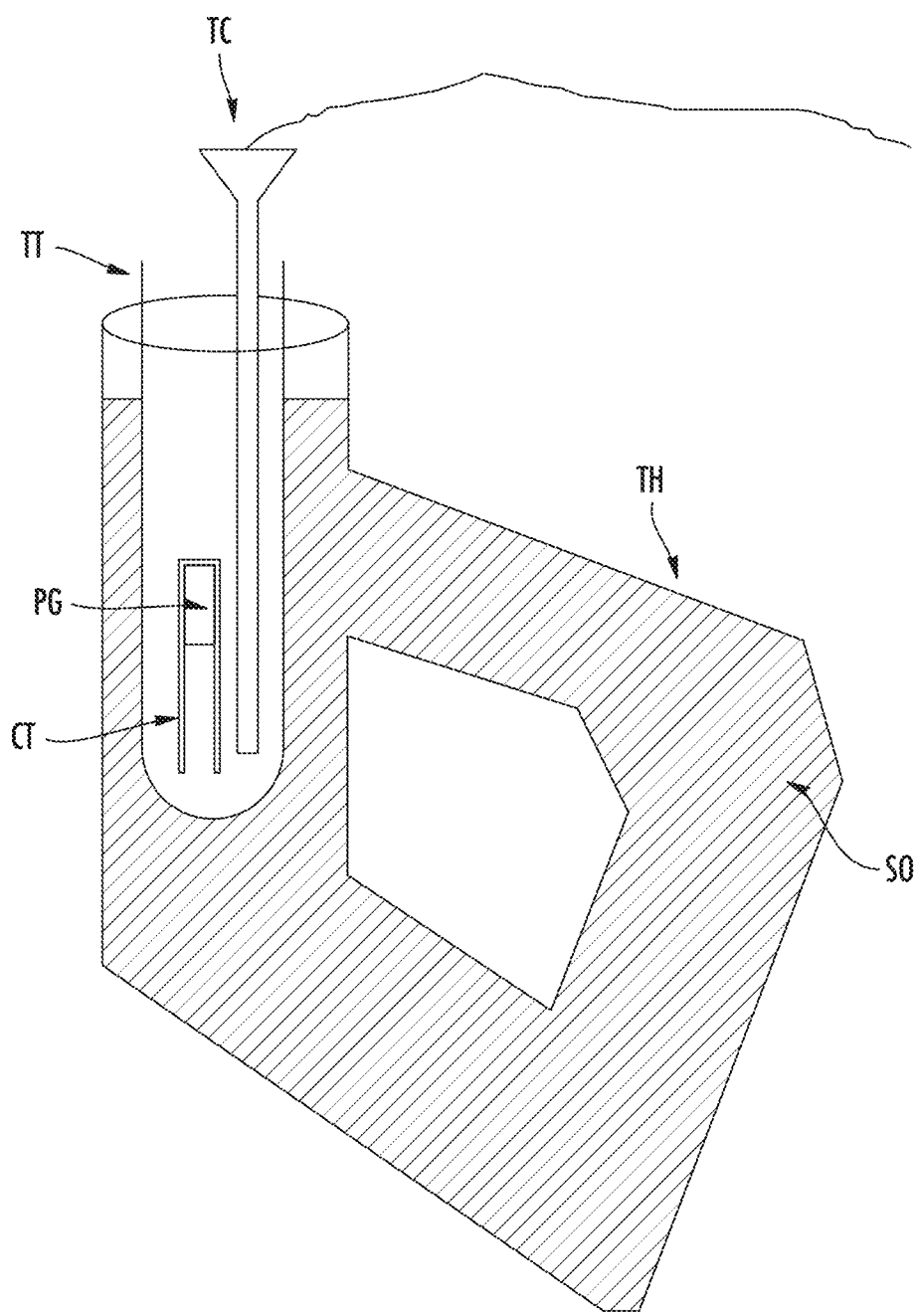
FIG. 13 is a schematic of a system used to measure gel melting of polymer gels.

PVA gels are thermoreversible. At elevated temperatures, they return to liquids of dissolved polymer. Gel melting points of lignin/PVA gels were measured according to the method described by Ryan & Fleischer (1965) The Gel Melting Point as a Measure of the Tacticity of Poly(Methyl Methacrylate). 69 *J Phys Chem* 3384-3400. Their test method was slightly modified as follows. Referring to FIG. 13, lignin/PVA dopes were loaded into capillary tubes CT having one end-capped and then were gelled in −25° C. 100% methanol and 15/85 methanol/acetone baths for 10 minutes. The capillary tube CT of the gelled polymer PG and a thermocouple TC were placed in a test tube TT that was positioned within the center of a Thiele tube TH. The Thiele tube TH filled with silicone oil SO was heated using a Bunsen burner (not shown in FIG. 13). The gel melting point was identified as the temperature at which the stationary gel transformed into a flowing liquid. The starting temperature of the transition and the temperature at which all gels were turned into liquid were recorded. The average of the two temperatures was calculated as the gel melting point. At least four gels from each lignin/PVA solution were tested.

Mechanical Testing. The mechanical properties of fibers were tested on the MTS-Q testing system according to ASTM D3379. Test parameters included a strain rate of 15 mm/min, a gauge length of 25 mm, and a sample size of 10. To normalize the data, the effective cross-sectional area A was calculated gravimetrically as:

$$A = d/\rho \quad (2)$$

where d is the linear density of the fiber and $\rho$ is the density of the composite fiber. Linear density was measured by weighing a known length of fiber. Before weighing, fibers that were hot-drawn in oil were rinsed with isopropyl alcohol to remove residual silicone oil. The density of composite fibers was determined using the expression:

$$\rho = \rho_{PVA}(1-w_f) + \rho_{lignin}w_f \quad (3)$$

where $w_f$ is the weight fraction of lignin. The densities of PVA ($\rho_{PVA}$) and lignin ($\rho_{lignin}$) are the same. Therefore, the composite fiber's density was $\rho = 1.3$ g/cm$^3$.

Tensile toughness ($U_t$) was calculated by integrating stress-strain curves, which represent the energy absorbed before fiber breakage, according to Equation (4):

$$U_t = \int \sigma_i \varepsilon_i \quad (4)$$

where $\sigma_i$ and $\varepsilon_i$ are the stress and strain, respectively, at each data point Imaging Analysis. Fibers were embedded in synthetic cork. Thin, perpendicular mounts revealed fiber cross-sectional areas that were later imaged using a LEXT OSL4000 3D measuring laser confocal microscope (Olympus Corp., Center Valley, Pa.

Fiber fracture tips from mechanical testing were sputter-coated with gold and imaged by scanning electron microscopy (SEM) using an FEI Verios 460L scanning electron microscope at an accelerating voltage of 2 kV.

Structural Characterization. Infrared spectra of as-received PVA powder, lignin powder, and lignin/PVA fibers were obtained using a Nicolet iS50 spectrophotometer. Spectra were collected at 128 scans and a spectral resolution of 4 cm$^{-1}$. The absorbance at 1144 cm$^{-1}$ represents symmetric C—C stretching along the polymer chain, wherein neighboring hydroxyl (—OH) groups engage in intramolecular hydrogen bonding.

Absorbance spectra of PVA were normalized to the peak intensity of the reference band at 854 cm$^{-1}$. The band at 854 cm$^{-1}$ (C—C stretching) was chosen as the reference band since its absorbance is not affected by processing. The percent crystallinity ($\alpha$) of the polymer was calculated using the following equation:

$$\alpha = \left(B + C\frac{A_{1144}}{A_{854}}\right) \times 100\% \quad (5)$$

where B and C are constants whose values were calculated from known values of a as determined by X-ray diffraction (see Tretinnikov & Zagorskaya (2012) Determination of the Degree of Crystallinity of Poly(Vinyl Alcohol) by FTIR Spectroscopy. 79 *J Appl Spectrosc* 521-526). The absorbances at 1144 cm$^{-1}$ ($A_{1144}$) and 854 cm$^{-1}$ ($A_{854}$) were obtained from infrared spectra (see Tretinnikov & Zagorskaya (2012) Determination of the Degree of Crystallinity of Poly(Vinyl Alcohol) by FTIR Spectroscopy. 79 *J Appl Spectrosc* 521-526). In Equation (5), the absorbance of crystalline PVA at 1144 cm$^{-1}$ is normalized by that of the reference band at 854 cm$^{-1}$. The $A_{1144}/A_{854}$ ratio is an index of fiber crystallinity, and values of this ratio were used to compare the relative crystallinities of the fibers.

Polarized Raman spectroscopy was used to quantify the molecular anisotropy of lignin embedded in lignin/PVA fibers. With a BaySpec Nomadic confocal Raman microscope, polarized spectra were collected parallel and perpendicular to the axis of fiber bundles (containing ~50 fibers). Fiber measurements were taken with a 10× objective lens and a 785 nm laser at 104 mW (based on the filter setting). The sample exposure time was 1 second with an acquisition number of 10.

Water Dissolution and Swelling. To investigate the water resistance of the composite fibers, 3 mg bundles of neat PVA, 5% lignin, and 50% lignin fibers were placed in 75 mL of water and gradually heated from room temperature to 100° C. on a hot plate. After immersion, fibers were imaged by confocal microscopy. Fiber swelling was tested among lignin/PVA fibers. Fiber bundles containing 0%, 5%, and 30% lignin were immersed in vials of distilled water for 24 hours at 25° C. Samples were taken from the vials, and excess water was removed with filter paper. The fiber swelling ratio (S) was calculated using Equation (6):

$$S = \frac{w_w - w_d}{w_d} \times 100\% \quad (6)$$

where $w_d$ is the weight of the dry fiber and $w_w$ is the weight of the fiber after wetting.

Example 1

Effect of the Methanol/Acetone Ratio on Lignin/PVA Gelation

In general, methanol facilitates PVA gelation. Wholly acetone coagulation baths were not optimum for PVA gelation. When exposed to acetone, neat PVA dopes turned opaque. PVA gels from acetone coagulation were brittle and less drawable than the transparent gels formed from PVA in chilled methanol. However, adding acetone to the methanol based coagulation bath was beneficial to lignin/PVA gelation. Lignin/PVA dopes were added dropwise into methanol/acetone mixtures with different volume ratios (see FIG. 10). Yellowing of the solvent mixture was indicative of lignin diffusion into methanol from the gel polymer. Because lignin is soluble in methanol and insoluble in acetone, more lignin diffused into the coagulation bath at higher methanol:acetone ratios, greater percentages of lignin/PVA, and longer coagulation times. Negligible amounts of leaching were observed among baths having more than 80% acetone by volume. Further, these lignin/PVA gels remained soft and flexible.

Figure 10:
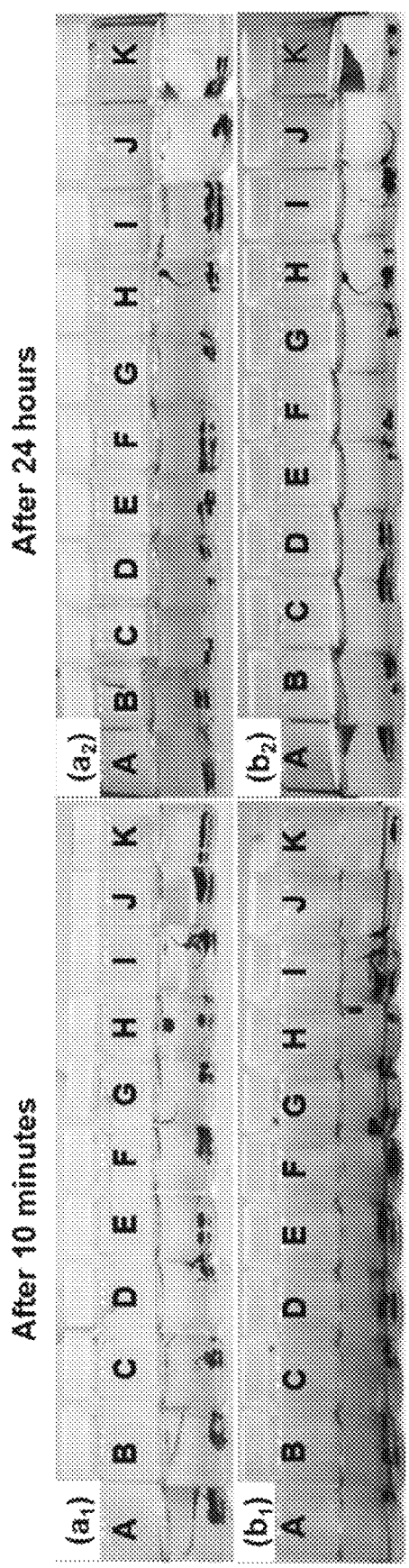
FIG. 10 is a series of photographs of coagulation of lignin/PVA dopes having 5% lignin ($a_1$ and $a_2$) and 50% lignin ($b_1$ and $b_2$) in (A) 100/0, (B) 90/10, (C) 80/20, (D) 70/30, (E) 60/40, (F) 50/50, (G) 40/60, (H) 30/70, (I) 20/80, (J) 10/90, and (K) 0/100 (v/v) methanol/acetone mixtures for 10 minutes at −25° C. ($a_1$ and $b_1$) and 24 hours at 5° C. ($a_2$ and $b_2$).
Figure 11:
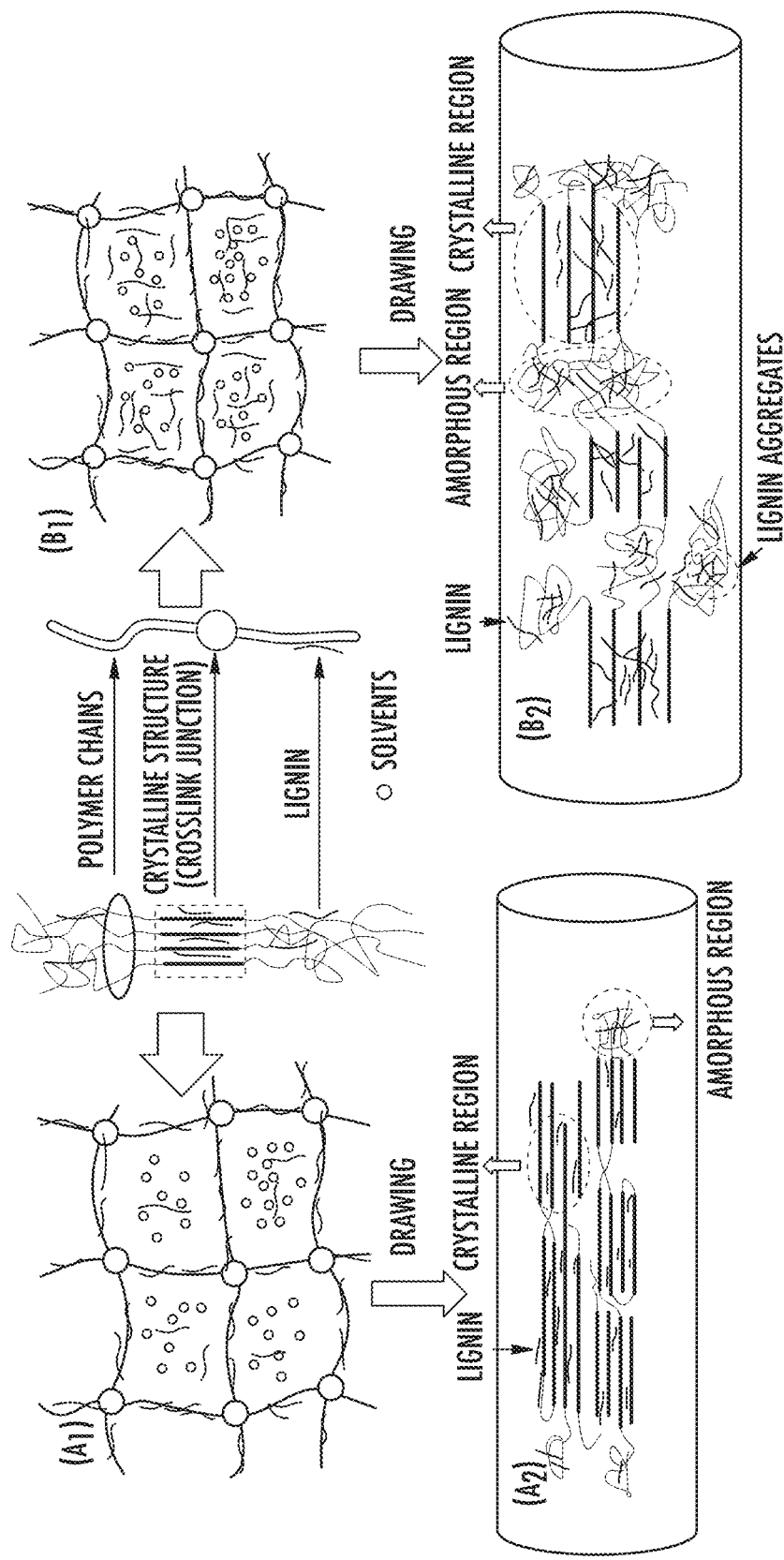
FIG. 11 is a schematic illustration of fiber microstructures at low ($a_1$ and $a_2$) and high ($b_1$ and $b_2$) lignin contents in as-spun gel fibers ($a_1$ and $b_1$) and gel-drawn fibers ($a_2$ and $b_2$).

Gel structures at low to high lignin content, as interpreted from the results in FIG. 10, are illustrated schematically in FIG. 11. At the onset of gelation, the polymer dope phase separates into polymer-rich and solvent-rich domains. Crystalline regions of PVA function as physical junctions for the gel network, and solvent domains are spaced throughout the network. On the basis of the observations in FIG. 10, lignin more readily diffused into methanol-rich coagulation baths at high weight percentages of lignin and high ratios of methanol/acetone in the bath. Therefore, lignin likely preferentially resided in polymer-rich domains at low lignin content. Once lignin had saturated the polymer-rich domains, it would then reside in solvent-rich domains of the gel network.

Acetone in the coagulation bath suppressed diffusion of lignin from both the polymer-rich and solvent-rich domains of the PVA gel into the coagulation bath. Even at high lignin content, 80-90% acetone in the bath maintained the higher amount of lignin in the gel structure.

Example 2

Effect of the Lignin Content on Gel Melting and Other Lignin/PVA Fiber Characteristics PVA fibers containing 0-50% lignin were coagulated in 100% methanol and 85% acetone/15% methanol baths, and as spun DR, total DR, effective diameters, and linear densities of the fibers were determined. The results are summarized in Table 2.

TABLE 2

Characteristics of PVA Fibers Containing 0-50% Lignin Spun from 100% Methanol and 85% Acetone/15% Methanol Coagulation Baths

| | Coagulation Bath | | | | | | | | |
|---|---|---|---|---|---|---|---|---|---|
| | 100% Methanol Bath | | | | | 85/15 Acetone/ Methanol Bath | | | |
| Lignin concentration | 0% | 5% | 10% | 15% | 20% | 5% | 20% | 30% | 50% |
| As Spun DR | 2.5 | 2.2 | 2.3 | 2.5 | 2.4 | 2.6 | 1.9 | 1.4 | 1.4 |
| Total DR | 7.6 | 7.8 | 9.0 | 8.2 | 10.1 | 14.7 | 16.0 | 17.5 | 20.6 |
| Effective diameter (µm) | 51.6 | 51.6 | 52.0 | 50.5 | 35.3 | 31.9 | 41.2 | 47.6 | 40.4 |
| Linear Density (dtex) | 27.2 | 27.2 | 27.6 | 26.0 | 12.7 | 10.4 | 17.3 | 23.1 | 16.7 |

Gel melting points were also determined for lignin/PVA fibers coagulated in 100% methanol and 85% acetone/15% methanol Baths. The results are presented in Table 3.

TABLE 3

Lignin/PVA Gel Melting Points in Response to 100% Methanol and 15%/85% Methanol/Acetone Coagulation Baths

| Lignin/PVA Gel | Gel Melting Temp (° C.) 100% Methanol/ 0% Acetone Bath | Gel Melting Temp (° C.) 15% Methanol/ 85% Acetone Bath |
|---|---|---|
| 0% Lignin | 101 ± 2 | 103 ± 3 |
| 5% Lignin | 108 ± 6 | 114 ± 4 |
| 30% Lignin | 111 ± 4 | 118 ± 5 |
| 50% Lignin | 119 ± 2 | 122 ± 2 |

On the basis of the data shown in Table 2, lignin effectively increased the melting temperature of gels coagulated in media of 100/0 and 15/85 methanol/acetone. Gels coagulated in 15/85 methanol/acetone exhibited even higher melting temperatures at the same lignin concentration. Therefore, higher temperatures were expected for the drawing of gel fibers produced from coagulation in 15/85 methanol/acetone. Crystalline regions in the gel structures affect the gel melting temperature. As shown in FIG. 11, lignin resides in semi-crystalline polymer-rich domains. Its presence enhanced the thermal resistance of PVA, thereby increasing the gel melting point of lignin/PVA gels. Coagulation in pure methanol reduced the lignin content in the gel fiber. As a result, gels formed in 100/0 methanol/acetone had lower gel melting temperatures than those formed in 15/85 methanol/acetone.

Example 3

Effect of the Coagulation Bath on Fiber Drawing

On the basis of the study of solvent systems for coagulation (see FIG. 10), the 15/85 methanol/acetone system was identified as a representative bath for lignin/PVA gelation. To understand the effect of the coagulating solvent on the processing of gel-spun fibers, parameters for lignin/PVA fibers that were drawn in 100/0 and 15/85 methanol/acetone baths are summarized in Table 3. The following discussion describes the effects of the coagulation bath, gel melting point, and lignin content on the drawing parameters. Changes in stage drawing temperature and draw ratio were observed. Overall, the total draw ratio of fibers increased with lignin content (Table 4).

lignin gel fibers (as represented by FIG. 11(b1)). At 15-20% lignin, the drawing temperature decreased from 100 to 90° C. for fibers containing 0-10% lignin.

Acetone in the 15/85 methanol/acetone coagulation bath precluded leaching of lignin into the gel-spinning bath and drawing oil. The as-spun draw ratio decreased with increasing lignin content among gels coagulated from 15/85 methanol/acetone baths. In contrast to pure methanol coagulation baths, more lignin would reside in the as-spun gels from 15/85 methanol/acetone baths. Since lignin remained in the thermally drawn fibers, the temperatures at consecutive stages of drawing were significantly higher for gel fibers coagulated in 15/85 methanol/acetone and with higher lignin content. Further, the stage 1 drawing temperature increased from 100 to 120° C. by 50% lignin, and the stage 1 draw ratio increased from 5.8 for 5% lignin to 8.5 for 50% lignin.

Higher values of the draw ratio at elevated temperatures were attributed to the plasticizing effect of lignin on PVA. Lignin has a lower molecular weight than PVA, and it can disrupt hydrogen bonding between PVA molecules. The glass transition temperature of lignin (Tg=120-150° C.) is expected to influence the fibers' molecular mobility at drawing temperatures close to Tg. As a result, the extension of matrix PVA chains was more feasible at higher temperatures.

TABLE 4

Drawing Parameters and Draw Ratio (DR) for Gel Spun Fibers

| | Coagulation Bath | | | | | | | | |
|---|---|---|---|---|---|---|---|---|---|
| | 100/0 Methanol/Acetone Bath | | | | | 15/85 Methanol/Acetone Bath | | | |
| Lignin concentration | 0% | 5% | 10% | 15% | 20% | 5% | 20% | 30% | 50% |
| As-spun DR | 2.5 | 2.2 | 2.3 | 2.5 | 2.4 | 2.6 | 1.9 | 1.4 | 1.4 |
| Stage 1 Temp (° C.) | 100 | 100 | 100 | 90 | 90 | 100 | 100 | 100 | 120 |
| Drawing DR | 4.2 | 4.0 | 4.0 | 4.0 | 3.3 | 5.8 | 6.8 | 7.0 | 8.5 |
| Stage 2 Temp (° C.) | 130 | 150 | 150 | 160 | 160 | 180 | 180 | 190 | 190 |
| Drawing DR | 1.4 | 1.5 | 1.5 | 1.5 | 2.1 | 1.7 | 1.5 | 1.5 | 1.4 |
| Stage 3 Temp (° C.) | 180 | 180 | 190 | 190 | 220 | 210 | 210 | 210 | 225 |
| Drawing DR | 1.3 | 1.3 | 1.5 | 1.4 | 1.5 | 1.3 | 1.3 | 1.4 | 1.5 |
| Stage 4 Temp (° C.) | N/A | N/A | N/A | N/A | N/A | 230 | 230 | 230 | 240 |
| Drawing DR | N/A | N/A | N/A | N/A | N/A | 1.2 | 1.2 | 1.2 | 1.2 |
| Total Heat DR | 7.6 | 7.8 | 9.0 | 8.2 | 10.1 | 14.7 | 16.0 | 17.5 | 20.6 |
| Effective diameter (μm) | 52 | 52 | 52 | 51 | 35 | 32 | 41 | 48 | 40 |
| Linear Density (dtex) | 27 | 27 | 27 | 26 | 13 | 10 | 17 | 23 | 17 |

N/A: Not Applicable: methanol coagulated fibers melted and relaxed at higher temperatures
Total Heat DR: cumulative draw ratio from stages 1 to 4

Fibers were drawn in multiple stages after gel formation in 100/0 methanol/acetone. During stage 1 drawing, the gel fibers solidify. In general, most of the imbibed solvent diffuses from the gel fibers into the high-temperature oil bath. The stage 1 drawing temperature decreased from 100 to 90° C. for gel fibers coagulated in pure methanol as the lignin concentration increased above 10% lignin to polymer. Further, the stage 1 draw ratio decreased with additional lignin. The draw ratio also increased with lignin content during stages 2 and 3 heat drawing after 100/0 methanol/acetone coagulation.

On the basis of the results from the gel melting study (Table 1), the stage 1 drawing temperature was expected to increase with lignin content. Lower drawing temperatures were also expected for 100/0 methanol/acetone-coagulated gel fibers. Lignin leached into the 100/0 methanol/acetone bath and stage 1 drawing oil from structures of 15-20%

Example 4

Effect of the Coagulation Bath on the Fiber Mechanical Properties

The effect of the coagulation solvent on the tensile strength and Young's modulus of lignin/PVA fibers (up to 50% lignin) is shown in FIGS. 1A and 1B. Neat PVA fibers were spun using 100/0 methanol/acetone coagulation; however, it was not possible to spin neat PVA fibers using 15/85 methanol/acetone coagulation. Acetone is attributed with turning the neat PVA gel fibers opaque and making them too brittle for spinning.

Figure 3:
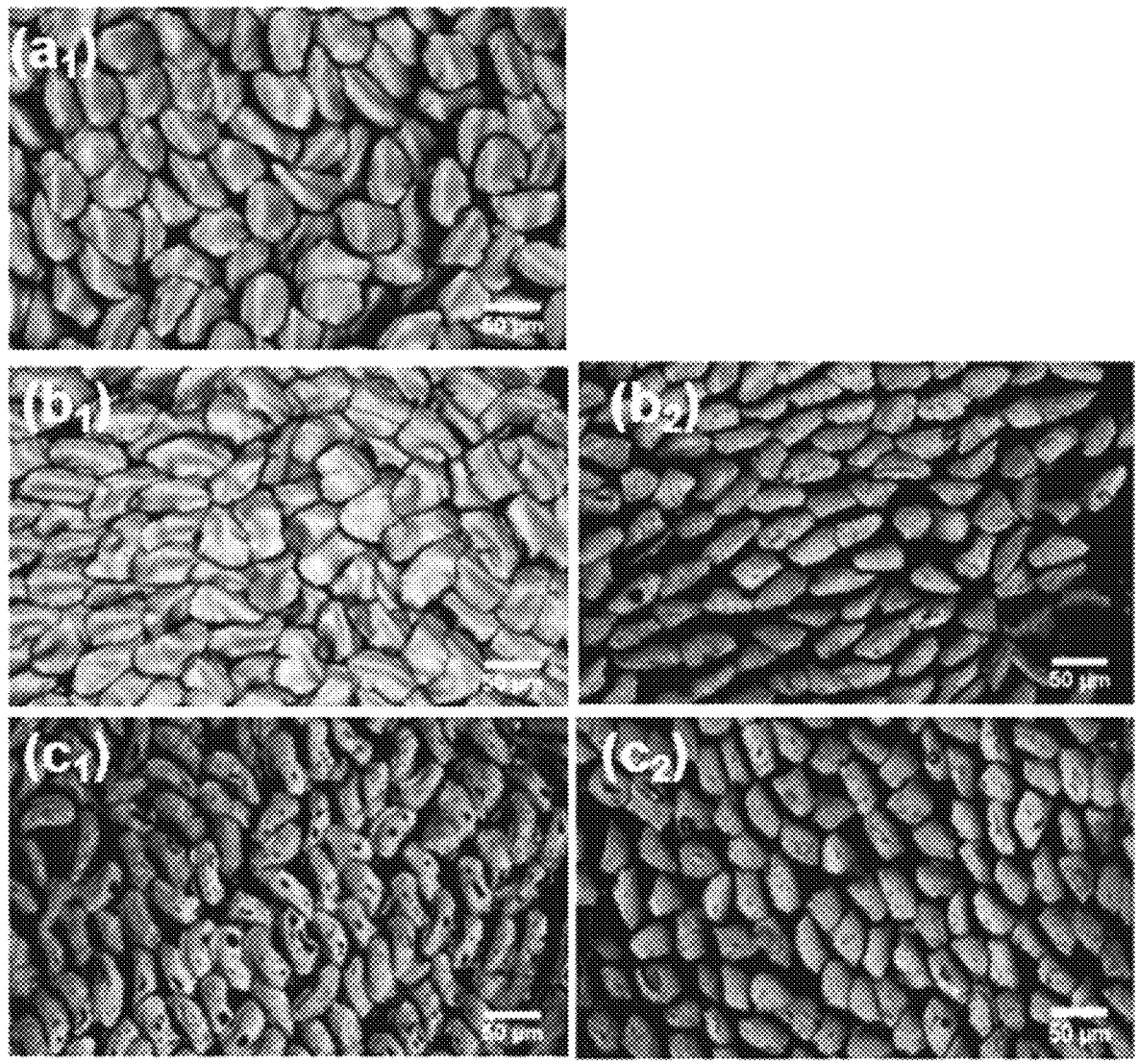
FIG. 3 is a series of confocal micrographs of cross sections of lignin/PVA fibers at different lignin concentrations in two different coagulation baths. ($a_1$): 0% lignin spun from a 100% methanol coagulation bath; ($b_1$): 5% lignin spun from a 100% methanol coagulation bath; ($b_2$): 5% lignin spun from a 15% methanol/85% acetone coagulation bath; ($c_1$): 20% lignin spun from a 100% methanol coagulation bath; ($c_2$): 20% lignin spun from a 15% methanol/85% acetone coagulation bath.

As the lignin content increased in the 100/0 methanol/acetone-coagulated fibers, lignin did aid fiber strengthening among some PVA fibers (FIG. 1A). The maximum tensile strength was 0.61 GPa at 5% lignin, and the maximum modulus was 24 GPa at 10% lignin. Higher lignin concentrations did not yield further increases in fiber mechanical performance. Instead, the fiber properties diminished drastically to a tensile strength of 0.37 GPa and a Young's modulus of 11 GPa with 20% lignin. Voids were observed throughout the fiber cross sections of 20% lignin fibers that were coagulated in 100/0 methanol/acetone (FIG. 3).

Fibers from 15/85 methanol/acetone coagulation had significantly better mechanical properties than those from 100/0 methanol/acetone coagulation (FIGS. 1A and 1B). The average tensile strength and Young's modulus for 5% lignin fibers were 1.1 and 37 GPa, respectively, which exceeded those of commercially available high-strength Kuralon PVA staple fiber (0.88 and 23 GPa, respectively). Above 5% lignin, the fibers exhibited poorer mechanical properties. The tensile strength values were 0.74 GPa for 20% lignin, 0.77 GPa for 30% lignin, and 0.76 GPa for 50% lignin. The Young's modulus was in the range of 31-36 GPa, which is still higher than that of commercial Kuralon PVA staple fiber from Kuraray.

The mechanical properties of fibers from 15/85 methanol/acetone coagulation were superior to those from 100/0 methanol/acetone coagulation for the following reasons. The 15/85 methanol/acetone bath suppressed lignin leaching during gelation and fiber drawing. At 20% lignin, voids were not observed in the fiber cross sections of 15/85 methanol/acetone-gelled fibers. Further, gel fibers from the 15/85 methanol/acetone bath were more drawable. The total draw ratios for 15/85 methanol/acetone fibers were higher than those for 100/0 methanol/acetone fibers (see Table 2). Higher fiber draw ratios typically facilitate polymer chain alignment along the fiber axis for better mechanical performance. Furthermore, molecular interactions between lignin and the matrix polymer can disrupt hydrogen bonding between the PVA chains, so lignin plasticizes PVA's mobility during high-temperature drawing.

Figure 2:
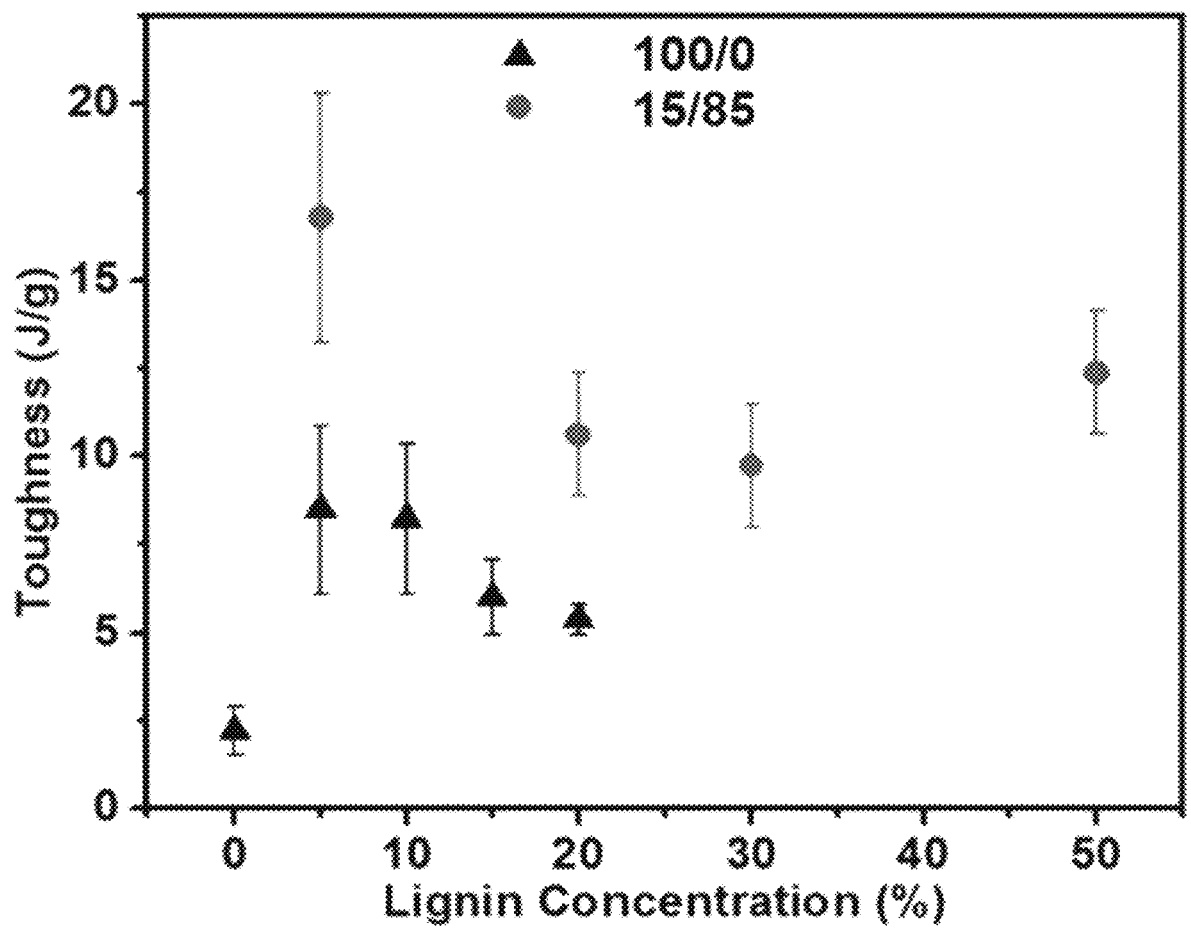
FIG. 2 is a plot of toughness of lignin/PVA fibers having increasing amounts of lignin that were coagulated in 100% methanol/0% acetone (▲) or 15% methanol/85% acetone (●).

The effect of the coagulation bath on lignin/PVA fiber toughness is shown in FIG. 2. Characteristics of tough fibers include high strength and ductility. The strain at break values for all of the lignin/PVA fibers ranged between 3.1% and 4.2% regardless of the coagulation bath.

The lignin/PVA fibers were tougher than neat PVA fibers, as observed for fibers from pure methanol coagulation. Coagulation from 15/85 methanol/acetone yielded tougher fibers than those obtained from wholly methanol baths. A maximum toughness value of 8.5 J/g was observed at 5% lignin upon 100/0 methanol/acetone coagulation. An even higher value of 17 J/g was obtained for 5% lignin fibers upon 15/85 methanol/acetone coagulation. As the lignin content increased, the toughness slightly decreased. Toughness values of 10-12 J/g were reported at 20-50% lignin with 15/85 methanol/acetone coagulation, values that are greater than that of graphene oxide reinforced PVA composites (6 J/g). The toughness value of 12 J/g for 50% lignin fiber was greater than those at 20-30% lignin, although the tensile modulus at 50% lignin was less than the values at those lower weight fractions. Upon incorporation of lignin at 50% of the matrix polymer, its rigid structure increased the fiber toughness. A discussion of fiber morphology is used below to explain the apparent differences in mechanical performance.

Example 5

Effect of Lignin on Fiber Morphology

Neat PVA and 5% lignin fibers obtained from 100/0 methanol/acetone coagulation were smooth and had round cross sections. At higher lignin contents, the fiber cross sections were less circular (FIG. 3) as a result of non-uniform solvent removal. Kidney bean-shaped cross sections were observed among fibers having 20% lignin obtained from coagulation in 100/0 methanol/acetone. Similarly, 15/85 methanol/acetone coagulation also resulted in kidney-bean-shaped fibers. At 5% lignin, fibers from coagulation in 15/85 methanol/acetone were finer than fibers from the 100/0 methanol/acetone bath. Gel fibers from 15/85 methanol/acetone had higher total draw ratios and lower values of linear density (Table 2), which correspond to smaller diameter fibers. The coagulation solvent and lignin content affected solvent removal from gel-spun fibers. Solvent removal occurred in the coagulation bath and high-temperature drawing oil. Voids throughout the fiber cross section of 20% lignin fibers had resulted in significant losses in mechanical performance (FIG. 1A). These voids were likely caused by the high content of lignin in the solvent-rich domains of the gel fiber (FIG. 11($b1$)), which was followed by the aggressive diffusion of lignin from the as-spun gel to methanol and from the gel fiber to the high-temperature drawing oil.

Fibers having 20% lignin obtained from 15/85 methanol/acetone coagulation were finer than the 20% lignin fibers obtained from 100/0 methanol/acetone. Also, their fiber cross sections were rougher and without voids. Methanol/acetone coagulation suppressed voiding and enabled better mechanical performance (FIG. 3). The reduction in mechanical performance among 15/85 methanol/acetone-coagulated fibers having more than 20% lignin was caused by other differences in fiber morphology, namely, lignin aggregation.

After mechanical testing, fiber fracture tips were imaged by SEM. Neat PVA fibers showed a smooth fracture tip. Its microstructure contrasts with the fibrillar, more ductile fracture tip of 5% lignin fibers. PVA fibrils are associated with highly oriented and ordered chains of polymer.

The fibrillar micro-structure appeared as a result of lignin plasticization and is responsible for the good mechanical properties. PVA fibrils were noticeable among 30% lignin fibers. At 50% lignin, the fibers were less fibrillar, and lignin aggregation (in the form of small beads) was observed at high resolution. Lignin aggregation is attributed to its concentration within polymer-poor domains of the gel fiber at high lignin content (FIG. 11($b1$)). As a result, lignin was not homogeneously dispersed throughout the polymer. In summary, lignin promoted the formation of fibrillar PVA at high fiber draw ratios; however, lignin aggregates included some structural defects that decreased the mechanical performance of fiber at more than 20% lignin.

Example 6A

Effect of Lignin Content on Fiber Microstructure

Since 15/85 methanol/acetone coagulation yielded the highest values of mechanical performance, the effect of the lignin content on PVA crystallization was investigated by IR spectroscopy. Amorphous PVA is associated with the C—O vibrational mode at 1094 cm$^{-1}$, and PVA crystallinity affects the peak at 1144 cm$^{-1}$.

The value of the $A_{1144}/A_{854}$ ratio is an index of fiber crystallinity (see Table 5). After gel fiber spinning, the crystallinity of PVA fiber was greater than for the as-received powder. Fiber drawing caused dense packing of the polymer chains. The highest degree of crystallinity occurred at 5% lignin, but the PVA crystallinity decreased from this value at more than 20% lignin. Fibers having 30% lignin were slightly more crystalline than those containing 20 and 50% lignin. However, lignin aggregation and phase separation from PVA, as observed among fiber fracture tips, was detrimental to the properties and crystallinity of PVA fibers. These trends in fiber crystallinity agree with changes in the mechanical properties of lignin/PVA fibers from 15/85 methanol/acetone coagulation (FIGS. 1A and 1B).

TABLE 5

Lignin/PVA Fiber Crystallinity as Indicated by the $A_{1144}/A_{854}$ Infrared Absorbance Ratio

| Material[a] | $A_{1144}/A_{854}$ |
|---|---|
| PVA powder | 2.92 |
| neat PVA fiber | 3.34 |
| 5% lignin/PVA | 4.67 |
| 20% lignin/PVA | 2.88 |
| 30% lignin/PVA | 2.98 |
| 50% lignin/PVA | 2.60 |

[a]Neat PVA fiber was fabricated from 100/0 methanol/acetone coagulation, and 5-50% lignin/PVA fibers were obtained from 15/85 methanol/acetone coagulation.

Intermolecular bonding between lignin and PVA induces molecular adhesion. The IR absorbance spectrum from 3000 to 3700 $cm^{-1}$ provided insight into hydrogen bonding for lignin powder (3384 $cm^{-1}$) and PVA (3345 $cm^{-1}$). Among 5% lignin fibers, the —OH band shifted toward lower frequencies of 3333 $cm^{-1}$. This behavior was suggestive of hydrogen bonding between lignin and PVA. As a result, 5% lignin exhibited better mechanical performance and a fibrillary morphology. At high lignin contents, the peak positions were 3347 $cm^{-1}$ for 20% lignin, 3342 $cm^{-1}$ for 30% lignin, and 3360 $cm^{-1}$ for 50% lignin. Those wave-numbers are associated with less intermolecular bonding between lignin and PVA.

Example 6B

Properties and Structural Anisotropy of Gel-Spun Lignin/Poly(Vinyl Alcohol) Fibers Due to Gel Aging In this Example, gel-fibers were aged in chilled solvents prior to fiber drawing to assess the mechanical properties and molecular anisotropy of gel-spun lignin/PVA fibers. Fibers, containing 5 and 30% lignin to PVA, were spun from gel-fibers aged in 25/75 (v/v) water/acetone for up to 30 days at 5° C. The best values of mechanical performance were obtained from 5% lignin fibers, where the average tensile strength was 1.4 GPa after 1 day of gel aging in water/acetone. After 14 days of aging 5% lignin fiber, the Young's modulus was 54 GPa and toughness was 25 J/g. Gel containing 30% lignin yielded high mechanical properties after 30 days of aging; however, some lignin gradually diffused into the aging solvent. The strongest fibers had the highest degrees of crystallinity and molecular anisotropy among PVA and lignin functional groups. Interestingly, one day of 25/75 water/acetone aging greatly improved the molecular alignment of lignin benzyl groups (Herman's orientation factor f=0.5) than previously reported with 15/85 methanol/acetone aging (f=0.1). Overall, gel aging studies revealed the influential role of aging solvents and time on the mechanical performance and structure of gel spun lignin/PVA fibers.

Improving the intermolecular compatibility between lignin/PVA and the molecular alignment of lignin are necessary advances in fiber structure to ultimately achieve high performance among lignin-based fibers. To overcome these structural impediments, the gel aging technique was applied during the gel-spinning of lignin/PVA to enhance the overall fiber structure and properties. In this Example, the objective of aging lignin/PVA gel-fibers in an aqueous aging bath was to develop highly extensible gel-structures that are conducive to fiber drawing at even higher draw ratios. The mechanisms by which aging solvents affect the gel-structure and drawability of lignin/PVA fibers are examined and discussed. Neat PVA fibers would require a different system of coagulation and aging solvents for optimum gel-spinning from than lignin/PVA fiber. Particularly, this Example focuses on the application of gel aging towards the gel spinning of lignin/PVA fiber at 5 and 30% lignin. Since 5% lignin fiber previously yielded the highest value of mechanical performance (Lu et al., *ACS Sustainable Chemistry & Engineering* 2017, 5 (4), 2949-2959), the processing and properties of 5% lignin fibers were benchmarks for 30% lignin fibers. The effect of gel aging time in a particular bath on fiber draw ratio was studied. In consequence to gel-fiber drawing, fiber structure was characterized in terms of lignin/polymer compatibility, polymer crystallinity, and the molecular anisotropy of lignin and PVA functional groups. Differences between the mechanical properties of fibers were attributed to gel processing and gel-drawn fiber structure.

Experimental Section

Materials

Atactic PVA (having a molecular weight of 146-186 kg/mole and 99% hydrolysis) was purchased from Sigma Aldrich. Aqueous paste of raw pine sawdust lignin at pH 3 was provided by Pure Lignin Environmental Technology (PLET), LLC. Solvents were used as-received: dimethyl sulfoxide (DMSO from Sigma Aldrich), acetone and methanol (both from BDH Chemicals), and distilled water.

Spinning Dope Preparation

Lignin pastes were dried at 80° C. for 24 h in an oven and later were washed with water to remove water soluble impurities (low molecular weight lignocellulosic derivatives and salts). Filtered lignin was then rinsed with acetone, and filtered under vacuum at least three times. After filtering, lignin was oven dried at 80° C. for 24 h, and then ground into powder with mortar and pestle. Spinning dopes contained lignin/PVA at 5 and 30% (weight/weight, w/w) lignin to polymer, and PVA at 10 g/dL. 10 g of PVA powder were dissolved in 80 mL of 60/20 (v/v) DMSO/water, and lignin was dissolved in 20 mL DMSO at 85° C. under constant stirring. After ~1 hour (h) of dissolution, PVA/DMSO/water was combined with lignin/DMSO.

Gel Spinning Process

Figure 17:
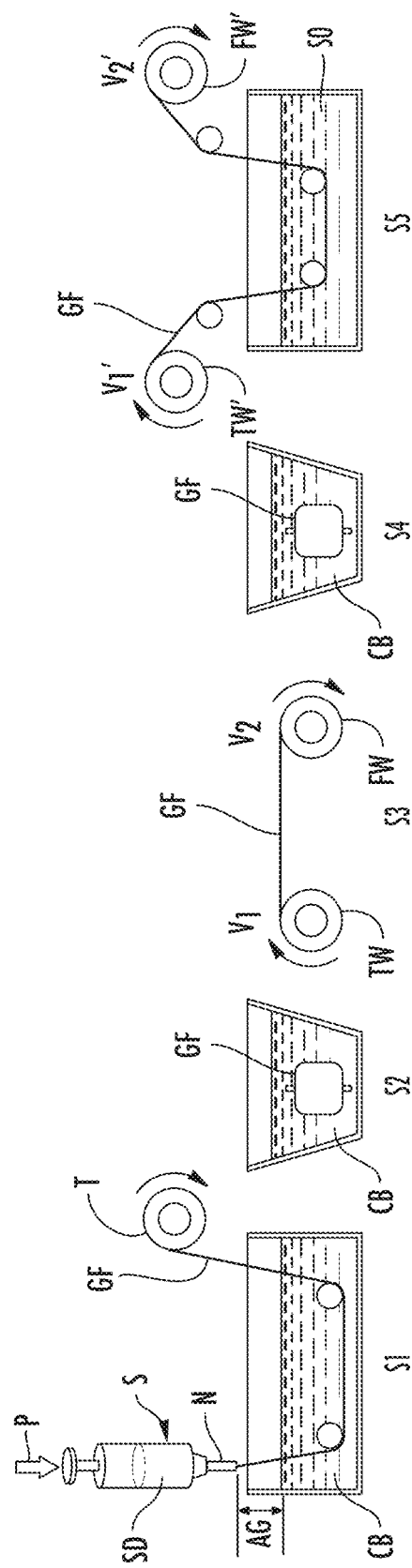
FIG. 17 is a depiction of an exemplary gel-spinning setup for Example 6B. Gel spinning of fibers is shown as five steps: as-spun gel formation (Step S1), aging of gel-fibers (Step S2), cold drawing of gel-fibers (Step S3), conditioning of cold drawn gel-fibers (Step S4) and multi-stage thermal drawing of fibers (Step S5).

The gel-spinning process is illustrated schematically in FIG. 17. In Step S1, gel-fiber formed in 15/85 (v/v) methanol/acetone spinning bath at −20° C. 15/85 methanol/acetone was used to form gel, while minimizing the leaching of lignin from gel-fiber, as described in Lu et al., *ACS Sustainable Chemistry & Engineering* 2017, 5 (4), 2949-2959. Negligible amounts of lignin leached in baths having more than 80% acetone.

In Step S2, as-spun gel-fiber GF undergoes aging in either 15/85 methanol/acetone for 1 day (Lu et al., *ACS Sustainable Chemistry & Engineering* 2017, 5 (4), 2949-2959) or chilled 25/75 water/acetone solvent for 1, 14 and 30 days at 5° C. Water/acetone aging solvent was expected to yield clear and highly stretchable gel-fibers, while preventing lignin leaching from gel-fiber during aging. Acetone suppresses lignin migration into the aging solvent (Lu et al., ACS Sustainable Chemistry & Engineering 2017, 5 (4), 2949-2959), whereas water relaxes PVA gel-structures to yield highly drawable fibers (Tanigami, T.; et al., *Journal of Materials Science* 1995, 30 (20), 5110-5120) at low temperature.

In Step S3, aged gel-fiber was drawn without heating fibers above ambient conditions. After conditioning cold drawn fibers GF in the coagulation bath CB (Step S4), gel-fiber was drawn into dense, solid fibers using multiples stages of drawing at consecutively higher temperatures (Step S5).

As shown in FIG. 17, a steel high-pressure syringe S was filled with 50 mL of each lignin/PVA spinning dope SD and then heated to 85° C. using the 120 V heating belt. Pressure is applied to syringe S in the direction of arrow P. Spinning dopes were extruded through the 19-gauge (0.69 mm inner diameter) syringe needle N. The distance, air gap AG, between syringe tip and coagulation bath CB varied between 3-5 mm. As-spun gel-fiber GF was collected onto a rotating winder T; then spools of gel-fiber GF were aged. Gel-fibers were aged either in 15/85 methanol/acetone for 1 day or in 25/75 water/acetone for up to 30 days at 5° C. (FIG. 17). As shown in Table 6, sample names were assigned to each fiber aged in solvent systems for up to 30 days.

TABLE 6

Gel Aging Conditions of Fibers

| | Lignin Content | | | | | | |
|---|---|---|---|---|---|---|---|
| | 5% | | | 30% | | | |
| | Aging Solvent | | | | | | |
| | 15/85 Methanol/ Acetone | 25/75 Water/Acetone | | | 15/85 Methanol/ Acetone | 25/75 Water/Acetone | | |
| Aging Time at 5° C. (day) | 1 | 1 | 14 | 30 | 1 | 1 | 14 | 30 |
| Sample Name | 5L1D' | 5L1D | 5L14D | 5L30D | 30L1D' | 30L14D | 30L14D | 30L30D |

Gel-fibers GF aged in 25/75 water/acetone for up to 30 days were cold drawn in Stage S3. After cold drawing, drawn gels were immersed in 15/85 methanol/acetone bath CB for 24 h at 5° C. (since 15/85 methanol/acetone maintained gel elasticity and lignin within polymer). Gel-fibers aged in 15/85 methanol/acetone for 1 day (5L1D' and 30L1D') were directly hot drawn in Step S5.

During Step S5, fibers GF were drawn in four stages at consecutively higher temperatures (between 100-230° C.) in silicone oil SO. For each stage of drawing, draw ratio (DR) was calculated by Equation 1:

$$DR = \frac{V_2}{V_1} \quad (1)$$

where $V_1$ and $V_2$ refer to the velocity of feeding winder FW and take-up winder TW winders, respectively (FIG. 17, Step S3, S5, $V_2 > V_1$) ($V_1'$ and $V_2'$ represent the velocity of feeding winder FW' and take-up winder TW', respectively (FIG. 17, Step S5; $V_2' > V_1'$)). Fibers were thermally drawn in four consecutive stages until fully drawn fibers were obtained (Step S5).

Mechanical Testing

The mechanical properties of lignin/PVA fibers were tested on the MTS-Q according to ASTM D 3379. At least 10 specimens were tested at a displacement rate of 15 mm/min and gauge length of 25 mm. Stress-strain curves were prepared from load data that was normalized by values of fiber cross-sectional area, A. Parameter A was determined gravimetrically from Equation 2:

$$A = \frac{d}{\rho} \quad (2)$$

d is the linear density of lignin/PVA fiber and ρ is the volumetric density of composite fibers. Drawn fibers were washed in isopropyl alcohol to remove silicone oil residues. Afterwards, the linear density, d, of lignin/PVA fiber was calculated by weighing the mass of 30 cm of fiber. The volumetric density of composite fibers was derived from Equation 3:

$$\rho = \rho_{PVA}(1-w_l) + \rho_{lignin} w_l \quad (3)$$

where $w_l$ is the weight fraction of lignin in fiber. Since PVA ($\rho_{PVA}$) and lignin ($\rho_{lignin}$) have the same values of ρ (Luo, J.; et al., *Construction and Building Materials* 2013, 49, 766-771; Hu, T. Q. *Chemical Modification, Properties, and Usage of Lignin,* Springer US: 2012), the theoretical density of lignin/PVA fiber is ρ=1.3 g/cm³.

Values of tensile toughness ($U_t$) were integrated from stress-strain curves, as expressed by Equation 4:

$$U_t = \int \sigma_i \varepsilon_i \quad (4)$$

where $\sigma_i$, $\varepsilon_i$ represent stress and strain values at each data point, respectively. $U_t$ represents the energy absorbed until the fiber breaks (Song et al., *ACS Macro Letters* 2013, 2 (12), 1100-1104).

Image Analysis of Fiber Structure

From the analysis of fiber fracture tips, micrographs can show compatibility between matrix polymer and lignin, plasticity of fiber fracture and microscale fibrillation. Fracture tips from mechanical testing were sputter coated with 60/40 (w/w) gold/palladium and imaged by the FEI Verios 460L Scanning Electron Microscopy (SEM) at 2 kV accelerating voltage.

Fibers embedded in cork were thinly sliced perpendicular to the fiber axis to prepare fiber cross-sections. Images of fiber cross-sections were captured on the LEXT OSL4000 3D measuring laser confocal microscope. The circularity index (CI) was determined from the ratio of cross-sectional area, A, and fiber circumference, C, in Equation 5 (Diao, et al., *Journal of Wood Science* 1999, 45 (2), 98):

$$CI = \frac{4\pi A}{C^2} \quad (5)$$

Image J software was used to measure parameters A and C from 20-30 fibers. CI is 1.0 for perfect circle.

Fiber Structural Analysis by Diffraction and IR Spectroscopy

Aged gel-fibers were freeze-dried before measuring their crystallinity by wide angle X-ray diffraction (WAXD). Freeze-drying was used to maintain their physically adjoined network structure upon solvent removal. Post aging, gel-fiber was freeze-dried at −50° C. and vacuum pressure of 0.625 mBar for 4 h in the Labconco® FreeZone 1 freeze dryer.

Diffractograms of freeze-dried gel-fibers and thermally drawn fibers were collected on the Rigaku Smartlab X-ray Diffractometer using Cu Kα radiation ($\lambda$=1.541 Å), voltage of 40 kV, and operating current of 44 mA. Aligned fiber bundles of 20-30 fibers were scanned at a step size of 0.05° between 5-40° 2θ. WAXD patterns were normalized at 2θ of 19.6°. Crystal size (CS) was calculated from Scherrer's equation (in Equation 6):

$$CS = \frac{k\lambda}{\beta \cos\theta} \quad (6)$$

where β is the full width at half maximum of intensity, θ is the Bragg's diffraction angle and k has a constant value of 0.89 (Dubey, P. K.; et al., *Microsystem Technologies* 2008, 14 (8), 1165-1171; Patel, A. K.; et al., *Microsystem Technologies* 2014, 20 (1), 41-49.

Deconvolution of WAXD patterns was performed by Origin Pro 8 software and the percent crystallinity (Xc) of fiber was calculated from peak areas due to crystalline (Ac) and amorphous (Aa) regions (Equation 7)(Minus, M. L.; et al., *Polymer* 2006, 47 (11), 3705-3710):

$$Xc(\%) = \left(\frac{Ac}{Ac+Aa}\right) \times 100\% \quad (7)$$

Spectroscopy was used to characterize the molecular interactions and conformations within thermally drawn fibers. Fiber crystallinity and molecular anisotropy were quantified. IR spectra were obtained on the NICOLET iS50 spectrophotometer using 128 scans and spectral resolution of 4 cm$^{-1}$. In conjunction with WAXD, infrared (IR) spectroscopy was used to measure fiber crystallinity.

IR absorbance spectra in the range of 3000-3700 cm$^{-1}$ were used to study inter- and intramolecular hydrogen bonding that involved PVA and lignin hydroxyl (—OH) groups. The absorbance peak for symmetric C—C stretching (Tadokoro, H., et al., *Journal of Polymer Science* 1957, 26 (114), 379-382) at 1144 cm$^{-1}$, where neighboring hydroxyl groups form intramolecular hydrogen bonding (Mallapragada, S. K.; Peppas, N. A. Dissolution Mechanism of Semicrystalline Poly(vinyl alcohol) in Water. *Journal of Polymer Science Part B: Polymer Physics* 1996, 34 (7), 1339-1346), is related to PVA crystallinity. IR spectra were normalized according to the peak intensity of reference band 854 cm$^{-1}$ (C—C stretching)(Mallapragada, S. K., et al., *Journal of Polymer Science Part B: Polymer Physics* 1996, 34 (7), 1339-1346; Tretinnikov, O. N.; Zagorskaya, S. A. Determination of the Degree of Crystallinity of Poly(vinyl alcohol) by FTIR Spectroscopy. *Journal of Applied Spectroscopy* 2012, 79 (4), 521-526; Peppas, N. A. Infrared Spectroscopy of Semicrystalline Poly(vinyl alcohol) Networks. *Die Makromolekulare Chemie* 1977, 178 (2), 595-601), whose absorbance is unaffected by processing (Mallapragada, S. K., et al., *Journal of Polymer Science Part B: Polymer Physics* 1996, 34 (7), 1339-1346).

IR intensities were measured at 1144 cm$^{-1}$ and 854 cm$^{-1}$ to obtain values of $A_{1144}$ and $A_{854}$, respectively. $A_{1144}/A_{854}$ index represents fiber crystallinity; however true values of percent crystallinity ($X_c$) are determined by WAXD. Equation 8 shows the linear relationship between $X_c$ by WAXD and the $A_{1144}/A_{854}$ index:

$$X_c(\%) = \left(k + j\frac{A_{1144}}{A_{854}}\right) \times 100\% \quad (8)$$

Constants k=44.02 and j=7.27 were determined from a previous study of gel-spun lignin/PVA[28] fibers.

Raman Anisotropy Analysis of Molecular Structure

To analyze the molecular anisotropy of lignin aromatic groups, PVA polymer chain and side groups, Raman spectroscopy of lignin/PVA fibers was performed on the Bayspec Normadic Confocal Raman Microscope. Spectra were collected parallel and perpendicular to the fiber axis of bundles comprising 30 fibers. Other parameters for spectral collection included 785 nm laser at 102 mW (estimated from 255 mW power filtration), 10× objective infrared lens, 500 ms exposure time, and acquisition number of 10. Raman peaks for lignin's molecular groups were in the range of 1450-1700 cm$^{-1}$; these were normalized by the 1600 cm$^{-1}$ peak. Raman peaks that described PVA's molecular orientation were in the range of 2800 and 3300 cm$^{-1}$; these peaks were normalized by 3030 cm$^{-1}$. The 2910 cm$^{-1}$ peak represented C—H bonding and the PVA main chain. Raman peaks at 3095 cm$^{-1}$ and 3210 cm$^{-1}$ pertained to aliphatic lignin and PVA —OH groups, respectively.

Raman anisotropy (R in Equation 9) was used to quantify the molecular orientation of macromolecules (Lu et al., *ACS Sustainable Chemistry & Engineering* 2017, 5 (4), 2949-2959; Liem, H. M.; et al., *Advanced Functional Materials* 2003, 13 (1), 66-72):

$$R = \frac{I_\parallel}{I_\perp} \quad (9)$$

where $I_\parallel$ and $I_\perp$ are intensity peaks at polarization angles parallel ($\parallel$) or perpendicular ($\perp$) to the fiber axis. The Herman's orientation factor f (White, J. L.; Spruiell, J. E. *Polymer Engineering & Science* 1983, 23 (5), 247-256) for lignin's aromatic functional groups is represented by Equation 10 (Lu et al., *ACS Sustainable Chemistry & Engineering* 2017, 5 (4), 2949-2959; Liem, H. M.; et al., *Advanced Functional Materials* 2003, 13 (1), 66-72):

$$f = \frac{R-1}{R+4} \quad (10)$$

where R=1 and f=0 for randomly aligned molecules and R=∞ and f=1 for perfectly aligned molecules.

Swelling Testing

The swelling behavior of thermally-drawn lignin/PVA fibers were tested. Fiber bundles, totaling 3 m in length, were immersed in 20 mL of distilled water for 24 h at 25° C. Post immersion, fibers were blotted with filter paper to remove excess water and weighed. Fiber swelling ratio (S) was calculated according to Equation 11. The mass of dry fiber was measured prior to water immersion ($m_d$), and the mass of wet fiber was measured after immersion ($m_w$).

$$S(\%) = \frac{m_w - m_d}{m_d} \times 100\% \tag{11}$$

Results and Discussion

Lignin did not diffuse from lignin/PVA gels that were coagulated in solvents having water ≤30% of the water/acetone bath-aging occurred for 1 day at 5° C. 50/50 and 25/75 water/acetone baths were used to understand the effect of aging bath composition on fiber processing parameters and properties. After aging 5% lignin gel-fibers in both solvent systems for 1 day, fibers from the 50/50 water/acetone had lower Stage 1-4 draw temperatures. The reduction in drawing temperatures was attributed to the loss of lignin from the gel-fibers structure. As lignin content increases, gel melting temperatures and drawing temperatures also increase. (Lu et al., *ACS Sustainable Chemistry & Engineering* 2017, 5 (4), 2949-2959). Fibers from the 25/75 water/acetone bath had higher total draw ratio (of 66 X, tensile strength 1.3 GPa, and modulus at 53 GPa) versus fibers from 50/50 water/acetone, having a lower total draw ratio (of 45×, tensile strength at 1.1 GPa and modulus at 49 GPa). Therefore, 25/75 water/acetone was used as the aging bath for 5 and 30% fibers (aged up to 30 days), as discussed in the following sections.

Effect of Gel Aging on Gel-Fiber Structure

WAXD was used to study structural changes in gel-structure after aging; in particularly crystal size, d-spacing, and percent crystallinity. The most prominent diffraction peak was due to overlapping (1 0 $\bar{1}$) and (1 0 1) peaks at 2θ=19.5°. These planes, (1 0 $\bar{1}$) and (1 0 1), are influenced by intermolecular hydrogen bonding and Van der Waals bonding, according to Sakurada (Sakurada, I., et al., Vinyl Fibers. *Handbook of Fiber Science and Technology* 1998, 4, 503-587) and Bunn (Bunn, C. Crystal Structure of Polyvinyl Alcohol. *Nature* 1948, 161 (4102), 929-930) unit cell models. The characteristic d-spacing of (1 0 $\bar{1}$)/(1 0 1) planes was 0.45 nm for all aged gel-fibers. Hoshino, et al. reported the (1 0 $\bar{1}$)/(1 0 1) d-spacing for cryogels from PVA dopes containing DMSO/water (at 40-60 wt % DMSO) after 96 h aging was 0.439 nm versus 0.400 nm pre-aging (Hoshino, H., et al., *Polymer Bulletin* 1996, 37 (2), 237-244). Water in PVA dopes disrupted hydrogen bonding among chains of crystalline PVA, which increased d-spacing (Hoshino, H., et al., *Polymer Bulletin* 1996, 37 (2), 237-244). Likewise, intermolecular hydrogen bonding among PVA chains within gel-fibers is disrupted by water in the aging bath.

After aging 5% lignin gels for up to 30 days, percent crystallinity decreased overall from 37% for 5L1 D to 33% for 5L30D. In other words, water is regarded as a dissolving solvent that decreases the crystallinity of 5% lignin gel-fibers over time.

Interestingly, the percent crystallinity for 30% lignin gel-fibers increased from 28% (30L1D) to 37% (30L30D) with gel aging. Lignin leaching was detected visually within the aging bath of 30L30D gels fibers; the color of the aging bath turned from clear to dark brown. Ma et al (Ma, Y.; et al., *ChemSusChem* 2015, 8 (23), 4030-4039) reported that the percent crystallinity of dry-jet wet-spun cellulosic fibers decreased from 53% to 23% with the addition of 0-50% lignin, due to lignin's amorphous structure. In this Example, lower concentrations of lignin corresponded to higher gel-fiber crystallinity, since less lignin can disrupt PVA's crystalline gel-structure. Among gel-structures, lignin resides in polymer-rich domains- the semi-crystalline regions of PVA gels (Lu et al., *ACS Sustainable Chemistry & Engineering* 2017, 5 (4), 2949-2959). The actual lignin concentration remained within 30L30D gel-fibers was estimated to be 10% (based on a calibration curve of lignin/PVA fibers and data obtained from this Example). The percent crystallinity of PVA increased after 30 days of aging as lignin diffused from the gel-structure. Such severe lignin leaching from 30L30D fibers further suggests excess lignin resided in solvent-rich domains, once polymer-rich domains were saturated. Thus, an exemplary concentration of lignin saturation in the PVA gel appears to be 10% within polymer-rich domains.

The gel crystals observed by WAXD were indicative of swollen, semi-crystalline gels. The calculated crystal sizes and d-spacing of gel-fibers containing 5% and 30% lignin for (1 0 0), (1 0 1) and (2 0 0) planes. Both crystal size and d-spacing for the (1 0 0) and (2 0 0) planes were reflective of dynamic changes among 5 and 30% lignin gel-fibers. Syneresis competes with moisture absorption among gel-fibers coagulated in water/acetone. According to the Sakurada PVA unit cell (Sakurada, I., et al., Vinyl Fibers. *Handbook of Fiber Science and Technology* 1998, 4, 503-587), hydrogen bonding between (1 0 0)/(2 0 0) planes are readily affected by water absorption. Water from aging solvent is more likely to disrupt crystals along the (1 0 0)/(2 0 0) planes than the (1 0 1) plane.

The crystallinity of gel-fibers was affected by gel aging 5% and 30% lignin fibers. The dissolution of small gel crystals by swelling solvent would reduce gel-fiber crystallinity. Gel crystallinity decreased overall after aging 5% lignin gel-fiber for more than 1 day, but an overall increase in gel crystallinity was observed when 50% lignin gel-fiber was aged for 30 days.

Effect of Gel Aging on Fiber Drawing

The drawing parameters for all aged lignin/PVA gel-fibers were summarized in Table 7. Gel-fibers aged in 25/75 water/acetone melted in oil at temperatures below 100° C.; thus, it was impossible to initially draw fibers at 100° C. post aging. In contrast, lignin/PVA gel-fibers that were aged in acetone/methanol for one day were initially drawn at a minimum temperature of 100° C., as shown by Lu et al., *ACS Sustainable Chemistry & Engineering* 2017, 5 (4), 2949-2959. As-spun fiber draw ratios and cold drawing ratios were greater for 5% lignin fibers than for 30% lignin fibers.

The total draw ratios of 5% lignin fibers aged up to 30 days were 65-74×. Among 5% lignin fibers, solvation of polymer chains was attributed with making gel-fibers were more extendable. Fully-drawn fibers from water/acetone aging had high total draw ratios of 65-74×, versus 40× for 5L1 D' fiber from 1-day aged gel in methanol/acetone. This result suggests water/acetone is a good aging bath for producing highly drawn 5% lignin fibers. Subsequently, drawing parameters for Stage 2-4 showed 5L1 D was drawn at a higher temperature than 5L14D and 5L30D fibers. The initially higher value of percent crystallinity for 5L1 D gel-fiber had caused it to incur more drawing than the other gel-fibers.

Stage 1-4 draw temperature and ratio decreased for with the aging of gel-fiber prepared from 30% lignin dope. The lowest total draw ratio was reported for 30L30D fiber at 27×. Lignin's inherently high glass transition temperature is reached at drawing temperatures between 120-150° C. (Lu et al., *ACS Sustainable Chemistry & Engineering* 2017, 5 (4), 2949-2959; Sadeghifar, H., et al., *ACS Sustainable Chemistry & Engineering* 2017, 5 (1), 580-587). Lignin concentration dropped to 10% in 30L30D fibers due to lignin diffusion into the aging bath. Residual lignin content within the gel aged fibers were estimated according to spectroscopy. Although 30L30D gel-fiber was ~37% crystalline, a reduction of 20% lignin from within the fiber's structure greatly influenced draw temperature. Thus, lignin leaching from 30L30D gel-fibers lowered the fiber drawing ratios and temperatures.

at 50 GPa. The mechanical properties reported for 5% lignin fiber from gel-fiber aged in 15/85 methanol/acetone for 1 day was 1.1 GPa in tensile strength and 36 GPa in Young's modulus (Lu et al., *ACS Sustainable Chemistry & Engineering* 2017, 5 (4), 2949-2959). Better mechanical properties were observed for 5% lignin fibers when 1-day aged gels were immersed in 25/75 water/acetone opposed to 15/85 methanol/acetone. Thus, water in the acetone-based aging bath caused fiber tensile strength and Young's modulus to increase up to 14 days of aging. The Young's modulus of 5L30D fiber was 27 GPa, which is considerably lower than fibers aged for less time. Excess solvation of PVA chains with water could swell gels, while hindering the formation of a dense fiber structure. 5L1D and 5L14D had lower values of linear density than 5L30D.

The properties of fibers from aged gels were influenced by the initial concentration of lignin in the spinning dopes. Because of water/acetone aging, the series of gel-spun fibers from spinning dopes containing 30% lignin did not have the

TABLE 7

Drawing Parameters and Draw Ratio (DR) for Gel-Spun Fibers from Gel Aging

| Fiber | | 5L1D' | 30L1D' | 5L1D | 5L14D | 5L30D | 30L1D | 30L14D | 30L30D |
|---|---|---|---|---|---|---|---|---|---|
| As-spun DR | | 2.6 | 1.4 | 3.1 | 2.7 | 3.1 | 2.7 | 2.7 | 2.7 |
| Cold Draw DR | | — | — | 4.0 | 3.7 | 4.0 | 3.6 | 3.6 | 2.3 |
| Stage 1 Drawing | Temperature (° C.) | 100 | 100 | 125 | 130 | 130 | 160 | 160 | 100 |
| | DR | 5.8 | 7.0 | 2.1 | 2.4 | 2.2 | 2.2 | 2.3 | 2.0 |
| Stage 2 Drawing | Temperature (° C.) | 180 | 190 | 180 | 160 | 160 | 190 | 190 | 165 |
| | DR | 1.7 | 1.5 | 1.5 | 1.5 | 1.5 | 1.5 | 1.5 | 1.5 |
| Stage 3 Drawing | Temperature (° C.) | 210 | 210 | 215 | 190 | 190 | 220 | 210 | 180 |
| | DR | 1.3 | 1.4 | 1.4 | 1.5 | 1.5 | 1.5 | 1.2 | 1.3 |
| Stage 4 Drawing | Temperature (° C.) | 230 | 230 | 225 | 200 | 200 | 230 | 220 | 195 |
| | DR | 1.2 | 1.2 | 1.2 | 1.2 | 1.2 | 1.3 | 1.2 | 1.1 |
| Total DR[a] | | 40 | 25 | 66 | 65 | 74 | 63 | 48 | 27 |
| Effective Diameter (μm) | | 32 | 48 | 26 | 28 | 32 | 40 | 40 | 32 |
| Linear Density (dtex) | | 10 | 23 | 7 | 8 | 11 | 16 | 17 | 10 |
| Circularity Index | | 0.70 ± 0.07 | 0.69 ± 0.07 | 0.71 ± 0.08 | 0.68 ± 0.09 | 0.65 ± 0.08 | 0.74 ± 0.07 | 0.72 ± 0.08 | 0.70 ± 0.08 |

'—': Not Applicable: fibers were directly drawn in hot oil bath
[a]Total DR: Cumulative draw ratio from as-spun DR, cold draw and hot draw of Stages 1 to 4.

Additional representative drawing parameters for gel-fibers aged in 15/85 methanol/acetone are described elsewhere herein. Additional guidance for drawing paraments can be found in Lu et al., *ACS Sustainable Chemistry & Engineering* 2017, 5 (4), 2949-2959, incorporated herein by reference in its entirety.

Small crystals unfolded more easily than larger ones during elevated temperature drawing. Thus, aged PVA gels extended to higher draw ratios (23 X) and yielded higher mechanical performance from their PVA tapes. In contrast, the results of this study revealed higher values of gel crystallinity benefitted the continuous drawing of lignin/PVA fibers. The retention of crystalline PVA and lignin within gel-fiber, resulted in higher values of total draw ratio and thermal drawing at Stage 4 (see Table 7).

Effect of Gel Aging on Fiber Mechanical Properties

Figure 14:
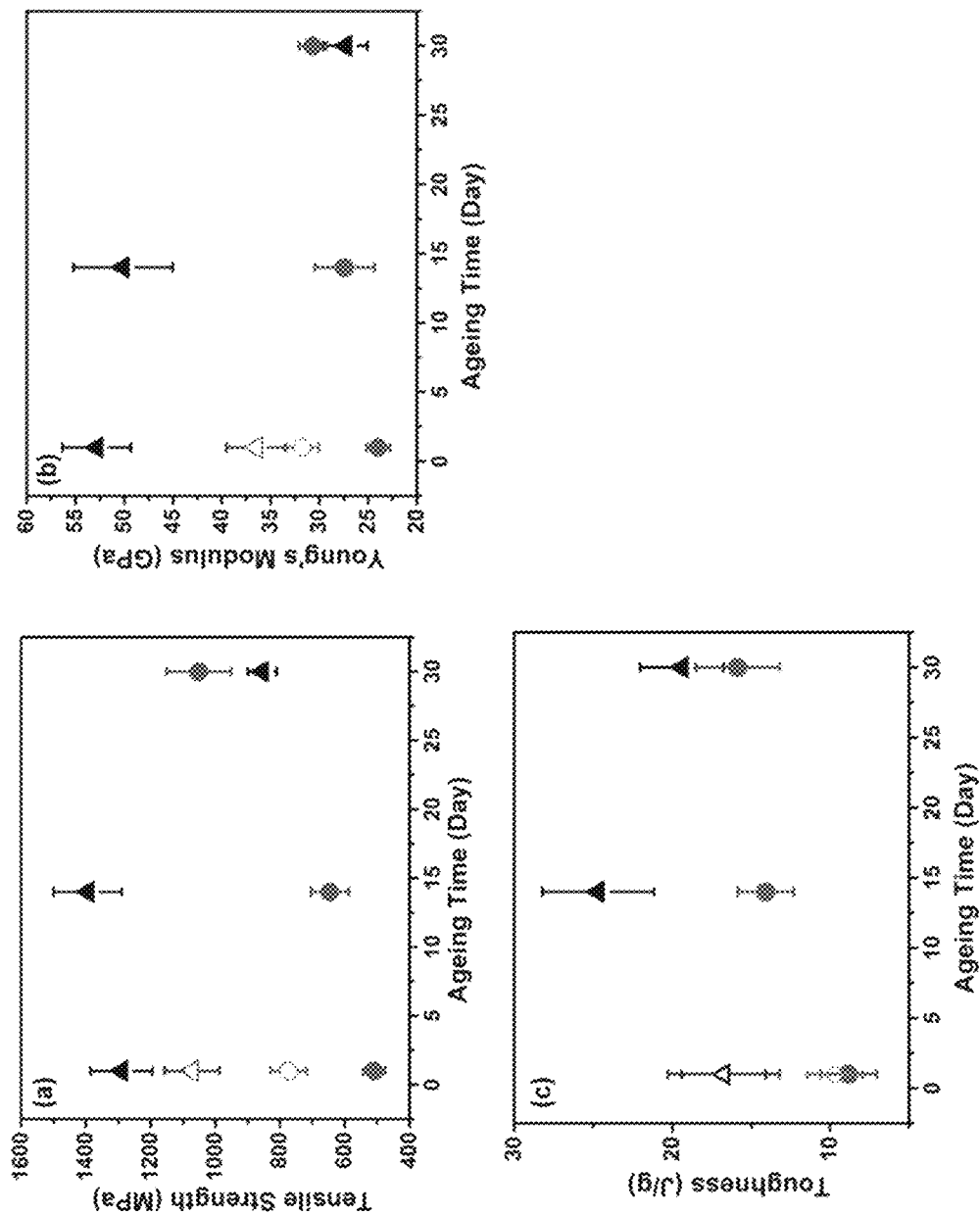
FIG. 14 is a series of plots showing tensile strength (panel a), Young's modulus (panel b), and toughness (panel c) of 5% (▲) and 30% (●) lignin/PVA fibers aged in 25/75 water/acetone (solid symbol) and in 15/85 methanol/acetone (open symbol).
Figure 15:
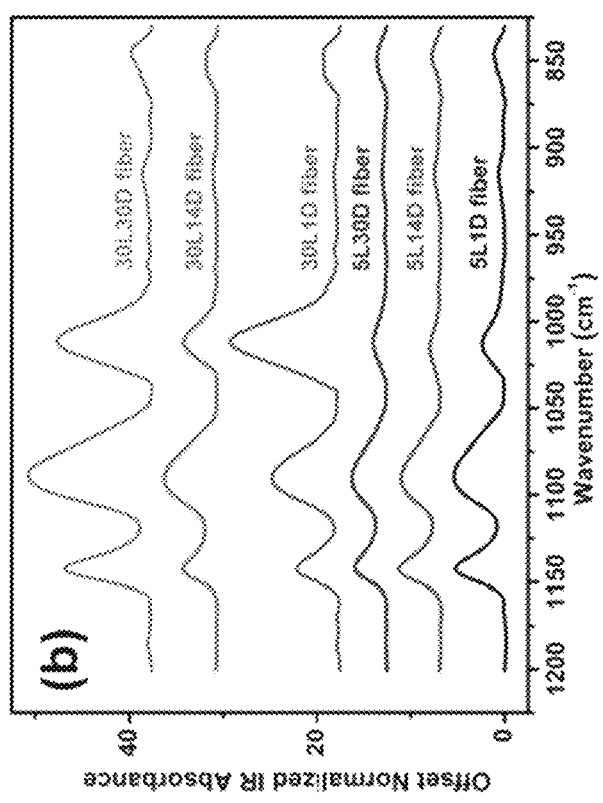
FIG. 15 is a set of plots showing IR absorbance spectra of neat PVA fiber (Lu et al., *ACS Sustainable Chemistry & Engineering* 2017, 5 (4), 2949-2959) and lignin/PVA fibers from gel-fibers aged in 25/75 water/acetone: between (panel a) 3750-1000 cm$^{-1}$ and (panel b) 1250-800 cm$^{-1}$.
Figure 15:
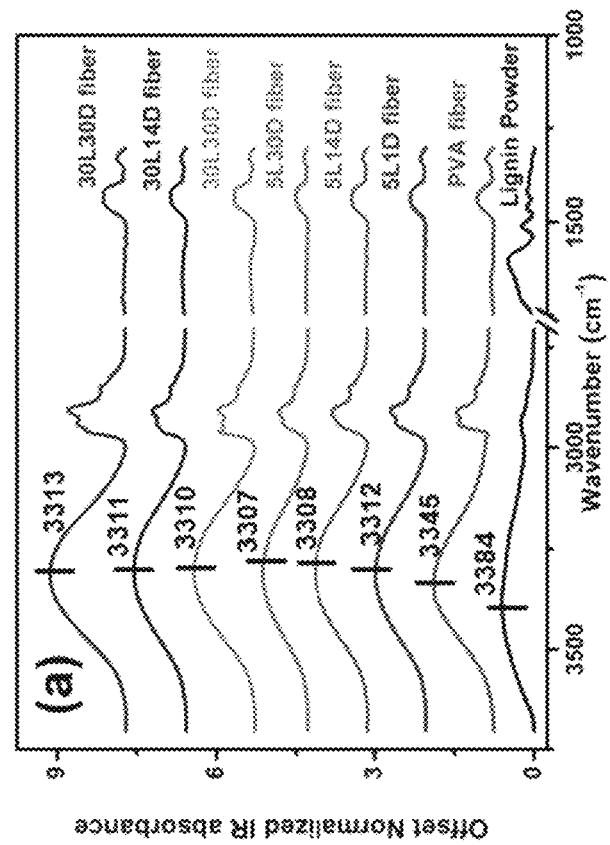

Effect of gel aging on fiber mechanical properties is shown in FIG. 14. The strain at break values for all fibers were in the range of 3-5%. Gel aging in water/acetone yielded high tensile strength values for 5L1D and 5L14D that were 1.3 GPa and 1.4 GPa, respectively. But, tensile strength decreased to 0.9 GPa for 5L30D fiber. Young's modulus values from water/acetone aged 5% lignin fibers were above 50 GPa—5L1D fiber at 53 GPa and 5L14D fiber same mechanical property trend as fibers from 5% lignin. The tensile strength of fibers from 30% lignin dopes increased from 0.5 to 1.1 GPa, and the Young's modulus of those fibers increased from 24 to 31 GPa with 30 days of gel-fiber aging. 30L1 D' fiber, from 30% lignin dope and gel-fiber aged in 15/85 methanol/acetone for 1 day, was 0.77 GPa in tensile strength, and 31 GPa in Young's modulus (Lu et al., *ACS Sustainable Chemistry & Engineering* 2017, 5 (4), 2949-2959). Because the lignin content within 30-day water/acetone aged gel-fiber (30L1 D) was less than 1-day methanol/acetone aged gel-fiber (30L1 D'), the contrast in mechanical performance is likely due to differences in lignin content between both lignin/PVA fibers. Although aging time did not increase the mechanical properties of fibers from 30% lignin dopes, 1-day15/85 methanol/acetone aging gave better performance than 1-day 25/75 water/acetone aging.

5L14D fiber had the highest toughness value of 25 J/g, followed by 17-19 J/g for 5% lignin fibers that were spun from gels aged in water/acetone for 1 and 30 days. The toughness of 5% lignin fiber from 1-day methanol/acetone aged gel was 17 J/g (Lu et al., *ACS Sustainable Chemistry & Engineering* 2017, 5 (4), 2949-2959). Fiber spun from 30% lignin dopes had shown higher values of toughness (from 9 to 16 J/g) as gel aged in water/acetone for 30 days.

Macrostructure of Thermally Drawn Fibers Post Gel-Aging

The fracture tips of fibers having the highest values of mechanical performance after aging were: 5L1D, 5L14D and 30L30D. The described fibers all exhibited ductile modes of fracture and fibrillar microstructures. Fibrils are indicative of molecular alignment/order in parallel with the fiber axis (Hearle, J. W. S. The Fine Structure of Fibers and Crystalline Polymers. I. Fringed Fibril Structure. *Journal of Applied Polymer Science* 1963, 7 (4), 1175-1192). This structural feature is common among high strength, high modulus fiber. Methanol/acetone spun fibers at 30% lignin, featured nanoscale aggregates among fibrils of PVA (Lu et al., *ACS Sustainable Chemistry & Engineering* 2017, 5 (4), 2949-2959). Among fibers spun from 30% lignin dope and water/acetone aged gel-fiber, aging aided the compatibility between lignin and polymer. Aggregates of lignin were not observed at the fracture tip, PVA matrix polymer was fibrillar, and voids were not observed along the fiber cross section. Since 30L30D fibers at 10% lignin did not exhibit aggregates, lignin concentrated within the solvent-rich domains of the gel-structure may have diffused into the aging bath leaving lignin dispersed within the polymer-rich domains.

Fibers 5L1 D, 5L14D and 30L30D were the finest, their linear density values were 10 dtex or less (Table 7). Fiber cross-sections had irregular geometries due to solvent removal from solution spun fibers (Lewin, M. *Handbook of Fiber Chemistry*, CRC Press: 2006). Circularity index values of 0.7 quantify the effect of those irregularities on the roundness of gel-spun fibers (Table 7).

The diameters of 5% lignin fibers increased with gel aging time in water/acetone, although the total draw ratio of fibers (Table 7) were close. Water from the mixed solvent bath can swell gel-fiber. As the aging time was prolonged to 30 days, more solvent remained in the fiber structure and less was removed during the drawing process—although the draw ratio was high (~74x). Therefore, 5L1D and 5L14D were finer than 5L30D and had the highest mechanical performance.

The total draw ratio and fiber diameter decreased among 30% lignin fibers with up to 30 days of aging (Table 7). Lignin leached into the aging bath, as solvent in the gel-fiber diffused into aging solvent. Thus, 30L30D had smaller cross-sections than 30L1 D fibers and were much stronger.

Microstructure of Thermally Drawn Fibers Post Gel-Aging

The analysis of polymer crystallinity and molecular arrangement are discussed to better understand the effect of gel-fiber aging on the mechanical properties of thermally drawn fibers. Molecular adhesion and filler orientation within matrix polymer both contribute to mechanical performance (Minus, M. L.; et al., *Macromolecular Chemistry and Physics* 2009, 210 (21), 1799-1808; Peresin, M. S., et al., *Biomacromolecules* 2010, 11 (3), 674-681; Gonzalez, J. S.; et al., *Materials Science and Engineering: C* 2014, 34, 54-61; Spitalsky, Z., et al., *Progress in Polymer Science* 2010, 35 (3), 357-401). IR and Raman spectroscopic tools were used to characterize molecular to microstructural phenomenon. IR spectra of thermally drawn lignin/PVA fibers were used to calculate the percent crystallinity of PVA. Crystalline conformations of PVA chains are represented by the 1144 $cm^{-1}$ peak intensity. As shown in Table 8, fully-drawn 5L1D fibers were most crystalline at 78%. Fully-drawn 5L30D fibers were 68%. In contrast, drawn fiber from spinning dopes of 30% lignin were most crystalline when precursor gel-fibers were aged for 30 days in water/acetone (from 64% to 74%).

The crystallinity of fully-drawn lignin/PVA fibers (Table 8) agreed well with overall trends shown for the mechanical properties of fully drawn fibers (FIG. 14) and gel-fiber crystallinity after aging. Changes in draw ratio (Table 7) did not coincide with trends in gel-fiber and fully-drawn fiber crystallinity. Thus, the crystallinity of water/acetone aged gel-fiber influenced the crystallinity of fully drawn fibers. It is possible that gel crystals provide physical junctions that enable fiber drawing from swollen gels-like the role of polymer chain entanglements during fiber spinning. Further, gel crystals appear to nucleate the growth of fibrillar crystals upon drawing.

TABLE 8

IR Absorbance Ratio of $A_{1144}/A_{854}$ and Percent Crystallinity of Fully Drawn Fibers

| Fiber | $A_{1144}/A_{854}$ | $X_c$ (%) |
|---|---|---|
| 5L1D | 4.68 | 78 |
| 5L14D | 4.51 | 77 |
| 5L30D | 3.30 | 68 |
| 30L1D | 2.68 | 64 |
| 30L14D | 3.01 | 66 |
| 30L30D | 4.19 | 74 |

IR spectra also revealed molecular interactions between lignin and PVA. Hydrogen bonding among hydroxyl (—OH) groups within neat PVA fiber and lignin powder is represented by IR absorbance peaks at 3345 $cm^{-1}$ and 3384$cm^{-1}$, respectively. The —OH group absorbance peak from neat PVA fiber (3345 $cm^{-1}$) shifted to lower frequencies when obtained from lignin/PVA fibers (3307-3313 $cm^{-1}$)—indicative of shorter distances between oxygen atoms (O—O) from different hydroxyl groups (Speakman, J. C. The Hydrogen Bond and Other Intermolecular Forces, Chemical Society: 1975; Jiang, X., et al., *Journal of Applied Polymer Science* 2012, 125 (1), 697-703). The shift was the result of intermolecular hydrogen bonding between lignin and PVA (Kubo, S.; Kadla, J. F., *Biomacromolecules* 2003, 4 (3), 561-567). Thus, gel aging in 25/75 water/acetone promoted molecular interactions between lignin and PVA by disrupting inter-/intramolecular hydrogen bonding among PVA chains. Strong molecular interactions among 5 and 30% lignin fibers from gel aging indicated good compatibility between PVA and lignin. As a result, high strength fibers showed no evidence of lignin from PVA phase separation within the fiber microstructure, possessed high values of percent crystallinity ($X_c$>70%) (Table 8) and high mechanical performance (FIG. 14).

Effect of Gel Aging on Molecular Anisotropy

Raman spectroscopy was used to investigate lignin and PVA chain orientation within fibers drawn from aged gels. R and f anisotropy parameters were calculated for lignin/PVA fibers (which were spun from spinning dopes of 5% and 30% lignin) (see Table 9). Among 5% lignin fibers, anisotropy parameters were greatest for 5L1D (where f=0.52 and total draw ratio was 66 X), followed by fiber from longer gel aging times. At a total draw ratio of 40 X, three-dimensional lignin remained randomly distributed within 5L30D' from methanol/acetone aging (Lu et al., *ACS Sustainable Chemistry & Engineering* 2017, 5 (4), 2949-2959). The 1-day 15/85 methanol/acetone aging of gel-fiber containing 5% lignin yielded a much lower value of anisotropy (f=0.12) (Lu et al., *ACS Sustainable Chemistry & Engineering* 2017, 5

(4), 2949-2959). Therefore, 1-day 50/50 water/acetone aging sufficiently enhanced fiber drawing. As expected, higher values of lignin anisotropy correlated with higher values of mechanical performance.

Polarized peak intensities at 2910 cm$^{-1}$ (Ma, Z., et al., *Journal of Materials Chemistry C* 2016, 4 (5), 1029-1038) were used to study the orientation of PVA fibers, namely the alignment of PVA main chains. In this Example, PVA chain alignment was greatest among the 5% lignin fibers than among fibers drawn from 30% lignin dopes. Intermolecular hydrogen bonding between PVA and lignin (as interpreted from IR spectra) was a source of molecular adhesion, which enabled the aligning of lignin as fiber was drawn. Kubo et al (*Biomacromolecules* 2005, 6 (5), 2815-2821) reported that lignin's aliphatic hydroxyl groups more readily formed intermolecular hydrogen bonding than phenolic hydroxyl groups.

TABLE 9

Lignin Orientation Parameters from Lignin/PVA Fibers Derived from Aged Gels

| | Fiber | 5L1D' | 5L1D | 5L14D | 5L30D | 30L1D' | 30L1D | 30L14D | 30L30D |
|---|---|---|---|---|---|---|---|---|---|
| Raman anisotropy (R) | benzene ring | 1.65 | 6.40 | 5.96 | 1.72 | 1.45 | 1.57 | 1.33 | 5.90 |
| | conjugated C=C | 1.62 | 3.81 | 3.80 | 1.67 | 1.50 | 1.01 | 1.27 | 4.60 |
| orientation factor (f) | benzene ring | 0.12 | 0.52 | 0.45 | 0.13 | 0.08 | 0.10 | 0.06 | 0.45 |
| | conjugated C=C | 0.11 | 0.35 | 0.34 | 0.12 | 0.09 | 0.01 | 0.05 | 0.42 |

Raman anisotropy parameters for fibers drawn from gels aged in 15/85 methanol/acetone (5L1D' and 30L1D') are found in Lu et al., *ACS Sustainable Chemistry & Engineering* 2017, 5 (4), 2949-2959.

Among fibers spun from 30% lignin dopes, lignin anisotropy values remained low until gels had aged in water/acetone for 30 days (30L30D fibers where f=0.45). Further, the orientation of the PVA main chain, lignin hydroxyl groups, and PVA hydroxyl groups greatly improved with aging, as observed for 30L30D fibers. Lignin aggregates were not observed among 30L30D fibers, wherein the actual lignin content was 10%. In contrast, fibers from 20% lignin dope and gel aged in methanol/acetone for 1 day, had shown lignin aggregates, poor lignin alignment, and mild interactions between lignin and PVA, as reported by Lu et al., *ACS Sustainable Chemistry & Engineering* 2017, 5 (4), 2949-2959. Lu et al had fibers of more than 20% lignin that were less crystalline than these fibers of 5-10% lignin (Table 8). Lu et al proposed a concentration-dependent model of lignin's preference for the polymer-rich or solvent-rich domains of the PVA gel. Based on that model, 30% lignin gel would have most of the lignin in the solvent-rich domain.

Aligning lignin within the solvent-rich domains of gel-fiber is more difficult than aligning lignin within polymer-rich domains, which take advantage of adhesion induced drawing.

Swelling Behavior of Lignin/PVA Fibers from Aged Gels

Measurements of fiber swelling ratio (S) were used to study structural differences between drawn lignin/PVA fibers that would influence moisture uptake. The results in Table 10 show the room temperature swelling behavior of thermally drawn lignin/PVA fibers. With gel aging, the swelling ratio of thermally drawn fibers containing 5% lignin increased from S=6% for 5L1D to S=31% for 5L30D. 5L30D fibers were the least crystalline; its amorphous PVA absorbed more water than 5L1D fibers. The swelling ratio of 30% lignin fiber increased from 35% to 46% after 14 days of gel aging; but swelling ratio decreased to 33% for 30L30D fibers. The more crystalline 30L30D fibers did not swell as much as water/acetone aged fibers that contained more lignin.

TABLE 10

Swelling Ratio of Lignin/PVA Fibers Spun from Gels Aged in 25/75 Water/Acetone

| Fiber | S (%) |
|---|---|
| 5L1D | 6 |
| 5L14D | 13 |
| 5L30D | 31 |
| 30L1D | 35 |
| 30L14D | 46 |
| 30L30D | 33 |

Conclusions from Example 6B

Gel aging revealed polymer processing, fiber structure and mechanical property relationships that are needed to manufacture strong lignin-based fibers. Lignin/PVA fibers were spun from gel-fibers aged in 25/75 water/acetone for up to 30 days. Although spinning dopes contained 30% lignin at most, the strongest drawn fibers contained 10% lignin or less and were drawn from gels of 37% crystallinity. At 5% lignin, the best values of fiber mechanical performance were observed: tensile strength of 1.4 GPa from 1 day of gel aging, Young's modulus of 54 GPa and tensile toughness of 25 J/g from 14 days of gel aging. At 10% lignin, fibers had a tensile strength of 1.1 GPa, Young's modulus of 31 GPa and toughness of 16 J/g. Although the toughness of lignin/PVA fibers were lower than that of Kevlar (at least 33 J/g) and gel-spun carbon nanotube/PVA fiber (171 J/g) (Meng, J.; et al., *Macromolecular Materials and Engineering* 2014, 299 (2), 144-153), toughness values did exceed the value of PVA/graphene oxide (GO) composites (6 J/g) (Shin, M. K.; et al., *Nature Communications* 2012, 3, 650). Therefore, lignin/PVA fibers have potential use in industrial and high-performance applications.

Gel aging in a mixed solvent bath—where acetone is a non-solvent for PVA and lignin but the water swells PVA—was initially assumed to enhance the molecular mobility of PVA, and in turn lignin, during fiber drawing. Water from the aging bath swells the gel microstructure, which led to higher fiber draw ratios among 5% lignin fibers. Among fibers spun from 30% lignin dopes, molecular compatibility between lignin and PVA improved with 25/75 water/acetone aging time in comparison to 1 day of aging in gel-fiber in 15/85 methanol/acetone bath. Evidence of molecular adhesion between lignin and PVA through hydrogen bonding was more prominent among fibers spun from gels aged in water/acetone than from methanol/acetone.

This study on gel aging highlighted the important roles of PVA crystallinity, molecular interactions, and polymer anisotropy on fiber strength. Both the molecular anisotropy of lignin and matrix polymer appeared to contribute to the overall mechanical performance of drawn fibers. The intercalation of lignin between PVA chains was necessary for optimal alignment of lignin within drawn fibers. Thus, the challenge for commercializing high strength, high modulus fibers, having lignin content above 30%, is the ability to enhance lignin's orientation within drawn fibers. The key to achieving strong, commercially viable fiber at more than 30% lignin is the ability to increase gel crystallinity within a matter of seconds.

Materials and Methods for Examples 7 to 9

Materials. Commercial molecular weight PAN having ~150k Da molecular weight was procured from Scientific Polymer Products, Ontario, N.Y. Kraft lignin was provided by Domtar, New Hill, N.C., and was used as received, without washing. Solvents included water, DMSO (Sigma-Aldrich Corp., St. Louis, Mo.), isopropanol (IPA; BDH Chemicals), and methanol (BDH Chemicals).

Spinning Dope Preparation. For all spinning dopes, the concentration of PAN was up to 20 g/dL. PAN powder was dissolved in DMSO and stirred constantly at 85° C. in a beaker with a magnetic stirrer. To prevent loss of solvent, the beaker was sealed with polytetrafluoroethylene (PTFE) tape and covered with tin foil. The solution was stirred and kept on heat until the powder was entirely dissolved.

Lignin/PAN Series. Spinning dopes of lignin/PAN were prepared with up to 80% lignin to PAN. The lignin powder was added to DMSO and then sonicated in a sealed reaction flask for at least 18 hours. PAN powder was then dissolved in the lignin/DMSO solution and stirred constantly at 85° C. until the PAN was entirely dissolved. Final concentrations of the spinning dopes had up to 20 g/dL of PAN and up to 80% lignin to PAN.

PAN Grafted Lignin/PAN Series. PAN grafted lignin is also referred to as "Modified Lignin" or "MODL" in this work. Up to 1% of the MODL powder and up to 10% lignin powder were added to DMSO and then sonicated in a sealed reaction flask for at least 18 hours. PAN powder was then dissolved in the MODL/lignin/DMSO solution and stirred constantly at 85° C. until the PAN was entirely dissolved. Final concentrations of the spinning dopes had up to 20 g/dL of PAN and up to 10% lignin to PAN.

Example 7

Droplet Test

Methanol is the most widely used compound for gel spinning, particularly when spinning PAN fibers. IPA is an alternative coagulant, however it was observed to have too low of a rate of diffusion in order to spin at effective speeds. Water was observed to quickly coagulate PAN, turning the polymer, whether in fiber or droplet form, opaque and brittle with little processibility.

Various coagulation bath formulas were tested in addition to the traditionally used 100% methanol. 100% methanol resulted in evident migration of lignin from the fiber system. Multiple bath solutions comprising acetone, IPA, methanol, and water were tested using a droplet test in small volumes kept at as low as −20° C. Two or three drops of spinning dopes were dropped into small vials of the bath solutions and observed for the desired coagulation effect and unwanted discoloration. The different blends formulated were as follows in Table 11.

TABLE 11

Coagulation Bath Components

| ID | Acetone (%) | IPA (%) | Methanol (%) | Water (%) |
|---|---|---|---|---|
| #1 |  |  | 100 |  |
| #2 | 15 | 85 |  |  |
| #3 | 85 | 15 |  |  |
| #4 | 15 |  | 85 |  |
| #5 | 85 |  | 15 |  |
| #6 |  | 15 | 85 |  |
| #7 |  | 50 | 50 |  |
| #8 |  | 15 |  | 85 |
| #9 |  | 25 | 50 | 25 |

To achieve a drawable gel-fiber and maintain lignin within gel fiber during processing, baths #8 and #9 were selected for lignin/PAN gel spinning.

The series of droplet tests conducted were able to narrow down three effective baths. Baths #1, #8, and #9 all showed coagulation of the spinning dope droplets at both −20 and −5° C. settings. However, bath #1 discolored quickly, showing evidence of lignin migration, while baths #8 and #9 showed minimal discoloration. Droplet tests can be utilized as preliminary tests to ensure compatibility with the gel, however because the spinning dope used was not in tension, true coagulation effects could not be observed without trial runs. The result of the droplet tests led to the spinning trials described in Table 12.

TABLE 12

Lignin/PAN Coagulation Bath Spinning Trial

| ID | Bath Formula | Temp (° C.) | Feed Speed (m/min) | Takeup Speed (m/min) | As-spun Ratio |
|---|---|---|---|---|---|
| #1 | 100% Methanol | −15 | 22.8 | 50 | 2.2 |
| #8 | 85% Water/ 15% IPA | 3 | 23.7 | 46 | 1.9 |
| #9 | 50% Methanol/ 25% Water/ 25% IPA | −5 | 9.8 | 34 | 3.5 |

Ultimately, testing resulted in narrowing down the bath recipe to the 50% Methanol, 25% IPA, and 25% Water bath (#9). This particular formula showed the best as-spun draw ratio, as well as best processibility in further post-processing. The other fibers displayed brittle behavior when handling, as well as low resistance to stretching when compared to the selected #9 bath. The #9 bath showed an increase in both total draw ratio of fibers as well as an increase in the gel melting temperatures during the first stage of drawing (see FIGS. 4A and 4B).

Example 8

Lignin/PAN Composite Fiber Spinning: 10 g/dL Series

Spinning conditions for different samples were kept constant around the control fiber, with slight adjustments to maximize as-spun draw ratios and eliminate any in-line issues such as varying diameters. The air gap was kept constant for all samples at 0.5 cm, the farthest distance from the bath capable of maintaining a steady jet. Table 13 shows the different spinning and drawing parameters for each of the samples produced.

The parameters used for each of the samples were kept within close range between samples, however the resulting draw ratios showed significant trends. Temperatures for each of the drawing stages were approximately the same for each of the samples and did not need adjustment. The smallest increment of lignin at 10% concentration showed the greatest final draw ratio. Higher percentages of lignin, however showed a decrease in draw ratio. This decrease is likely due to the change in molecular weight distribution. Because the molecular weight of lignin is significantly lower, more chain ends were introduced into the system that could act as crack propagation points when under stress, limiting the drawability of the fiber. Liu et al. noted that physical properties of the lignin/PAN fibers decreased when compared to PAN fibers, reporting that crystallinity dropped by 4 to 5% and failure strain dropped from 8.1% to 7.1%.

TABLE 13

Processing Parameters of Lignin/PAN Fibers at 10 g/dL

| % Lignin | | 0 | 10 | 20 | 30 |
|---|---|---|---|---|---|
| As-spun | DR | 3.5 | 3.3 | 3.2 | 3.1 |
| Stage 1 | Temp (° C.) | 115 | 118 | 112 | 115 |
| Glycerol | DR | 5.0 | 5.4 | 4.5 | 4.2 |
| Stage 2 | Temp (° C.) | 152 | 158 | 156 | 152 |
| Glycerol | DR | 1.5 | 1.7 | 1.7 | 2.0 |
| Stage 3 | Temp (° C.) | 180 | 182 | 182 | 179 |
| Glycerol | DR | 1.1 | 1.1 | 1.8 | 1.1 |
| Stage 4 | Temp (° C.) | 195 | 195 | 195 | 195 |
| Silicone | DR | 1.00 | 1.00 | 1.00 | 1.00 |
| Total Draw Ratio | | 26.9 | 31.0 | 26.7 | 24.7 |
| Linear Density (dtex) | | 36.7 | 31.3 | 44.3 | 48.0 |

Stages 1-3 of drawing were conducted with glycerol in order to reduce static cling and discharge of the fibers, but Stage 4 required silicone oil due to the glycerol degradation at higher temperatures. The glycerol would become discolored after prolonged exposure to heat in excess of 180° C., so high temperature silicone oil was utilized for the final stage.

Figure 9:
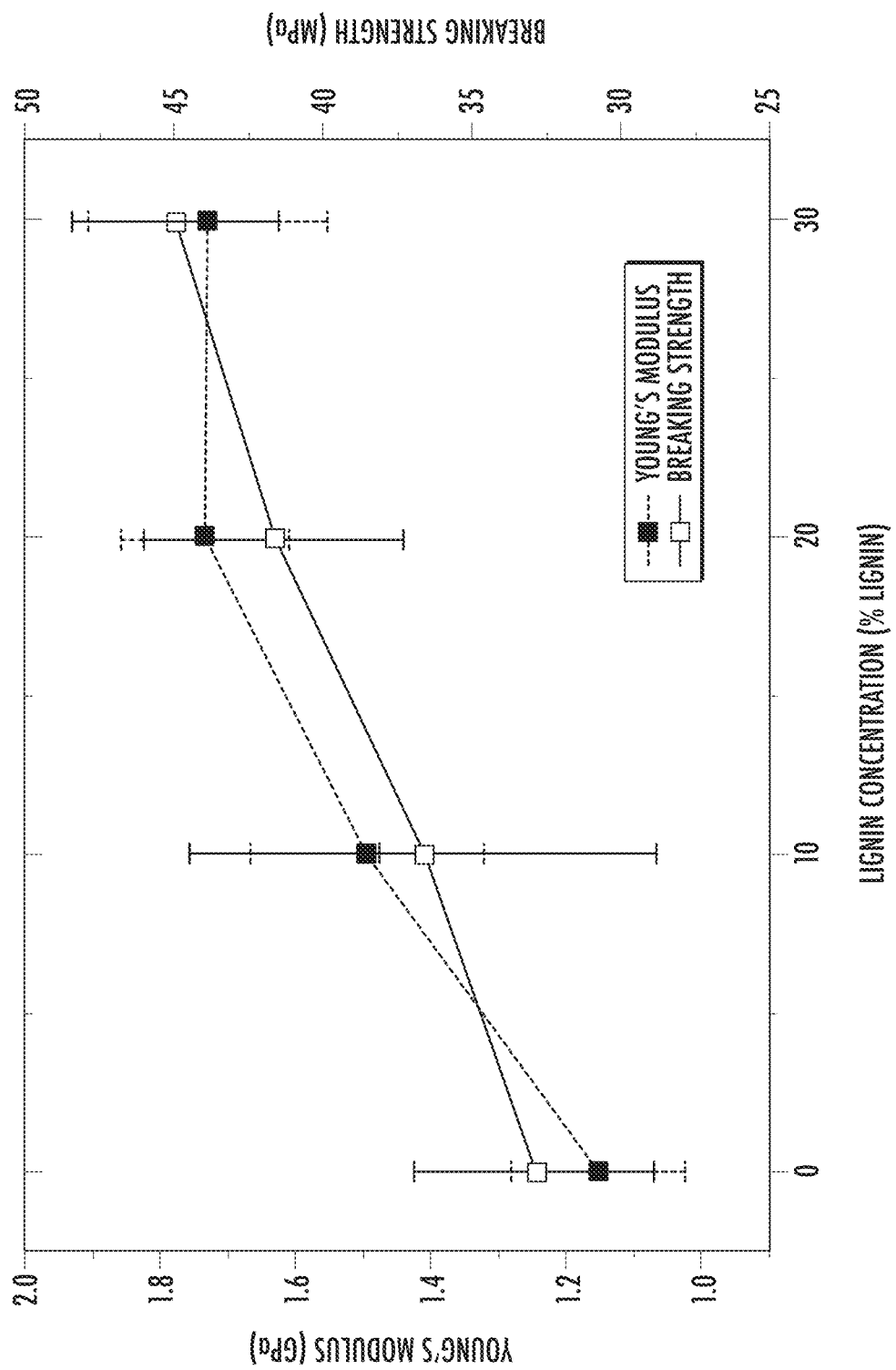
FIG. 9 is a plot of Young's modulus (solid line) and breaking strength (dashed line) of lignin/PAN fibers at 10 g/dL PAN and 0-30% lignin. A coagulation bath of 50% Methanol, 25% IPA, and 25% Water (#9) was used during gel fiber spinning.

The highest total draw ratio for the 10 g/dL PAN samples was the 10% lignin composite at 30.95× original length, however higher concentrations show lower draw ratios. This is indicative of reported trends showing that lower percentages of filler can greatly enhance the processability of the fiber as well as the mechanical properties. However, the trends in mechanical data from this work did not match this low filler concept in this series of testing, as seen in FIG. 9. A clear trend upward can be seen as the specific modulus and tenacity both increase with increasing concentration of lignin. This contradicts the behavior seen by other works where lignin decreased mechanical properties. This anomaly is likely a result of the migration of lignin leaving behind microvoids. Because the alternative coagulation bath was utilized in this work, less lignin left the PAN system, maintaining composite integrity.

Statistically speaking, both the modulus and the breaking strength were not significantly different between the 0% and 10% lignin samples or between the 20% and 30% lignin samples, so trends could not truly be identified with a high degree of accuracy. However, it was clear that lignin increased the stiffness of the fiber.

Further sampling with higher concentrations of PAN was then investigated, along with a change to the air gap. With higher concentrations of polymer, the apparent viscosity would increase, as well. This increase in viscosity would allow for the air gap to be increased to much further distances as well as adding an additional source of molecular alignment of the spinning dope.

Example 9

Lignin/PAN Composite Fiber Spinning: 20 g/dL Series

The doubling of the polymer concentration increased the difficulty in creating the spinning dopes. Samples required stirring for several hours longer than the lower concentration dopes, but showed improved performance and processibility. The air gap was increased to up to 5 cm above the surface of the bath, about 10× the air gap of the 10 g/dL series. The increased viscosity also resulted in slower feed speeds, greatly increasing the as-spun draw ratios. Processing was shortened by two stages in comparison to the 10 g/dL PAN series as seen in Table 14. Nearly all parameters were improved as a result of the switch to 20 g/dL PAN (excluding spinning dope preparation time). In comparison to the 10 g/dL samples, overall draw ratios increased by roughly 50 times, gel melting temperatures increased by ~15° C., and silicone oil was eliminated from the process.

TABLE 14

Processing Parameters of Lignin/PAN Fibers at 20 g/dL PAN at 150 kDa

| % Lignin | | 0 | 10 | 20 | 30 | 50 |
|---|---|---|---|---|---|---|
| As-spun | DR | 7.0 | 7.0 | 7.0 | 7.0 | 7.2 |
| Stage 1 | Temp (° C.) | 135 | 135 | 137 | 135 | 133 |
| | DR | 12.1 | 12.2 | 12.1 | 10.0 | 9.2 |
| Stage 2 | Temp (° C.) | 169 | 168 | 166 | 166 | 160 |
| | DR | 1.5 | 1.5 | 1.6 | 1.7 | 1.6 |
| Total Draw Ratio | | 124.6 | 125.7 | 132.3 | 117.1 | 105.8 |
| Linear Density (dtex) | | 13.0 | 13.1 | 19.8 | 14.2 | 16.2 |

The specific modulus and breaking strengths greatly improved with 20 g/dL PAN. The tenacity varied and hit a valley at 20% lignin concentration before climbing back up. It is possible that the lignin became more prevalent in the system at 20% concentration as the molecular weight distribution widened, however this does not explain the steady increase from 20 to 50%.

A steady increase in modulus was seen throughout the sampling, with the exception of an 80% lignin sample which failed to spin. Multiple breakages, inconsistent diameters, and spurting occurred in the 80% lignin sample, regardless of changes to the feed and takeup speeds. By adding in more PAN to the spinning dopes, the tenacity increased roughly tenfold, and the specific modulus rose another order of magnitude.

Discussion of Examples 7-9

The droplet tests conducted showed a significant amount of lignin migration in the baths with heavily concentrated methanol, implying that lignin has a strong enough affinity to leave the spinning dope system for the coagulation bath solution. After switching to alternative bath #9, discoloration was insignificant during spinning and properties increased. This implied that pure methanol was not required for gel spinning, but could be substituted with other non-solvents without the loss of mechanical properties. The lack of discoloration also implied that lignin remained within the fiber, preventing development of microvoids and loss of solids as a result of migration.

Initially, mechanical properties rose when adding lignin to the 10 g/dL samples, with 10% lignin showing the greatest draw ratio. 20 g/dL PAN spinning dopes ultimately were able to produce fibers with high-performance mechanical properties comparable to literature, but with higher concentrations of lignin in the final fiber due to the alternative coagulation bath preventing migration.

Example 10

Cross Sections of Lignin/PAN Fibers at Different Lignin-PAN Ratios

Fibers embedded in cork were thinly sliced perpendicular to the fiber axis to prepare fiber cross-sections. Images of fiber cross-sections were captured on the LEXT OSL4000 3D measuring laser confocal microscope.

Fiber cross sections detail homogeneous blends of polymer and lignin. Images do not show signs of lignin from polymer phase separation. Voids are not present along the fiber cross section. The absence of voids indicates lignin remained in fiber during coagulation.

Figure 6:
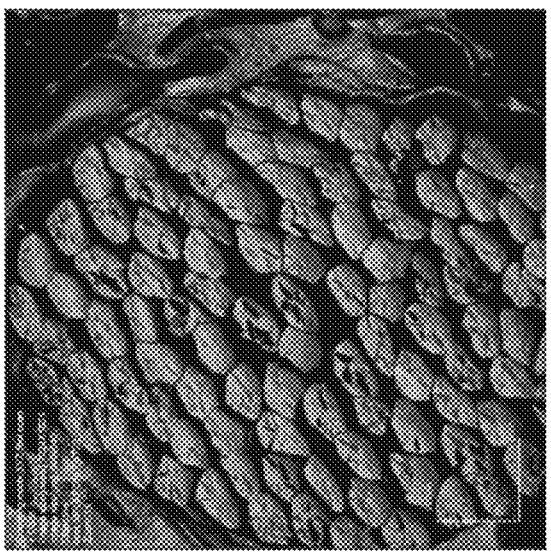
FIG. 6 is a series of confocal micrographs of cross sections of lignin/PAN fibers at different lignin concentrations.
Figure 6:
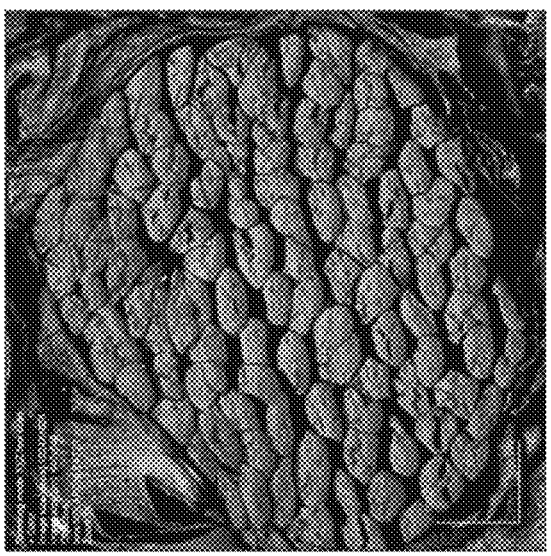
Figure 6:
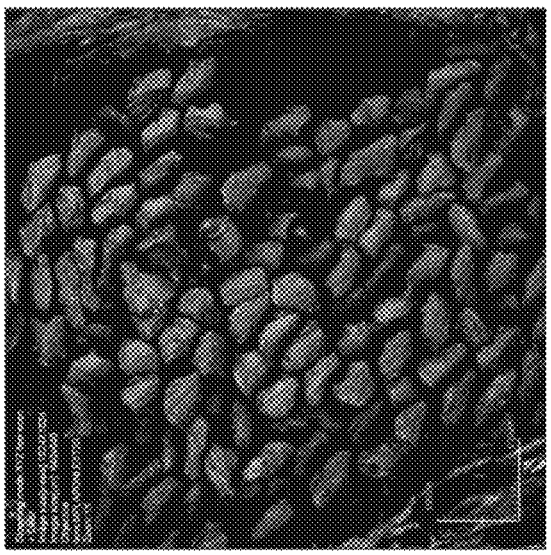

Referring to FIG. 6, a series of confocal micrographs were taken of cross sections of lignin/PAN fibers at different lignin concentrations. The coagulation bath of Lignin/PAN coagulated in 25% isopropyl alcohol, 50% methanol, 25% water. In the left panel, the fibers included 0% lignin, had a linear density of 18 denier, and had a cross section of 47 μm. In the center panel, the fibers included 30% lignin, had a linear density of 14 denier, and had a cross section of 40 pm. In the right panel, the fibers included 50% lignin, had a linear density of 20 denier, and had a cross section of 48 μm. Lignin/PVA ratio in dope is maintained in the fiber and no voids were observed across the fiber cross sections.

Example 11

Generation of Teas Plots for PVA and PAN Fibers

Figure 7A:
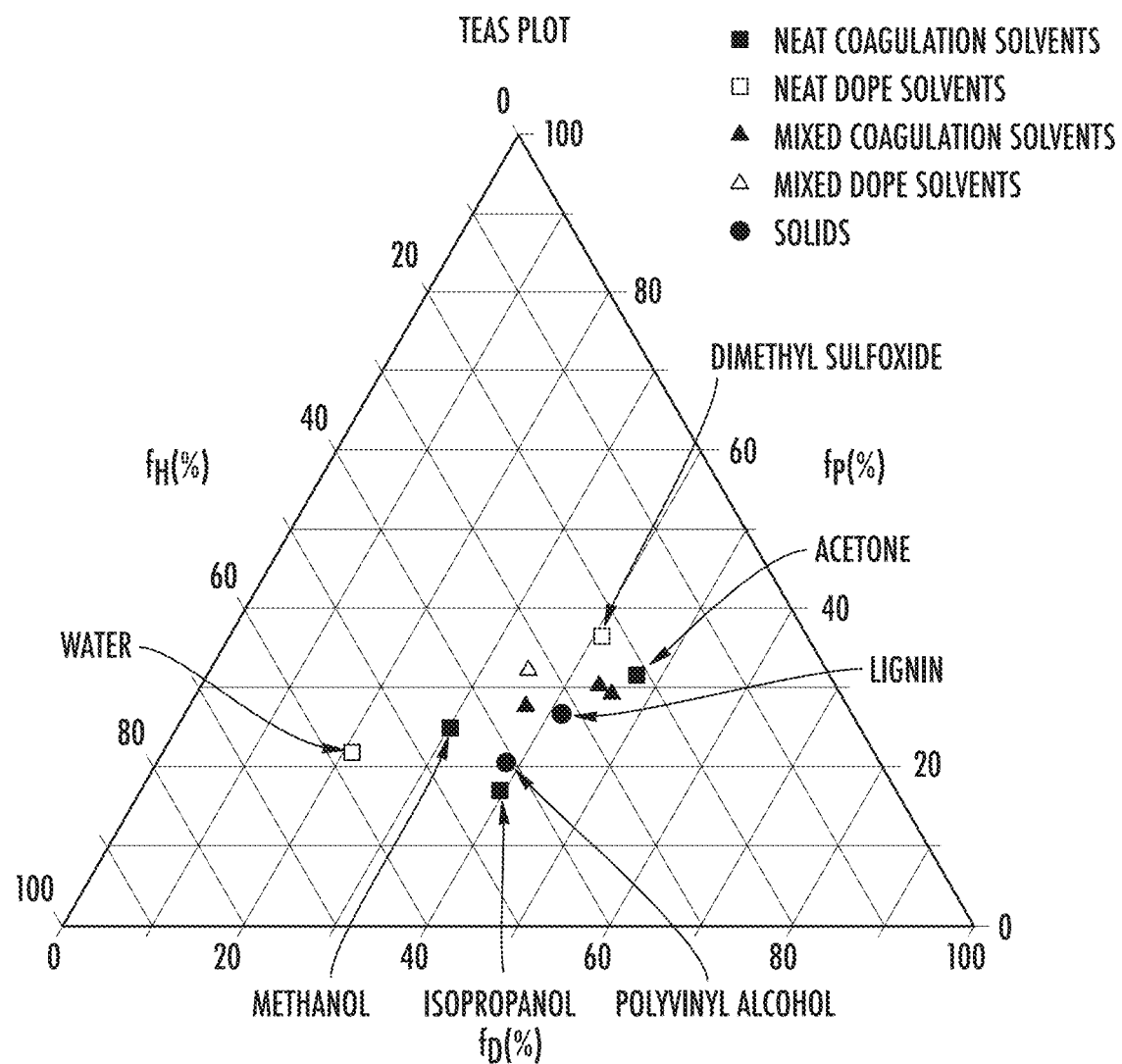
FIGS. 7A-7C are Teas Plots for lignin/PVA (FIG. 7A) and lignin/PAN (FIGS. 7B and 7C) gel spinning. In these Figures, $f_H$ (%) refers to the hydrogen bonding character, $f_P$ (%) refers to the polar character, and $f_D$ (%) refers to the dispersive character of the coagulation solvents, dopes, and solids. Neat coagulation solvents (■, with positions of methanol, acetone, and isopropanol indicated with arrows in FIG. 7A and of water, methanol, and isopropanol indicated with arrows in FIG. 7B), neat dope solvents (□, with positions of water and dimethyl sulfoxide (DMSO) indicated with arrows in FIG. 7A and of DMSO indicated with an arrow in FIG. 7B), mixed coagulation solvents (▲), mixed dope solvents (open triangles), and solids (●, with the positions for lignin and for PVA or PAN indicated with arrows).
Figure 7B:
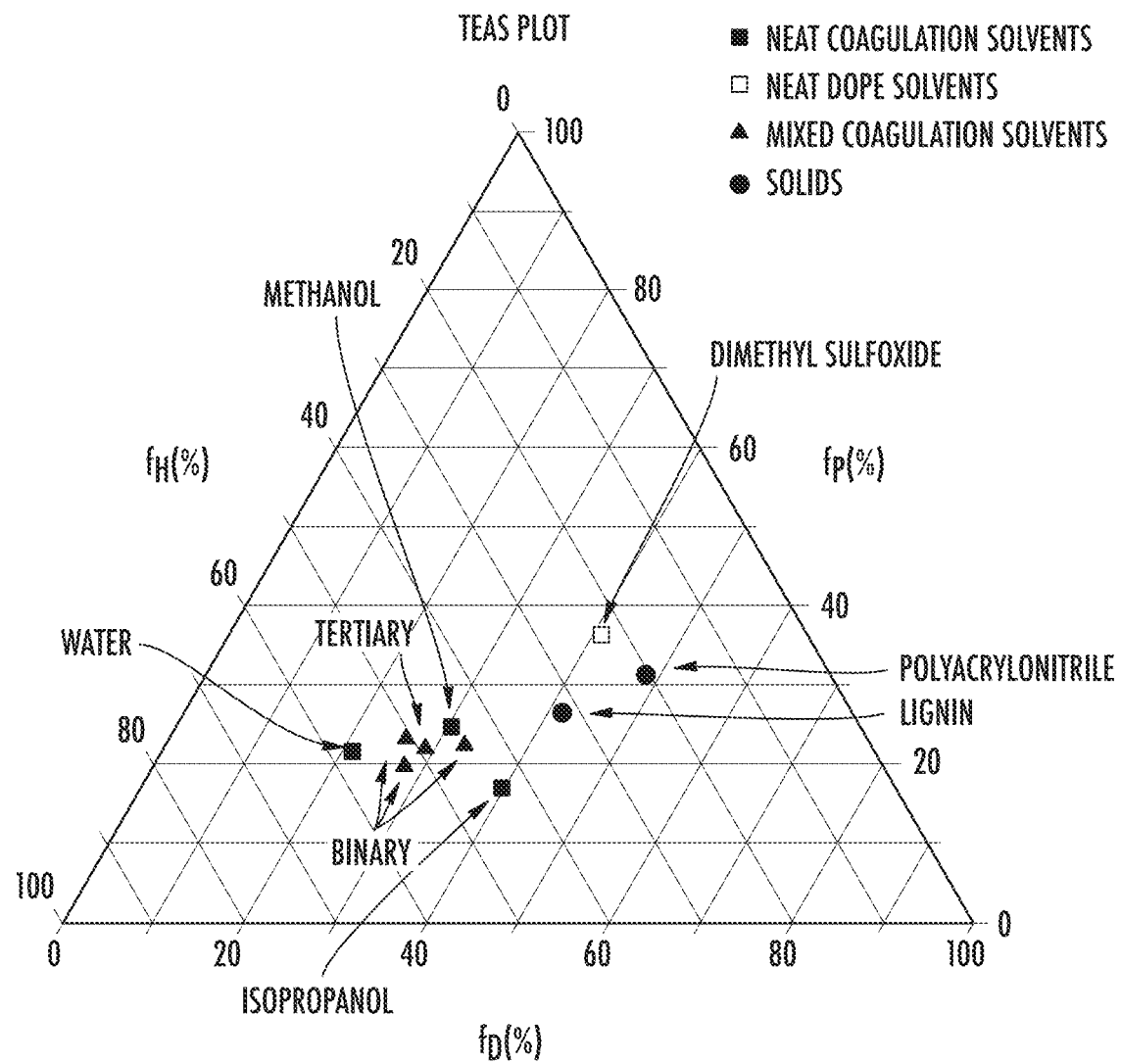

Exemplary TEAS Plots for lignin/PVA and lignin/PAN fibers are provided in FIGS. 7A and 7B, respectively. In FIGS. 7A and 7B, TEAS parameters are plotted for multi-component systems. Binary and tertiary mixtures are represented on the plots. For lignin/PVA, Teas Parameters show binary mixtures for 15/85 methanol/acetone (18 gauge needle), 15/85 isopropanol/acetone (22 gauge needle), 25/75 water/acetone aging bath for 24 hrs. For lignin/PAN, Teas Parameters: the tertiary mixtures represent 25% isopropyl alcohol, 50% methanol, 25% water; it is the center point of the three binary mixtures. Each binary mixture represents a coagulation system that is a close as possible to the tertiary mixture along a straight line to any third component of 1) methanol, 2) isopropanol, or 3) water.

From the TEAS plots for lignin/PVA (see FIG. 7A), it was determined that a dope of lignin and PVA can be added to a coagulation bath containing a solvent comprising one or more components, wherein the one or more components are present in the solvent in concentrations such that the hydrogen bonding character ($f_H$) of the solvent is between 20% and 30%, the polar character ($f_P$) of the solvent is between 25% and 35%, and the dispersive character ($f_D$) of the solvent is between 40% and 50%.

From the TEAS plots for lignin/PAN (See FIG. 7B), it was determined that a dope of lignin and PAN can be added to a coagulation bath containing a solvent comprising one or more components, wherein the one or more components are present in the coagulation bath in concentrations such that the hydrogen bonding character ($f_H$) of the solvent is between 40% and 60%, the polar character ($f_P$) of the solvent is between 15% and 30%, and the dispersive character ($f_D$) of the solvent is between 20% and 40%.

For lignin/PAN, Teas Parameters: the tertiary mixtures represent 25% isopropyl alcohol, 50% methanol, 25% water; it is the center point of the three binary mixtures. Each binary mixture (of methanol/isopropanol, methanol/water, isopropanol/water) represents a coagulation system that is as close as possible to the tertiary mixture along a straight line to any third component of 1) methanol, 2) isopropanol, or 3) water. Thus, the binary systems are expected to have coagulation ability similar to the tertiary system used for lignin/PAN. By changing the volumes of known coagulants (for each polymer: lignin and PAN individually) in a coagulation bath, the overall solubility parameters (fH, fP, fD) are tuned to coagulate dopes of lignin/PAN. Thus, the mapping of Teas Parameters for known binary or tertiary coagulation systems is a predictive tool to identify alternate baths based on their environmentally friendliness or green chemistry; those being less volatile or flammable; to reduce toxicity or the hazardous nature of the bath to humans and/or the environment; reduced cost; to aid chemical separation, solvent recovery, and/or recovery of impurities diffused from the dope; and/or to commercial processability and scalability. Using predictions based on the solvent map, alternate solvents can yield baths suitable for (singular, binary, tertiary, or multi-component) coagulation based on its overall solubility parameters (fH, fP, fD)—with or without the mixing in of additional solvents to achieve appropriate values of each solubility parameter.

Example 12

Teas Predictive Modeling of Methanol-Free Coagulation for Gel-Spun Lignin/Polyacrylonitrile Fibers This Example uses solvent mixtures to tune the coagulation of lignin/PAN for deterring lignin migration into the coagulation bath and for providing the spinning of stronger lignin/PAN fibers. The solution spinning of lignin-based fibers is most beneficial if it is possible to map the performance of solvent mixtures used during coagulation. That predictive capability requires an understanding of how solubility parameters affect the dissolution of lignin, matrix polymer, and solvent mixtures. Hansen solubility parameters (HSPs) are quantifiable terms that aid the prediction of dissolution by molecular affinity. This technique for low molar mass molecules aids an understanding of how polymers dissolvent with the stipulation that increasing molecular weight can deter dissolution.

HSPs classify molecular interactions for dissolution in terms of their dispersive ($\delta_D$), polar ($\delta_P$), and hydrogen ($\delta_H$) bonding behaviors (Grulke, E. A. Solubility Parameter Values. In The Wiley Database of Polymer Properties. 2003; Hansen, C. M. The Three Dimensional Solubility Parameter and Solvent Diffusion Coefficient. 1967; Gårdebjer, S., et al., *Polymer Chemistry* 2016, 7, 1756; Yamamoto, H. Hansen Solubility Parameters (HSP) Application Notes. https://pirika.com/ENG/HSP/index.html). Hansen and Yamamoto have plotted HSP values to represent three-dimensional domains of solubility, i.e. "Hansen Space" (Hansen, C. M. The Three Dimensional Solubility Parameter and Solvent Diffusion Coefficient. 1967; Yamamoto, H. Hansen Solubility Parameters (HSP) Application Notes. https://pirika.com/ENG/HSP/index.html]. Spatial proximity in Hansen Space can predict miscibility and dissolution between molecules (Hansen, C. M. The Three Dimensional Solubility Parameter and Solvent Diffusion Coefficient. 1967; Yamamoto, H. Hansen Solubility Parameters (HSP) Application Notes. https://pirika.com/ENG/HSP/index.html.). Hansen and Yamamoto expressed HSPs for solvent mixtures using Equation 1:

$$\delta_i' = (v_1\delta_{1i} + v_2\delta_{2i})/(V) \quad (1)$$

where, $\delta_i'$ is HSP value for the mixture ($\delta_D$, $\delta_P$, or $\delta_H$), vis the volume fraction of each solvent in a binary system, $\delta_i$ is the HSP value for each solvent, and V is the total volume of the solvent mixture (Hansen, C. M. The Three Dimensional Solubility Parameter and Solvent Diffusion Coefficient. 1967; Yamamoto, H. Hansen Solubility Parameters (HSP) Application Notes. https://pirika.com/ENG/HSP/index.html). Calculated values for $\delta_D'$, $\delta_P'$, and $\delta_H'$ are then plotted in three-dimensional Hansen Space. Burke has suggested an alternative two-dimensional plot called the Teas Plot (Burke, J. Solubility Parameters: Theory and Application. http://www.cool.conservation-us.org/coolaic/sg/bpg/annual/v03/bp03-04.html); which graphically shows the dispersive ($f_D$), polar ($f_P$), and hydrogen ($f_H$) bonding components of the solvent system's HSP. In Equation 2, $f_i$ is the Teas ratio for each HSP ($\delta_i$); where $$f_i = 100 \times \delta_i/(\delta_D + \delta_P + \delta_H) \quad (2)$$

Since each HSP value is based on volume fraction, the Teas plot could easily extend to the mapping of ternary solvent systems.

Teas plots are typically used to understand the driving forces for solubility; nevertheless, these plots are used to map lignin/PAN coagulation by a system of non-solvents. To map coagulation systems using the Teas plots, it is necessary to define properties that are desirable for the coagulation of as-spun gel-fiber. The criteria defined in this Example include the formation of flexible, as-spun lignin/PAN fiber in the form of a physical gel, swollen with solvent. Further, Teas plots of engineered solvent mixtures for coagulation should eliminate lignin migration during coagulation, with less dependency on trial and error when it comes to the determination of new bath compositions. Solvent mixtures of acetone, isopropanol (IPA), MeOH, and water were test baths for PAN gelation and tuning lignin migration during the gel-fiber spinning of lignin/PAN fibers.

Experimental
Materials

PAN powder having a molecular weight of ~150 kDa was procured from Scientific Polymer. Powdered Kraft lignin from Domtar was used as-received. Solvents included water, DMSO from Sigma Aldrich, and acetone, EA, IPA, and MeOH from BDH Chemicals.

Spinning Dope Preparation

Spinning dopes of PAN and lignin/PAN (containing up to 50% lignin to the mass of PAN) were prepared. Lignin to PAN was exaggerated at 50% lignin in this study on how to retain lignin within as-spun fiber during gel-spinning. ~10 g of PAN was dissolved in 50 mL of DMSO under constant stirring at 85° C. for approximately 10 hours before spinning. Lignin was sonicated in 50 mL DMSO for up to 18 hrs prior to its addition to dissolved PAN. Sonicated lignin was combined with PAN dissolved in DMSO for lignin/PAN dopes. Dopes were heated at 85° C. and stirred for approximately 10 hours. The final concentration of PAN in the spinning dope was 20 g/dL.

Gel-Spinning

The gel-spinning process is shown schematically in FIG. 8. FIG. 8 is labeled according to three general steps: dope feed, coagulation, and drawing. In this Example, using a high pressure, stainless steel syringe that was equipped with a 19-gauge needle (0.69 mm inner diameter and 50.8 mm), the dope was loaded into the syringe and aged for at least two hours at ~21° C. This process of aging PAN dope is known as pre-gelation. Pre-gelation—the equilibration of dope at room temperatures—results in a gel-like network as polymer rich domains of PAN separate from solvent-rich domains.

Coagulation

The dope was fed into the coagulation bath with a diagonal dry jet of ~8 cm from the tip of the needle to solvent level. Traditionally, dry jet has the same length as the vertical air gap, which in this case was ~3 cm. The coagulation bath comprised solvent mixtures that are described in Table 15. Afterwards, as-spun gel fibers were wound onto a spool. Table 15 includes data also found in Table 11 but repeated here to facilitate explanation of this Example.

TABLE 15

Coagulation Bath Formulations for Spun Lignin/PAN Fibers

| Mixture | Acetone % v/v | IPA % v/v | MeOH % v/v | Water % v/v |
|---|---|---|---|---|
| 1 | | | | 100 |
| 2 | 15 | 85 | | |
| 3 | 85 | 15 | | |
| 4 | 15 | | 85 | |
| 5 | 85 | | 15 | |
| 6 | | 85 | 15 | |
| 7 | | 15 | 85 | |
| 8 | | 15 | | 85 |
| 9 | | 25 | 50 | 25 |
| 10 | 25 | 25 | | 50 |

Thermal Drawing: As-spun gel fibers were thermally drawn through glycerol in two stages at temperature ranging between 130-170° C. Fiber draw ratios (DR) were calculated according to Equation 3 the ratio of fiber take-up speed ($V_T$) to feed speed ($V_F$):

$$DR = V_T/V_F \quad (3)$$

Testing Lignin/PAN Coagulation

Qualitative droplet testing was used to visually compare the coagulation of lignin/PAN dopes and lignin migration into coagulation solvents (see Table 15). Two droplets of spinning dope (less than 1 mL) were dropped into scintillation vials containing 10 mL of solvent.

Cybulska et al. described a test method to quantify the solubility of lignin in a solvent (Cybulska, I.; et al., *Bioresource Technology* 2012, 118, 30); a modification to this approach was used to quantify the solubility of lignin dissolved in DMSO within potential coagulation baths (see Table 15). Lignin was sonicated in DMSO for a final concentration of 10 g/dL. 0.5 mL of sonicated lignin/DMSO was then added to 10 mL of each coagulation bath, shaken, and then allowed to stand for 5 minutes. Lignin precipitant was collected on Whatman 42 filter paper and then allowed to dry under a fume hood. The dried samples were then massed. The mass of insoluble lignin mass ($m_{lignin}$) is then calculated from Equation 4, $$m_f - m_0 = m_{lignin} \quad (4)$$

where $m_f$ is the mass of the filter paper after filtration and drying and $m_0$ is the mass of the filter paper before exposure to the lignin/DMSO solution.

Mechanical Testing

The mechanical properties of lignin/PAN fibers were tested using the MTS-Q testing system according to ASTM D3379. Parameters were set to 15 mm/min strain rate, 25.4 mm gauge length, and up to 20 specimen sample sizes. Composite density of the fibers was calculated according to the inverse rule of mixtures (Equation 5), $$\rho_{fiber} = [(1-w_f)/(\rho_{PAN}) + w_f/(\rho_{lignin})]^{-1} \quad (5)$$

where $w_f$ is the weight fraction, $\rho_{fiber}$ is the density of the composite fiber, $\rho_{PAN}$ is the density of PAN, and $\rho_{lignin}$ is the density of lignin.

Linear density, $\Pi$, reported in dtex, was calculated from measurements of cross-sectional area ($A_{cs}$) that were determined from IMAGEJ analysis. Confocal micrographs were taken using the LEXT OSL4000. With $A_{cs}$ and $\rho_{fiber}$ available, the linear density was calculated according to Equation 6.

$$\Pi = A_{cs} \times \rho_{fiber} \quad (6)$$

Results & Discussion

Effect of Solvent Mixtures on Dope Coagulation and Lignin Migration

Coagulants in Table 15 were evaluated based on the relative hardness of lignin/PAN droplets (at 50% lignin) in those solvent mixtures and retention of lignin within the as-dropped dope. Good coagulation of lignin/PAN droplets should yield drawable soft solids. When lignin/PAN was added to mixtures 2, 3, 5, and 7, soft droplets formed, but these lacked cohesion for hand-drawing. In direct contrast, mixtures 4, 6, and 8 rapidly coagulated the lignin/PAN droplet and resulted in droplets that were too hard to draw by hand. Mixtures 1, 9, and 10 resulted in "semi-soft" gel-phases that were cohesive and drawable.

From droplet testing, lignin leaching into the coagulation bath occurred on several instances. The rate of leaching seemed influenced by the relative hardness of coagulated lignin/PAN droplets. Supporting information shows lignin diffusion from the dope and into solvent mixture 1 occurred more rapidly than from 9 and 10 (tension was not applied to the jet of dope). Solvent mixtures 1, 9 and 10 were selected because these would likely yield the most drawable lignin-PAN, as-spun fibers.

To better understand the propensity of lignin to diffuse from as-spun fiber and into solvent mixtures for coagulation, the insoluble fractions from DMSO-dissolved lignin (after exposure to each coagulation bath in Table 15) were measured (see Table 16). Data on insoluble fractions were arranged according to coagulation behaviors that were observed during drop testing, with an extra category for pure non-solvents for PAN (acetone, ethyl acetate, isopropanol, and water).

TABLE 16

Insolubility of Lignin in Solvent Mixtures with their Teas Ratios

| | Solvents/Mixtures | $m_{lignin}$ (%) | $f_D$ (%) | $f_P$ (%) | $f_H$ (%) |
|---|---|---|---|---|---|
| PAN Non-solvents | Acetone | 21.6 | 15.5 | 10.4 | 7.0 |
| | Ethyl Acetate | 33.0 | 15.8 | 5.3 | 7.2 |
| | Isopropanol | 33.8 | 15.8 | 6.1 | 16.4 |
| | Water | 92.0 | 15.5 | 16.0 | 42.3 |

TABLE 16-continued

Insolubility of Lignin in Solvent Mixtures with their Teas Ratios

| | Solvents/Mixtures | $m_{lignin}$ (%) | $f_D$ (%) | $f_P$ (%) | $f_H$ (%) |
|---|---|---|---|---|---|
| Soft | #2 | 23.4 | 40.7 | 18.8 | 40.5 |
| | #3 | 22.0 | 45.8 | 29.0 | 25.2 |
| | #5 | 21.0 | 43.6 | 30.2 | 26.2 |
| | #7 | 18.0 | 38.1 | 18.3 | 43.6 |
| Semi-soft | #1 (MeOH) | 20.0 | 30.4 | 24.7 | 44.9 |
| | #9 | 43.2 | 28.9 | 22.2 | 48.9 |
| | #10 | 28.0 | 28.3 | 22.3 | 49.4 |
| Hard | #4 | 28.2 | 32.1 | 25.5 | 42.4 |
| | #6 | 48.8 | 31.6 | 23.8 | 44.7 |
| | #8 | 98.8 | 22.7 | 21.3 | 56.1 |

Based on lignin/PAN dopes at 50% lignin to PAN

Among the pure solvents, lignin was most insoluble in water. For the lignin used in this study, MeOH (#1) and acetone had similar values of lignin solubility. These results are dependent on lignin type, because techniques for chemical extraction of lignin can affects its solvent affinity. For instance, Lu et al. reported lignin extracted from wood pulp by mild acid hydrolysis was acetone insoluble (Lu, C.; et al., ACS Sustainable Chemistry & Engineering 2017). Lignin insoluble fractions were similar for ethyl acetate (EA) and IPA, but they were slightly higher than values reported for acetone and MeOH.

Hard droplets coagulated in mixtures 4, 6, and 8, where the insoluble fractions of lignin were $m_{lignin} \geq 28\%$. Soft droplets coagulated in mixtures, where insoluble fractions of lignin were $m_{lignin} \geq 23\%$. Semi-soft droplet formation occurred in solvent mixtures that were capable of dissolving lignin at mass fractions that were also observed for 'hard' and 'soft' coagulation of lignin/PAN droplets.

Based on the Teas Ratios in Table 16, some trends are apparent for coagulation and lignin's solubility in solvent systems. From water's teas ratios, $f_H \geq 42\%$ coagulates PAN and precipitates lignin when values for $f_D$ and $f_P$ are low. In comparison to MeOH, Mixtures 9 and 10 have higher $f_H$ values but lower $f_D$ and $f_P$ values that could explain slower rates of lignin diffusion. The relatively rapid diffusion of lignin from dopes coagulated in pure MeOH, makes this pure solvent less ideal for gel-spinning lignin/PAN fibers, especially at high loadings of lignin. Relative to Teas ratios for hard coagulation, mixtures 9 and 10 also 10 offer a drawable dope perhaps due to low $f_D$ and $f_P$ values, which 1) permits lignin mobility of lignin at the solvent/polymer interface and 2) slows lignin diffusion of from coagulating PAN. Mixture 8 (for hard coagulation) has a high fraction of insoluble lignin due to its high $f_H$ value of 56.1% that is coupled with low $f_D$ and $f_P$ values (22.7% and 21.3%, respectively).

Mapping Lignin/PAN Coagulation on Teas Plots

The Teas plot is a visual display of HSPs differences between pure solvents, solvent mixtures, lignin and PAN. By increasing $f_H$ character, nonsolvent mixtures for PAN coagulation (into hard, highly crystalline polymer or soft, gel structure) are formulated. These formulations also promote DMSO diffusion from PAN to the coagulation bath, therefore molecular weight must also influence miscibility between molecules. Lignin has greater $f_H$ character, therefore it can remain soluble in MeOH. The Teas map effectively shows how even slight variations in $f_H$ and $f_P$ character in particularly can tailor PAN coagulation and lignin solubility using mixtures of known solvents.

Figure 7C:
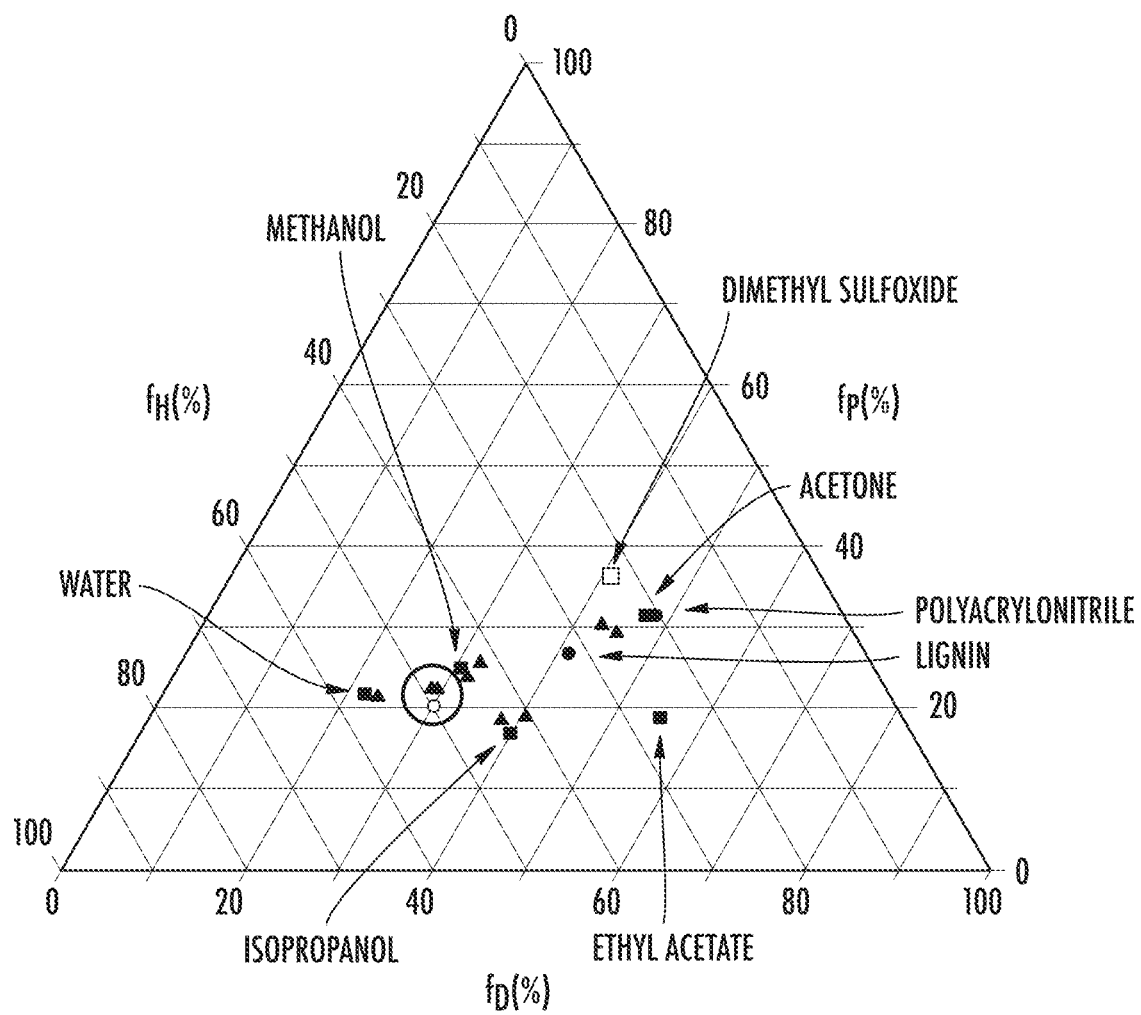

Mixture 9 and 10 of this Example are encircled on FIG. 7C to emphasize similarities between their $f_H$, $f_D$, and $f_P$ character. Water, MeOH, and IPA are coagulating, nonsolvents for PAN, but only water is an exceptional nonsolvent for lignin. Interestingly, their spatial midpoint (in terms of $f_H$, $f_D$, and $f_P$ character) on the Teas plot is approximate to Mixtures 9 and 10 of this Example (FIG. 7C). Although a 55/45 ethyl acetate/water mixture would give the spatial midpoint between water, MeOH and IPA, the immiscibility of these solvents prevents testing of its coagulation ability against lignin/PAN dopes.

Effect of Methanol Content on Gel-Fiber Spinning

Mixtures 1, 9, and 10 were tested as coagulation baths for the spinning of lignin/PAN fibers at up to 50% lignin. Processing parameters for the gel spinning of lignin/PAN fibers in select coagulation baths are given in Table 17. Lignin/PAN fiber spinning at 50% lignin was attempted with neat MeOH as the coagulation bath, but the resulting as-spun fibers were nonuniform along the fiber and broke often during elevated temperature drawing. Of those parameters, the most notable differences are in bath temperature and draw ratio. By reducing MeOH in the coagulation bath, as-spun gel fiber was formed and drawn at higher temperatures. Further, Mixture 9 yielded the highest fiber draw ratios for neat PAN fibers and those at 50% lignin. Although the HSP values for Mixture 9 and 10 are similar, both differed in terms of their ability to dissolve lignin. Nevertheless, lignin migration into the coagulation bath was unnoticeable. Reducing the solubility of lignin in the coagulation bath, while maintaining a flexible PAN physical gel helps to form drawable as-spun fiber.

TABLE 17

Processing Parameters of Lignin/PAN Fibers

| | | Bath ID | | | |
|---|---|---|---|---|---|
| | | #1 | #9 | | #10 |
| | | | Sample | | |
| | | Neat PAN | Neat PAN | 50% Lignin/PAN | Neat PAN | 50% Lignin/PAN |
| As-spun | DR | 6.2 | 7.0 | 7.2 | 7.2 | 7.0 |
| | Residence Time (s) | 2.4 | 2.1 | 2.1 | 2.0 | 2.1 |
| | Temp (° C.) | −20 | −4 | −7 | 3 | 7 |
| Stage 1 | DR | 8.9 | 12.2 | 9.2 | 9.3 | 10.0 |
| | Temp (° C.) | 130 | 135 | 133 | 131 | 140 |
| Stage 2 | DR | 1.4 | 1.5 | 1.6 | 1.5 | 1.4 |
| | Temp (° C.) | 174 | 168 | 160 | 173 | 174 |
| | Total DR | 76 | 126 | 106 | 99 | 102 |
| | Linear Density (dtex) | 29 | 13 | 18 | 10 | 19 |
| | Effective Diameter (μm) | 56 | 37 | 44 | 34 | 44 |

Residence time in the coagulation bath is given.

Lignin Retention Within Gel-Spun Fibers

Cross sections of lignin/PAN fibers demonstrated the effects of lignin content and coagulation bath on fiber morphology. No evidence of lignin from PAN phase separation was observed among fibers.

Effect of Coagulation Bath on the Mechanical Properties Lignin/PAN Fibers

Figure 16:
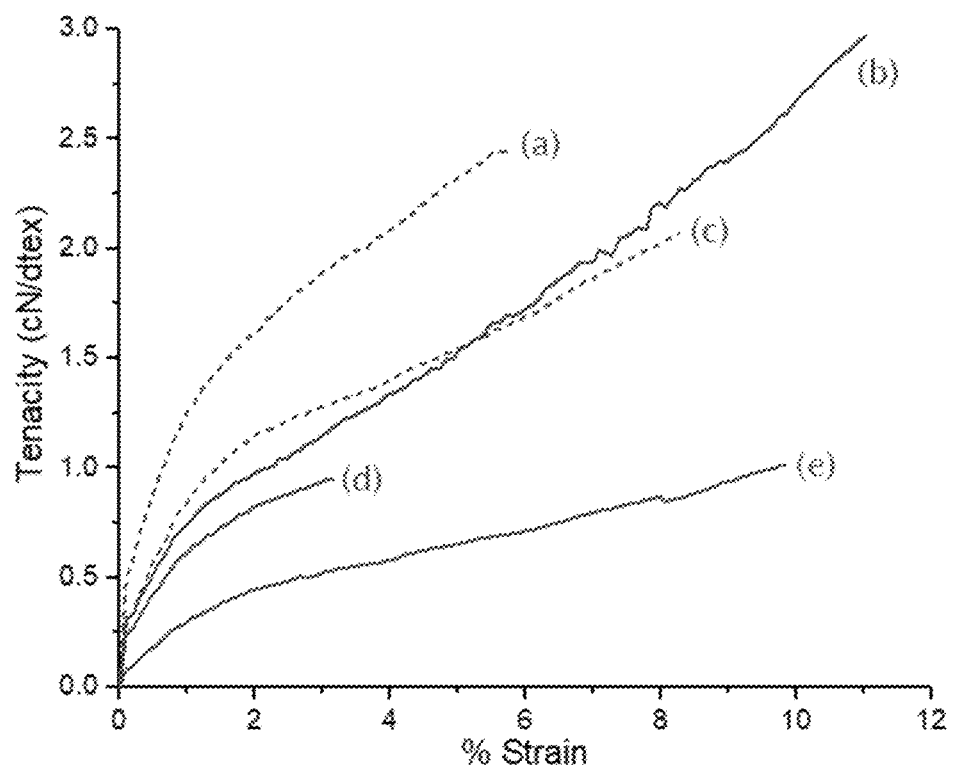
FIG. 16 is a plot of tenacity vs strain curves of (a) 50% lignin/PAN spun in mixture 9 of Example 12, (b) neat PAN spun in mixture 9 of Example 12, (c) 50% lignin/PAN spun in mixture 10 of Example 12, (d) neat PAN spun in mixture 10 of Example 12, and (e) neat PAN spun in methanol (MeOH) of Example 12.

The mechanical properties of the fibers are shown in Table 18 and FIG. 16. Overall, mixture 9 outperformed both bath 1 and 10 in terms of modulus and tenacity for PAN at 150 kDa.

SEM micrographs of the strongest lignin/PAN fibers show fibrillation upon fracture in tension. Fibrils at the lignin/PAN fracture tip are much smaller in scale than observed within neat PAN fiber. This mechanism of fracture supports the observation of strengthening among the lignin/PAN fibers and failure at lower values of strain in contrast to neat PAN fibers. The observation of highly crystalline, PAN fibrils also suggests the incorporation of lignin does not hinder the molecular alignment of PAN along the fiber axis during gel-fiber spinning.

From the SEM images of the lignin/PAN samples spun in mixture 9, lignin aggregates were minimized to the sub-micron scale. This observation suggests the engineered coagulant baths integrated constituent solids during processes of gel-fiber spinning.

Conclusions

MeOH typically used for gel-spinning PAN fibers can dissolve or attract lignin, reducing the amount of solids in the formed fiber system. Coagulation bath behaviors can be characterized and predicted by utilizing the Teas ratios and HSPs unique to the solvents. In turn, utilizing Hansen and Yamamoto's concepts on solution mixtures for effective solvents (Hansen, C. M. The Three Dimensional Solubility Parameter and Solvent Diffusion Coefficient. 1967; Yamamoto, H. Hansen Solubility Parameters (HSP) Application Notes. https://pirika.com/ENG/HSP/index.html), mixtures of lignin non-solvents can be engineered to develop coagulation baths for lignin/PAN systems that coagulate the PAN with greatly reduced lignin migration. Drawing the fiber at a high rate during the spinning process is essential to reducing the lignin migration. The mixed bath recipe engineered to impede the rate of lignin migration coupled with the high draw ratio and reduced residence time effectively minimized lignin migration. Because the lignin migration was minimized, more lignin was retained in the fiber system as a reinforcement material, increasing stiffness with only minor reduction to tenacity. The fibers formed in the alternative baths show little to no detriment in processing parameters or mechanical properties, but instead exhibit comparable properties at more manageable and less costly spinning temperatures. The lack of apparent voids or aggregates also shows that the solvent mixtures engineered for coagulation baths minimized the effect of lignin migration on the fiber cross sections.

Of the solvents used, MeOH is an irritant to human health through chronic skin exposure and ingestion. Mixtures 1 and 9 have methanol in them, but the volume fraction of methanol in Mixture 9 is at 50%. Another goal of this work was to couple the use of lignin/PAN fibers (at high lignin content) with green solvents to spin fiber at commercial scales, while improving the sustainability of gel-spinning process overall. As such, DMSO (a wood pulp by-product) was selected as the dissolving solvent for the dope opposed to DMAc and DMF. The change in vapor pressure of new solvent mixture 9 and 10 are calculated to see the effects of adding water on reducing the flammability of coagulation baths at room temperature.

Discussion of the Examples

Figure 4B:
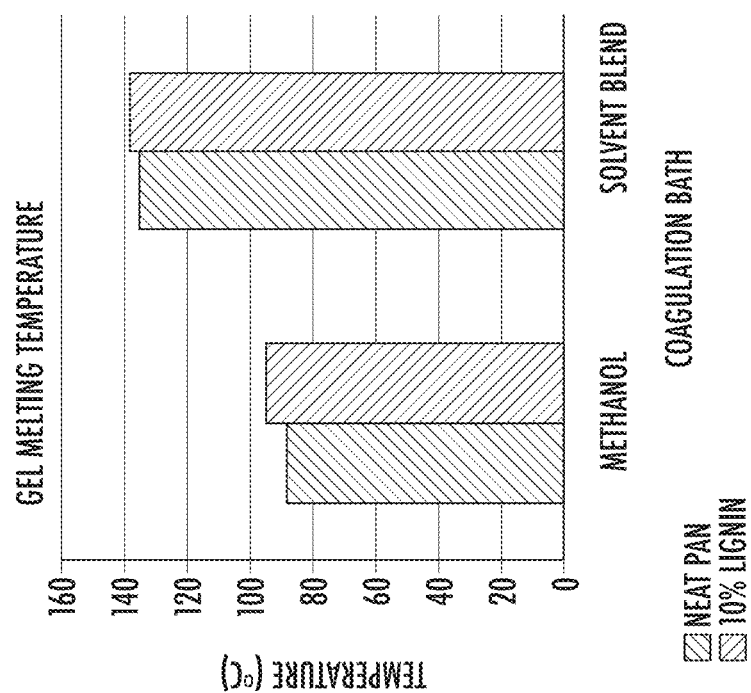
FIGS. 4A and 4B are bar graphs of Total Draw Ratio and Gel Melting Temperature, respectively, for PAN with no lignin (Neat PAN) or 10% lignin (10% Lignin) spun from 100% methanol (Methanol) or a solvent comprising 25% isopropyl alcohol, 50% methanol, 25% water (Solvent Blend). The presence of 10% lignin raised the Total Draw Ratio and the Gel Melting Temperature in each set of conditions.
Figure 4A:
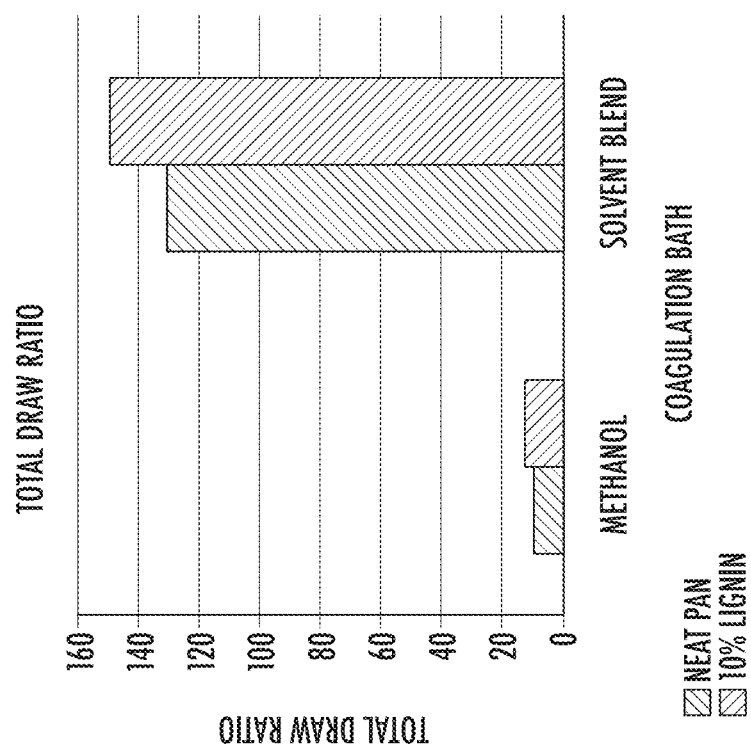
Figure 5A:
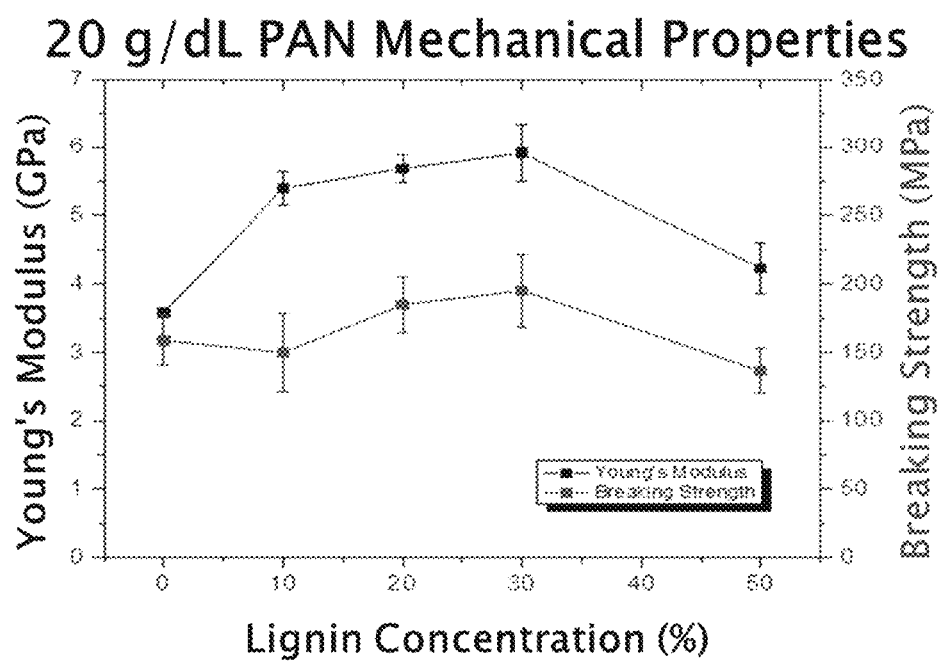
FIGS. 5A and 5B are plots showing various characteristics of lignin/PAN fibers at 20 g/dL PAN and 0-50% lignin. The coagulation bath used during gel fiber spinning for each Figure was 25% isopropyl alcohol/50% methanol/25% water.
Figure 5B:
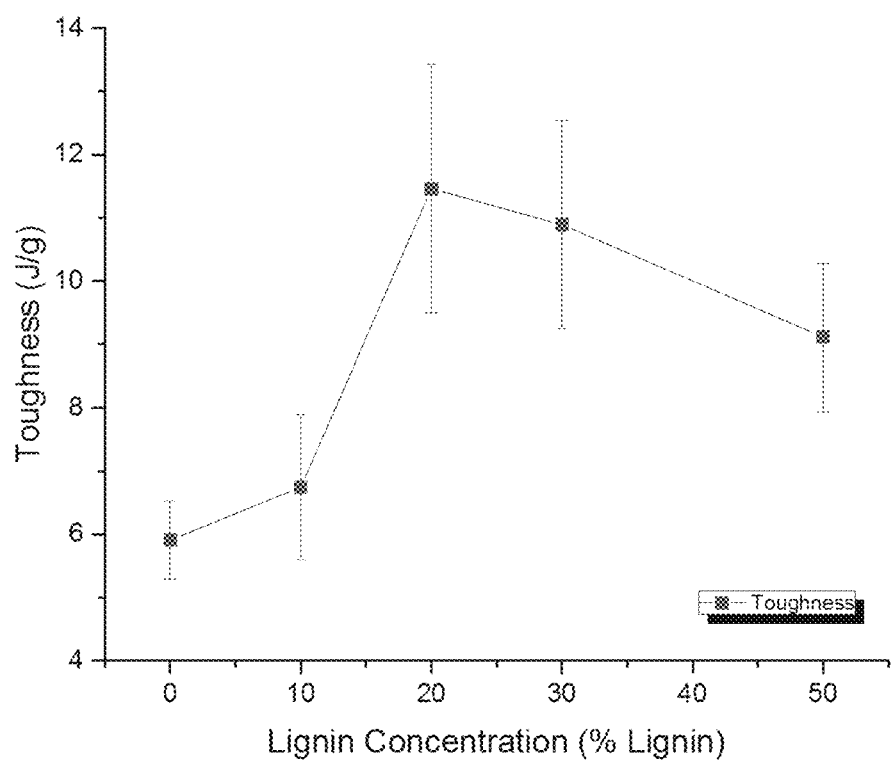
Figure 12:
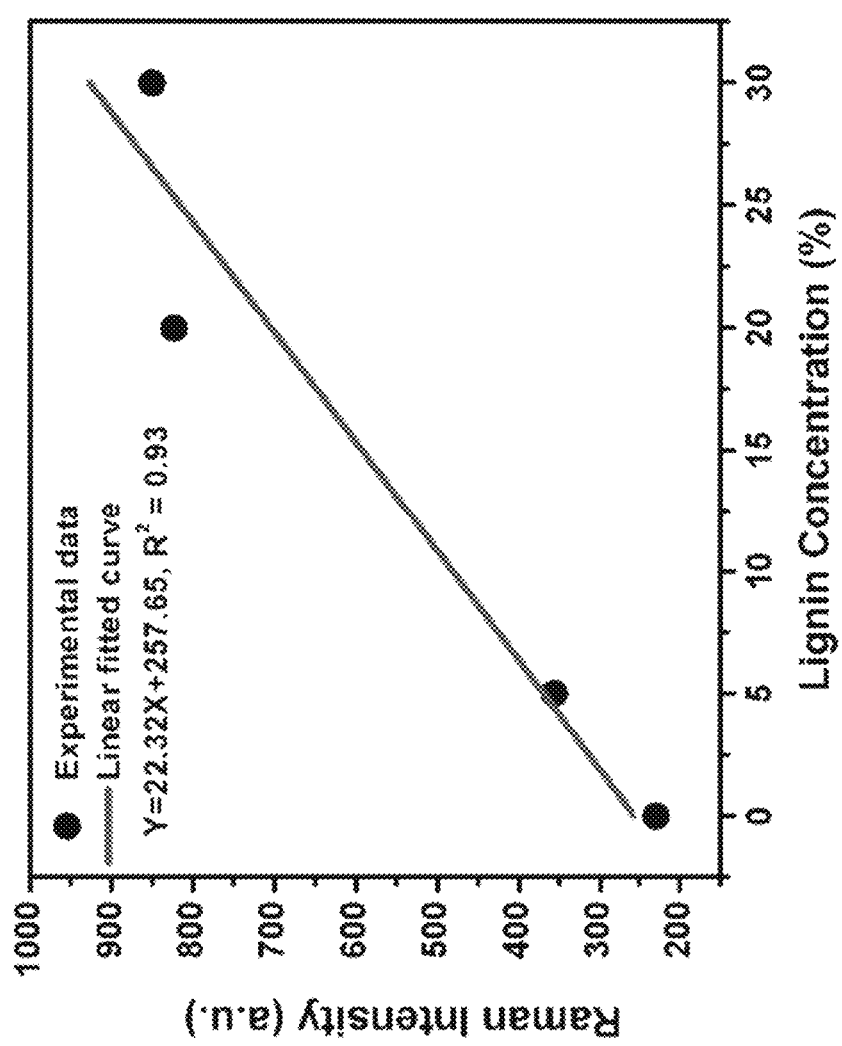
FIG. 12 is a plot of Raman intensity (a.u.) vs. lignin concentration for lignin/PVA fibers prepared as disclosed herein. Experimental data were produced at 0, 5, 20, and 30% lignin and a line fitted wherein Y=22.32X+257.65, with a linear coefficient ($R^2$) of 0.93.B

The presently disclosed subject matter provides several advantages over wet spinning techniques and other gel spinning techniques. For example, lignin/PAN or lignin/PVA gel spinning employing a coagulation bath containing a solvent with hydrogen bonding character ($f_H$), polar character ($f_P$), and dispersive character ($f_D$) as set forth herein can result in the following desirable characteristics:

transparent or translucent appearance of the gel-fiber (see FIG. 10);

improved gel flexibility;

lengthened air gap and dry-jet before the dope enters the coagulation increased fiber draw ratio overall (see FIG. 4A and Table 1);

Increased gel-fiber melting temperature (see FIG. 4B and Table 2);

more lignin being retained in the fiber (see FIG. 12 of lignin/PVA fiber);

absence of voids throughout the fiber cross section (FIG. 6 and FIG. 3); and enhanced physical properties of fibers, such as but not limited to:

mechanical strength of lignin/PAN fibers of $1\times10^6$ Pa or more and mechanical strength of lignin/PVA fibers of at least $650\times10^6$ Pa or more;

linear density values are 10-25 dtex;

in the case of PVA, tensile strength, tensile modulus, and toughness greater than that of neat PVA fibers;

increased fiber draw ratio overall;

no voids across the fiber cross section; and lignin/PVA fiber with higher tensile strength or the average tensile strength no more than 20% lower in strength, tensile modulus, and toughness values are greater than that of neat PVA fibers.

The Raman intensity of lignin is directed related to lignin concentration in different fibers. According to FIG. 12, the content of lignin within lignin/PVA increased linearly with the percent of lignin that was added to the dope, as represented by the X-axis values of lignin concentration. BaySpec Nomadic confocal Raman microscope was used to obtain Raman spectra from drawn lignin/PVA bundles (containing ~50 fibers by Lu et al.) at 0, 5, 20 and 30% lignin. Fiber measurements were taken with a 10× objective lens and a 785 nm laser at 104 mW (based on the filter setting). The sample exposure time was 1 s with an acquisition number of 10. After baseline correction, the Raman intensity at 1550 cm$^{-1}$ (characteristic lignin peak) was plotted against lignin concentration. The linear regression curve was obtained by Origin Pro 8 software.

Voids were observed among 20% lignin fibers of lignin/PVA that were formed in coagulation baths of pure methanol (FIG. 3). Whereas, lignin/PVA fibers at 20% lignin did not show evidence of voiding when fibers were coagulated in 15/85 methanol/acetone bath (FIG. 3). Voiding is caused by the aggressive diffusion of lignin from gel fiber into the coagulation bath.

REFERENCES

All references cited in the instant disclosure, including but not limited to all patents, patent applications and publications thereof, scientific journal articles, and database entries are incorporated herein by reference in their entireties to the extent that they supplement, explain, provide a background for, or teach methodology, techniques, and/or compositions employed herein.

It will be understood that various details of the presently disclosed subject matter can be changed without departing from the scope of the presently disclosed subject matter. Furthermore, the foregoing description is for the purpose of illustration only, and not for the purpose of limitation.

What is claimed is:

1. A method for preparing a lignin/poly(vinyl alcohol) (PVA) fiber, the method comprising:
   (a) adding a dope of lignin and PVA to a coagulation bath containing a solvent comprising one or more components, wherein the one or more components are present in the solvent in concentrations such that the hydrogen bonding character ($f_H$) of the solvent is between 20% and 30%, the polar character ($f_p$) of the solvent is between 25% and 35%, and the dispersive character ($f_D$) of the solvent is between 40% and 50%; and
   (b) gel-spinning a lignin/PVA fiber from the coagulation bath,
   wherein a lignin/PVA fiber is produced.

2. The method of claim 1, wherein the dope is prepared at about 80° C. to about 85° C.

3. The method of claim 1, wherein the dope comprises a weight ratio of 5-90% (w/w) lignin to PVA.

4. The method of claim 1, wherein the dope comprises PVA at a molecular weight of about 100-500 kg/mol, and further wherein the PVA is characterized by at least about 85% hydrolysis.

5. The method of claim 1, wherein the dope is provided in a solution of about 80% DMSO to about 100% DMSO (v/v) in distilled water at about 60° C. to about 85° C.

6. The method of claim 1, further comprising conditioning the dope at room temperature for at least two hours prior to the adding step.

7. The method of claim 1, wherein the coagulation bath is maintained at a pre-set temperature that is between about −15° C. and about −30° C., optionally wherein the pre-set temperature is about −25° C.

8. The method of claim 1, wherein the lignin/PVA fiber has an as-spun draw ratio of at least 2×.

9. The method of claim 1, wherein the lignin has a minimum molecular weight of at least 2 kiloDaltons (kDa).

10. The method of claim 1, wherein the one or more components of the solvent include about 15% to about 50% methanol and about 50% to about 85% acetone.

11. A method for preparing a lignin/polyacrylonitrile (PAN) fiber, the method comprising:
   (a) adding a dope of lignin and PAN to a coagulation bath containing a solvent comprising one or more components, wherein the one or more components are present in the coagulation bath in concentrations such that the hydrogen bonding character ($f_H$) of the solvent is between 40% and 60%, the polar character ($f_P$) of the solvent is between 15% and 30%, and the dispersive character ($f_D$) of the solvent is between 20% and 50%; and
   (b) gel-spinning a lignin/PAN fiber from the coagulation bath,
   wherein a lignin/PAN fiber is produced.

12. The method of claim 11, wherein the PAN is present in the dope in an amount of about 10 to about 50 g/dL, optionally about 20 g/dL.

13. The method of claim 11, wherein the dope comprises PAN at about 150 kDa and is prepared at about 80° C. to about 85° C. or comprises PAN at about 200-250 kDa and is prepared at about 60° C. to about 85° C.

14. The method of claim 11, further comprising conditioning the dope at room temperature for at least two hours prior to the adding step.

15. The method of claim 11, wherein the coagulation bath is maintained at about −5° C.

16. The method of claim 11, wherein the lignin/PAN fiber has an as-spun draw ratio of at least 3×.

17. The method of claim 11, wherein the dope comprises up to 30% PAN, a concentration of up to 20% g/dL PAN, and a weight ratio of up to 90% (w/w) lignin to PAN.

18. The method of claim 11, wherein the dope comprises PAN at a molecular weight of about 150 kDa to about 300 kDa.

19. The method of claim 11, wherein the dope is provided in a solution comprising DMSO, dimethyl acetamide (DMAc), dimethylforamide (DMF), and/or an alkanolamine.

20. The method of claim 19, wherein the solution comprises 5-10% (w/w) alkanolamine, optionally monoethanolamine (MEA) or triethanolamine, to DMSO.

21. The method of claim 11, wherein the dope is provided in an 80-100% (v/v) solution of DMSO in distilled water at about 80° C. to about 85° C.

22. The method of claim 11, wherein the lignin has a minimum molecular weight of at least 2 kDa.

23. The method of claim 11, wherein the solvent comprises about 25% isopropyl alcohol, about 50% methanol, and about 25% water.

24. The method of claim 11, wherein the dope comprises a weight ratio of 10-90% (w/w) lignin to PAN.

25. The method of claim 11, wherein the adding step comprises extruding the dope through an orifice above the top surface of the solvent present in the coagulation bath.

26. The method of claim 11, wherein the solvent is maintained at a temperature of about −15° C. to about 5° C.

27. A method for preparing a lignin/poly(vinyl alcohol) (PVA) fiber, the method comprising:
   (a) aging a dope of lignin and PVA in an aging bath, optionally for 12 hours to 30 days, wherein the aging bath contains a solvent comprising one or more components, and further wherein the one or more components are present in the solvent in concentrations such that the hydrogen bonding character (fH) of the solvent is between 20% and 40%, the polar character (fP) of the solvent is between 25% and 35%, and the dispersive character (fD) of the solvent is between 35% and 50%; and
   (b) gel-spinning a lignin/PVA fiber from the aging bath.

28. A method for preparing a lignin/polyacrylonitrile (PAN) fiber, the method comprising:
   (a) heating a dope of lignin and PAN to a desired temperature in a first solvent, optionally wherein the first solvent is DMSO, until the lignin and PAN are dissolved in the first solvent;
   (b) aging the dope of lignin and PAN by allowing the dope to cool, optionally to about 18° C. to 25° C., further optionally allowing the dope to remain at about 18° C. to 25° C. for at least about two hours;
   (c) adding the dope of lignin and PAN to a coagulation bath that contains a solvent comprising one or more components, and further wherein the one or more components are present in the solvent in concentrations such that the hydrogen bonding character ($f_H$) of the solvent is between 40% and 60%, the polar character ($f_P$) of the solvent is between 15% and 30%, and the dispersive character ($f_D$) of the solvent is between 20% and 50%; and
   (d) gel-spinning a lignin/PAN fiber from the bath, wherein a lignin/PAN fiber is produced.

29. The method of claim 28, wherein the dope is aged for at least about 2 hours at 18° C. to 25° C., optionally 18° C. to 22° C.

30. The method of claim 29, wherein the desired temperature is about 85° C.

31. The method of claim 29, further comprising transferring the dope to a pump after the lignin and the PAN are completely dissolved in the solvent and the dope is at the desired temperature.

* * * * *